United States Patent Office 3,426,880
Patented Feb. 11, 1969

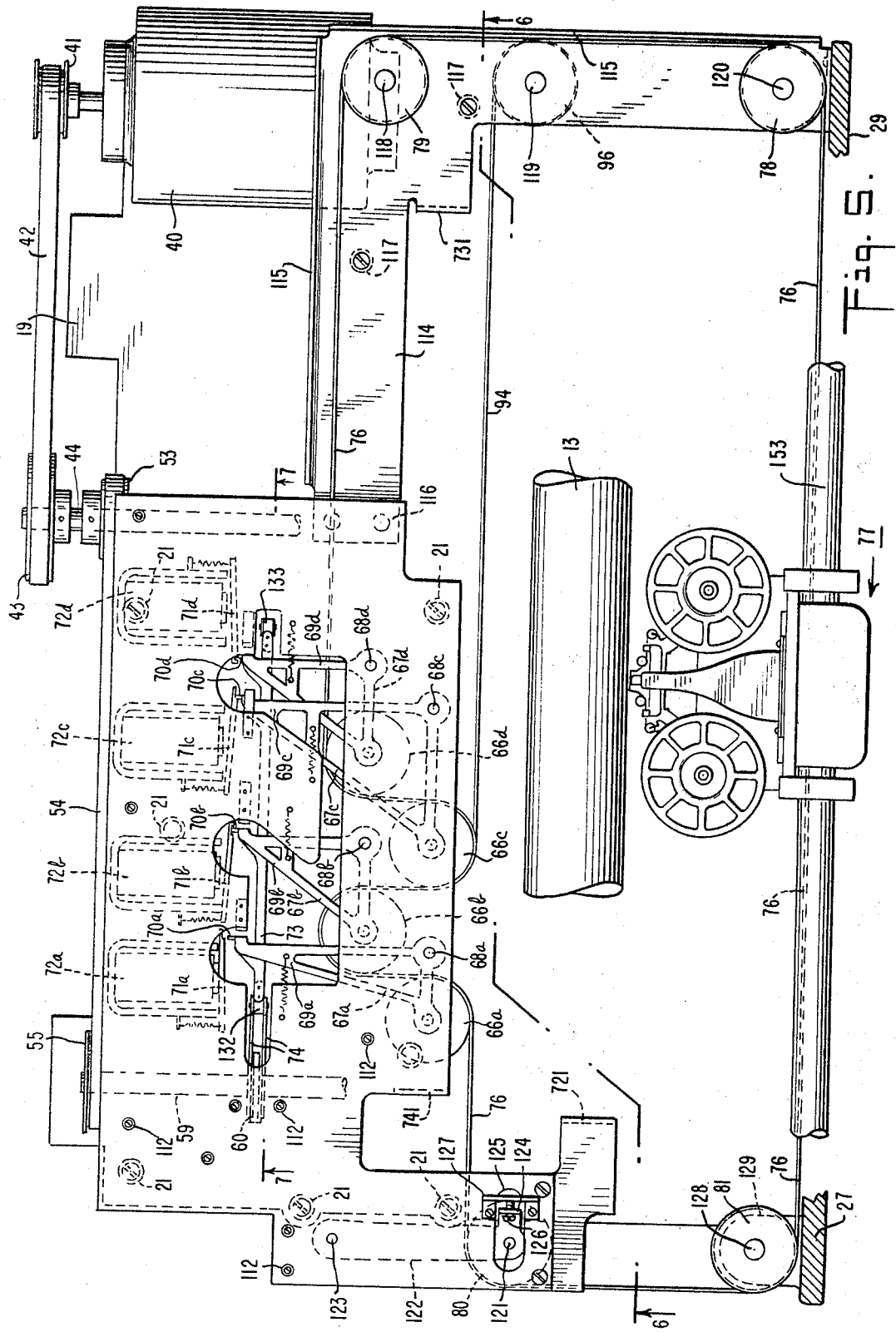

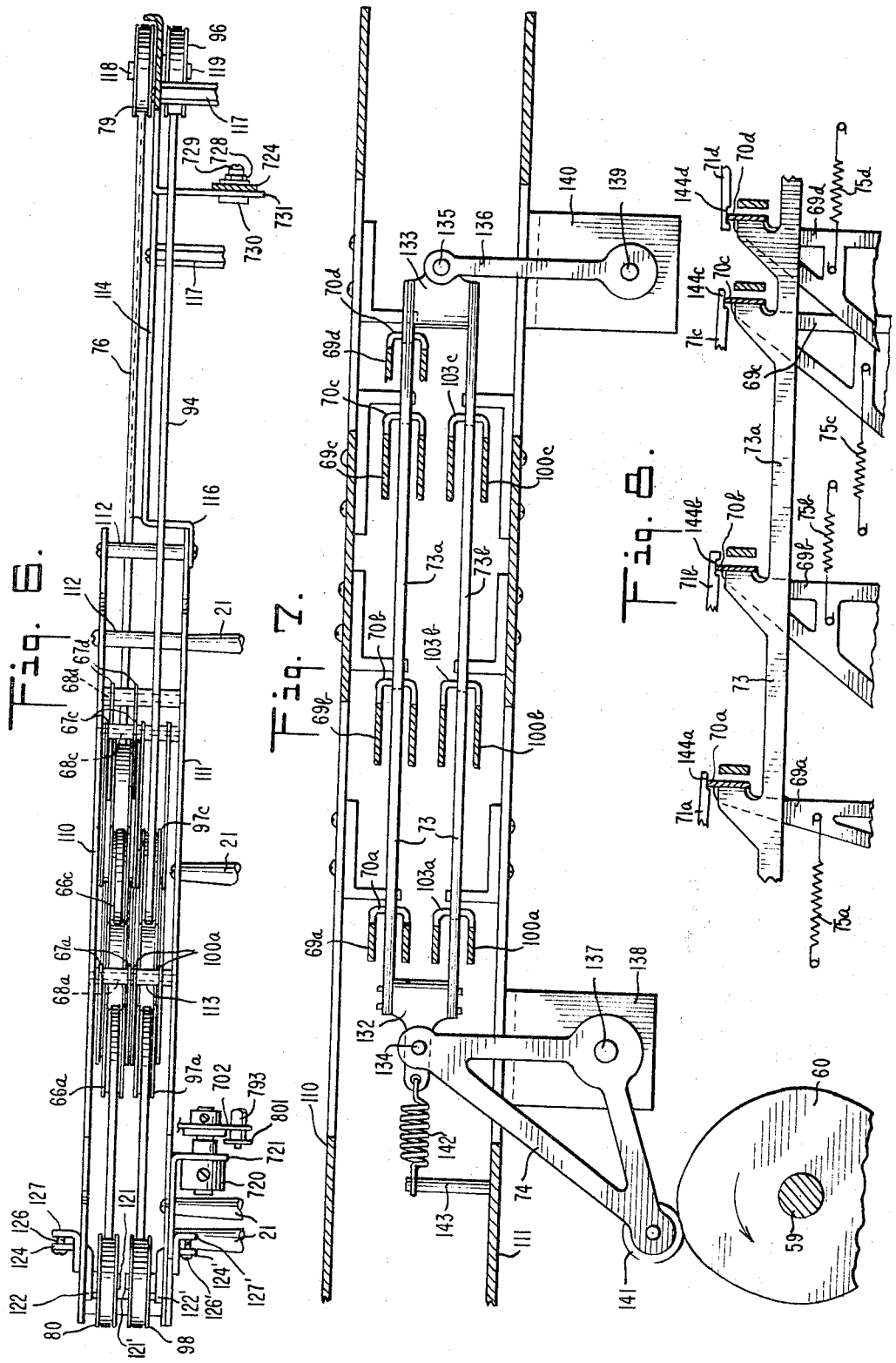

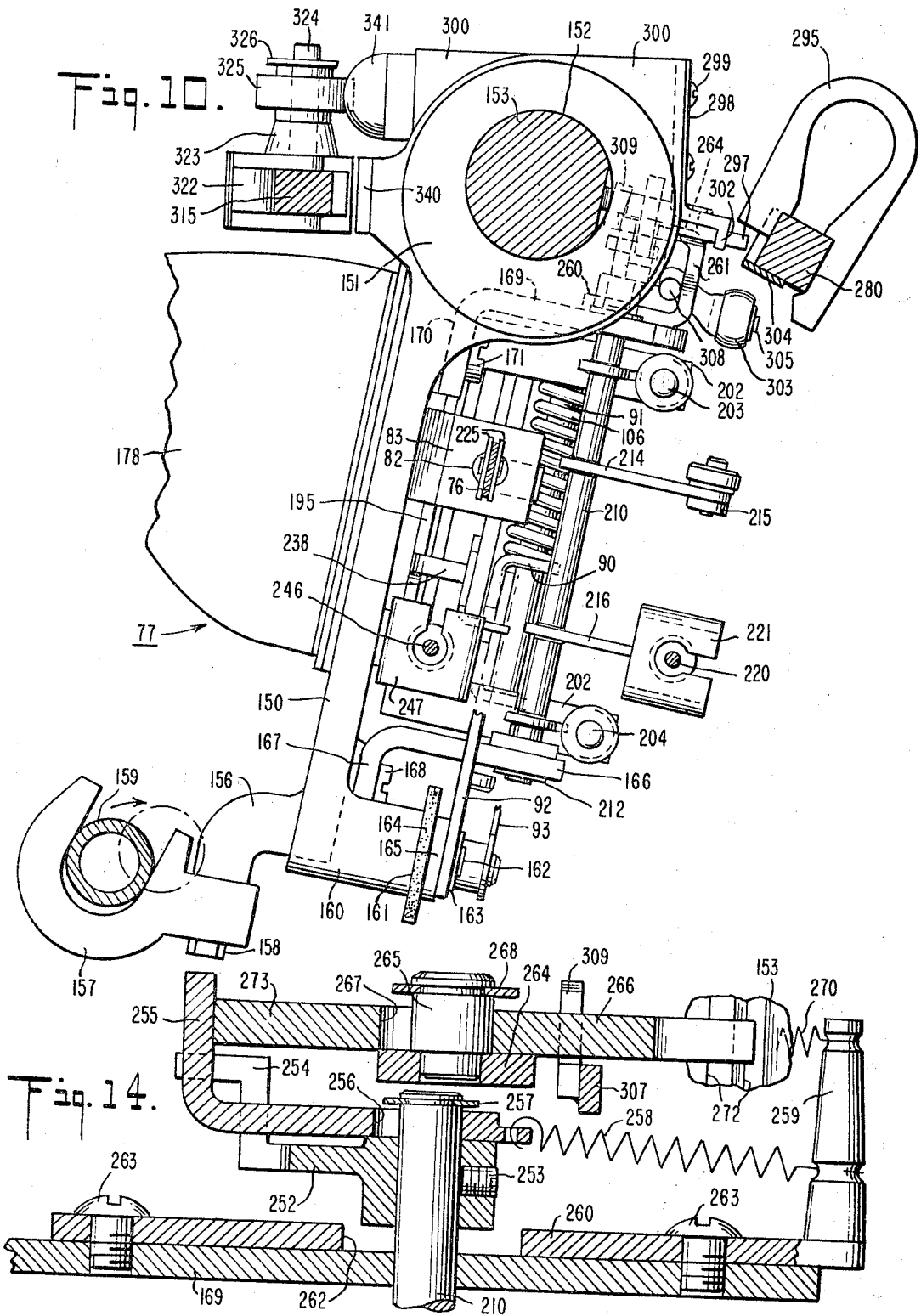

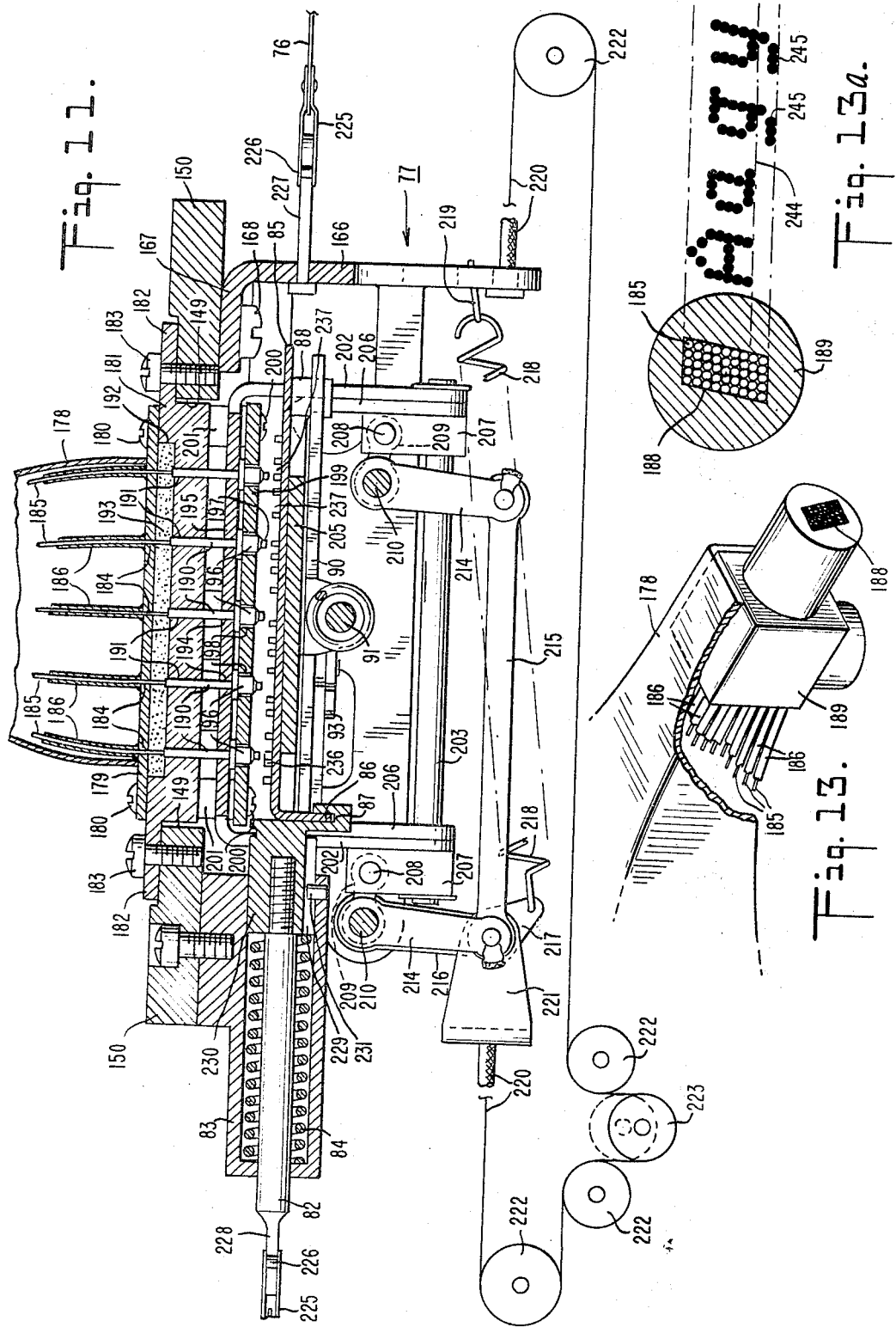

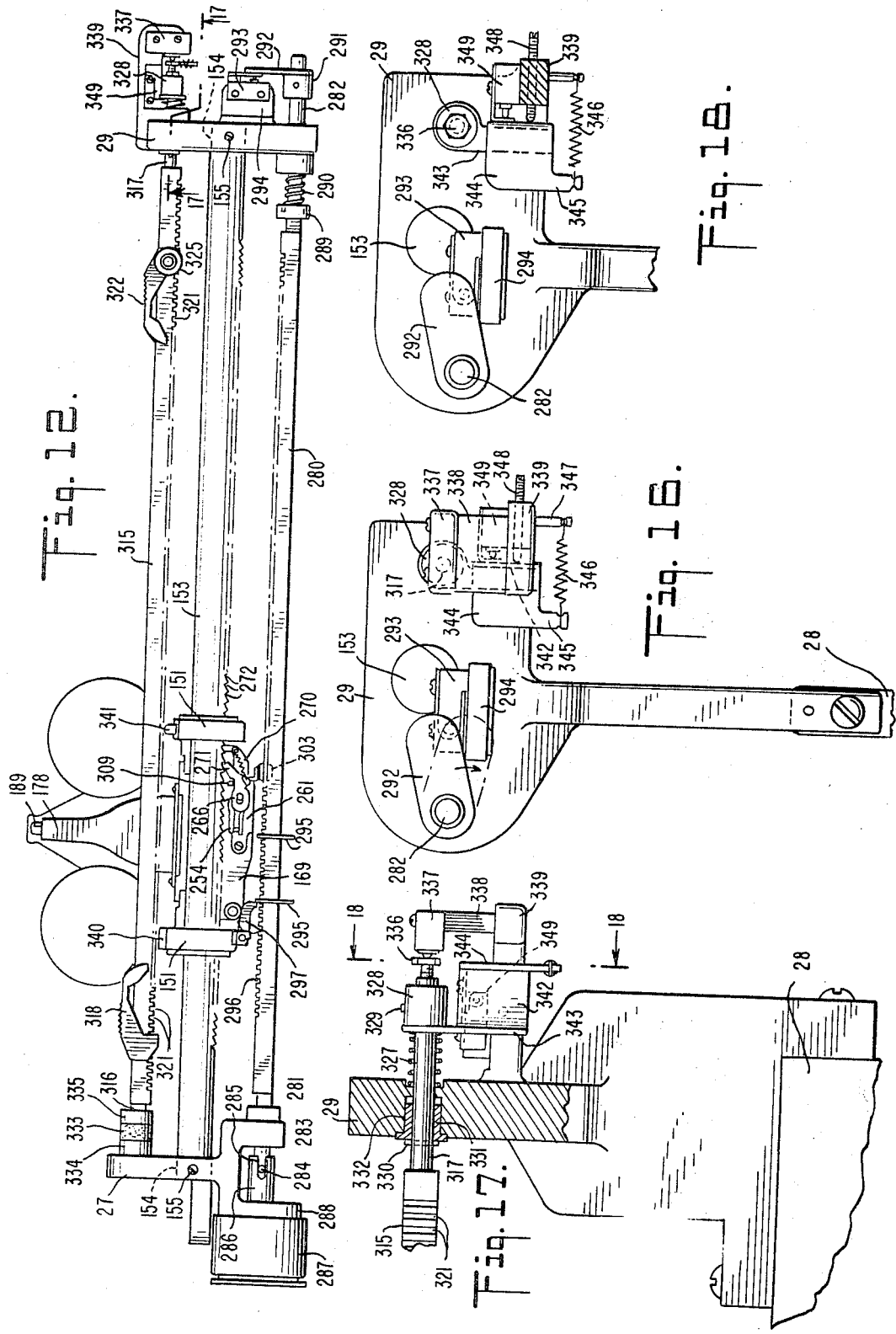

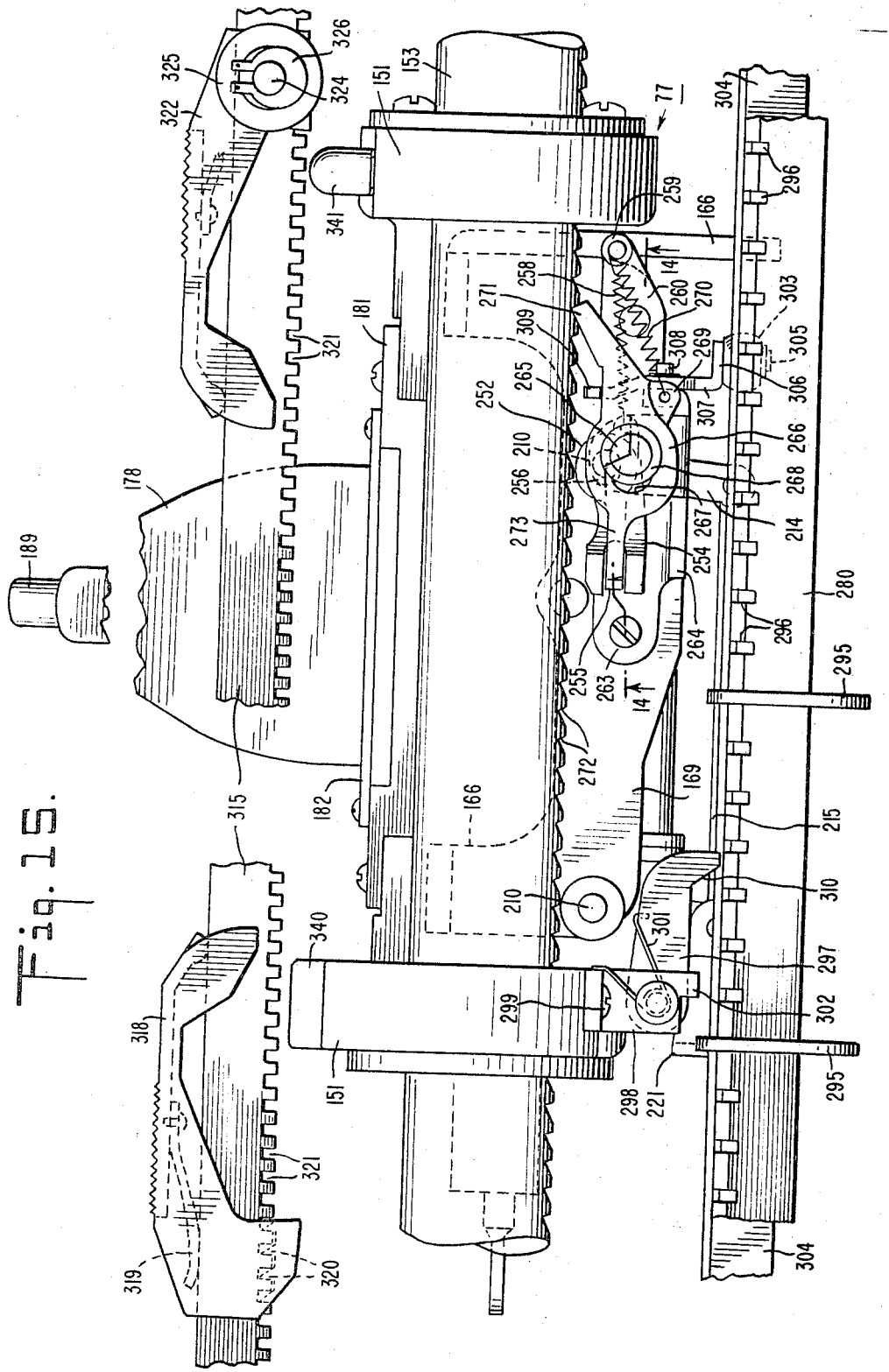

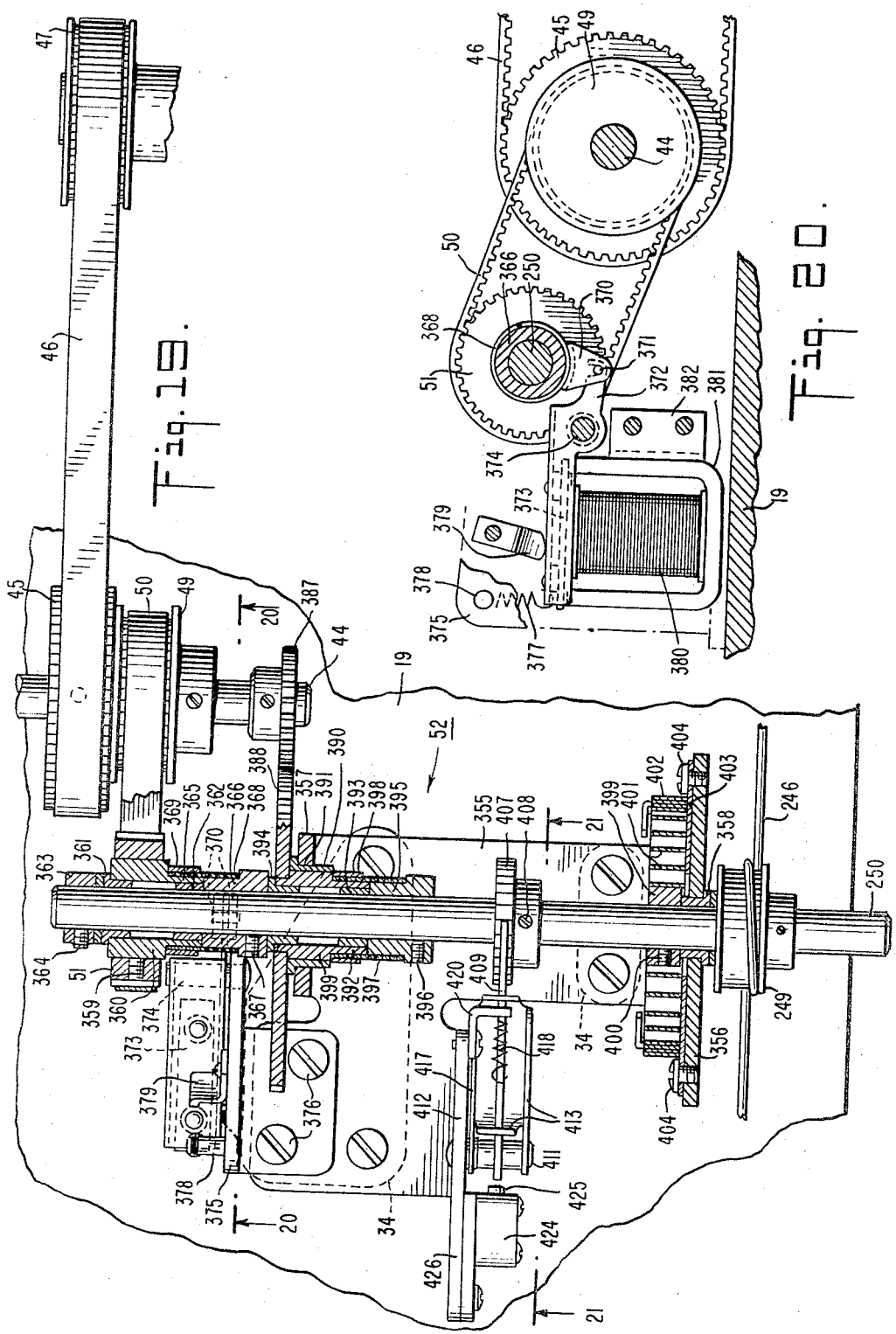

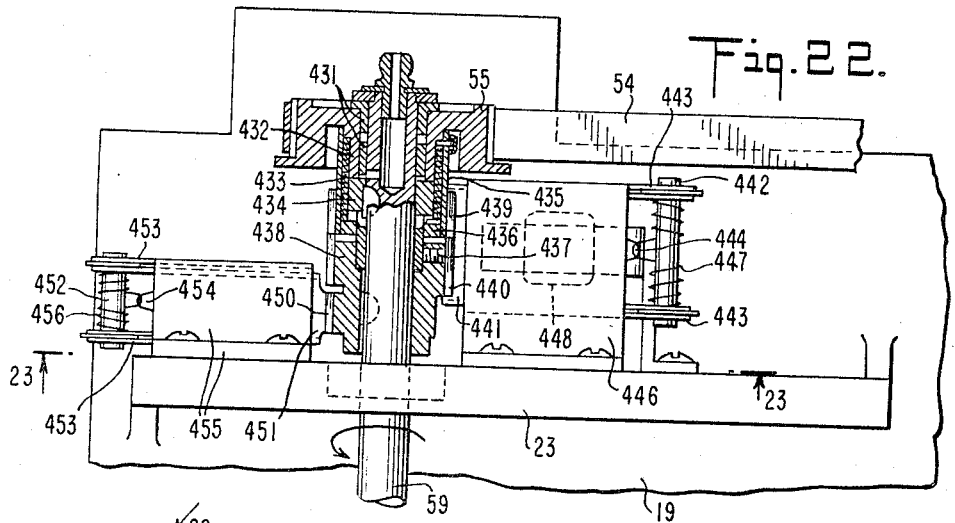
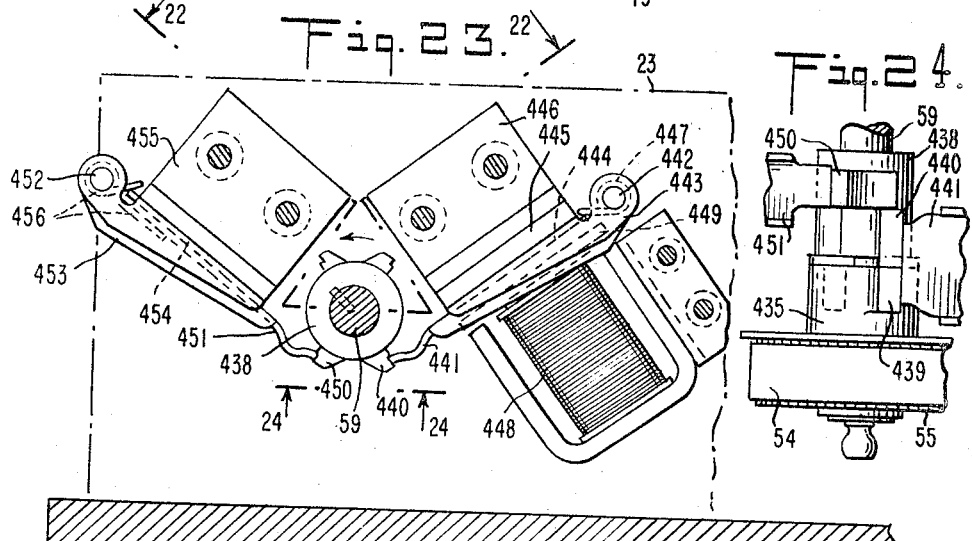
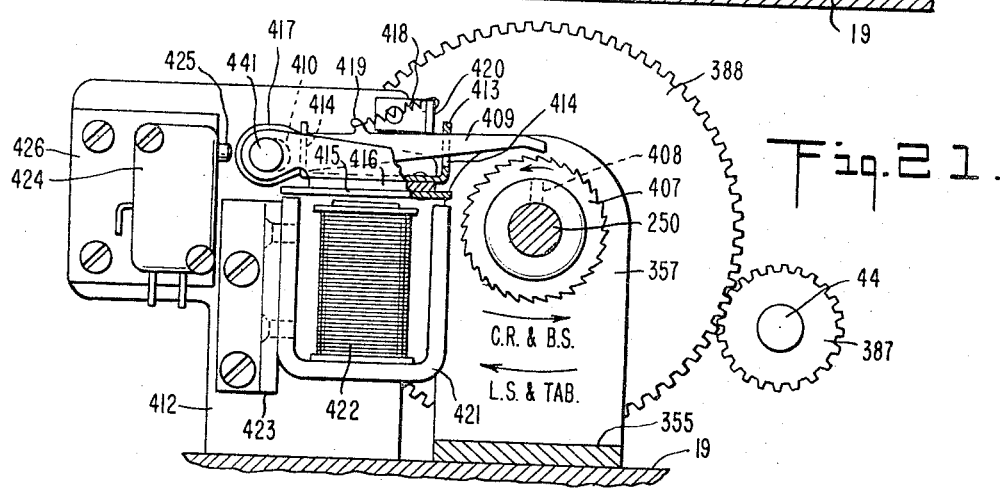

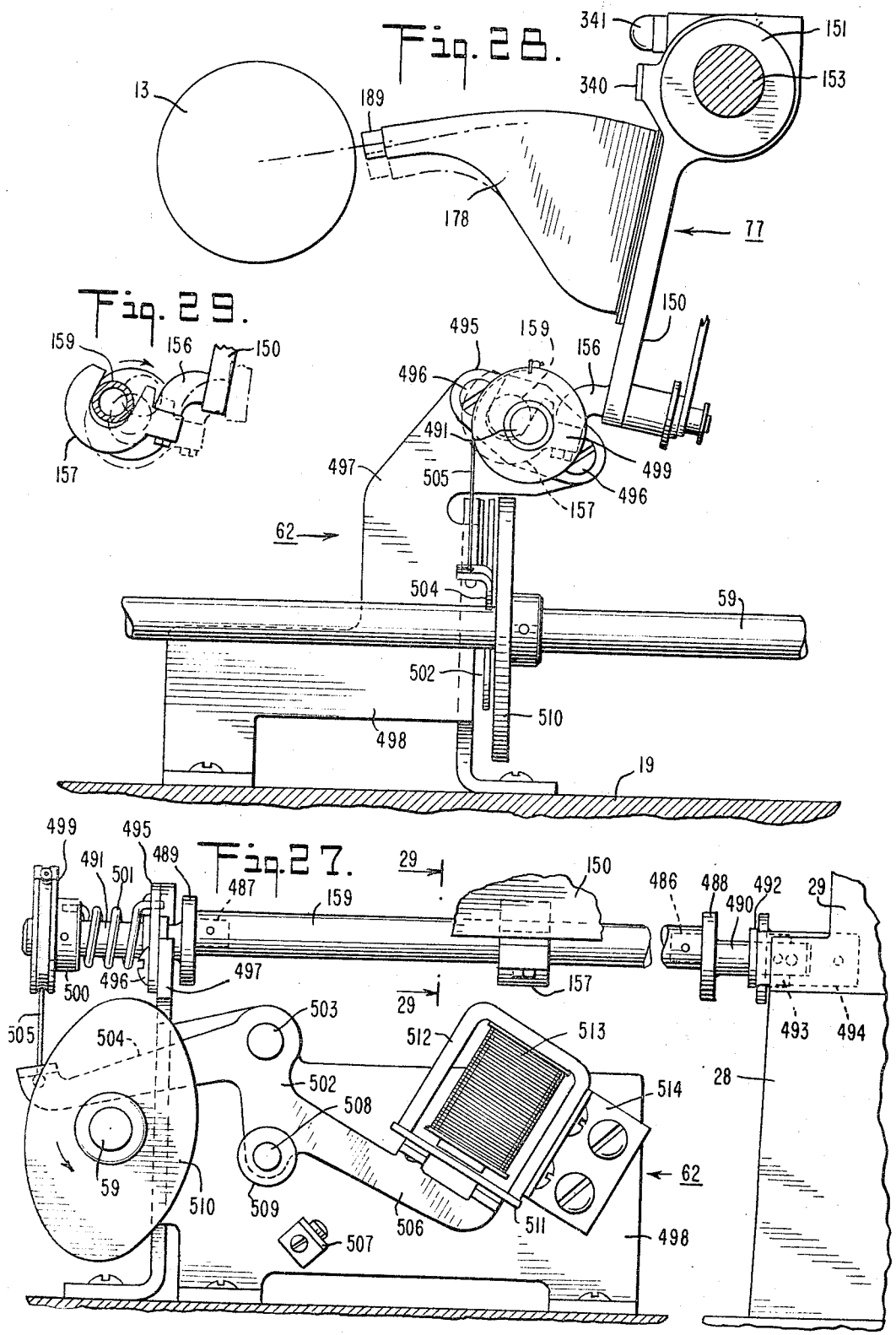

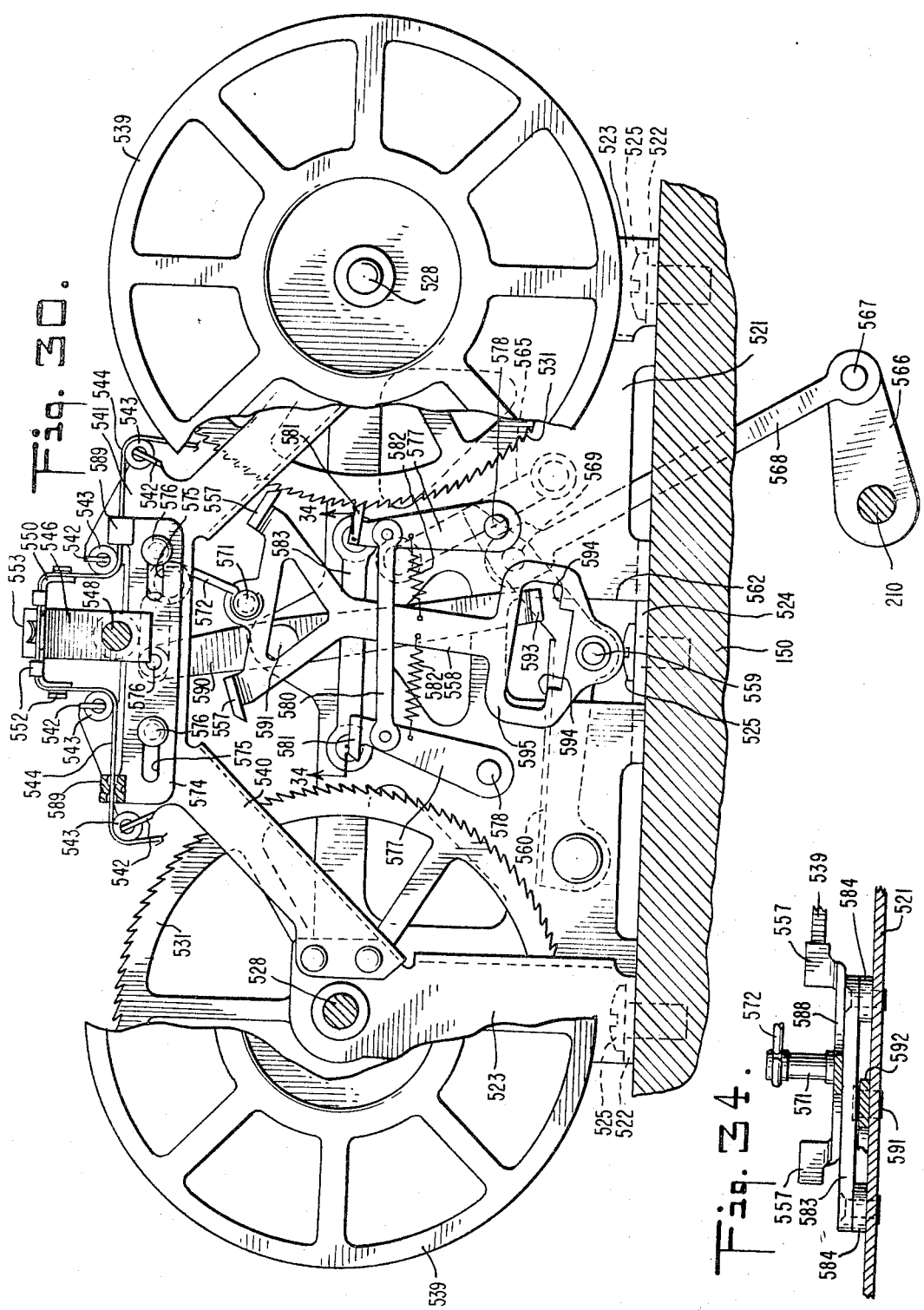

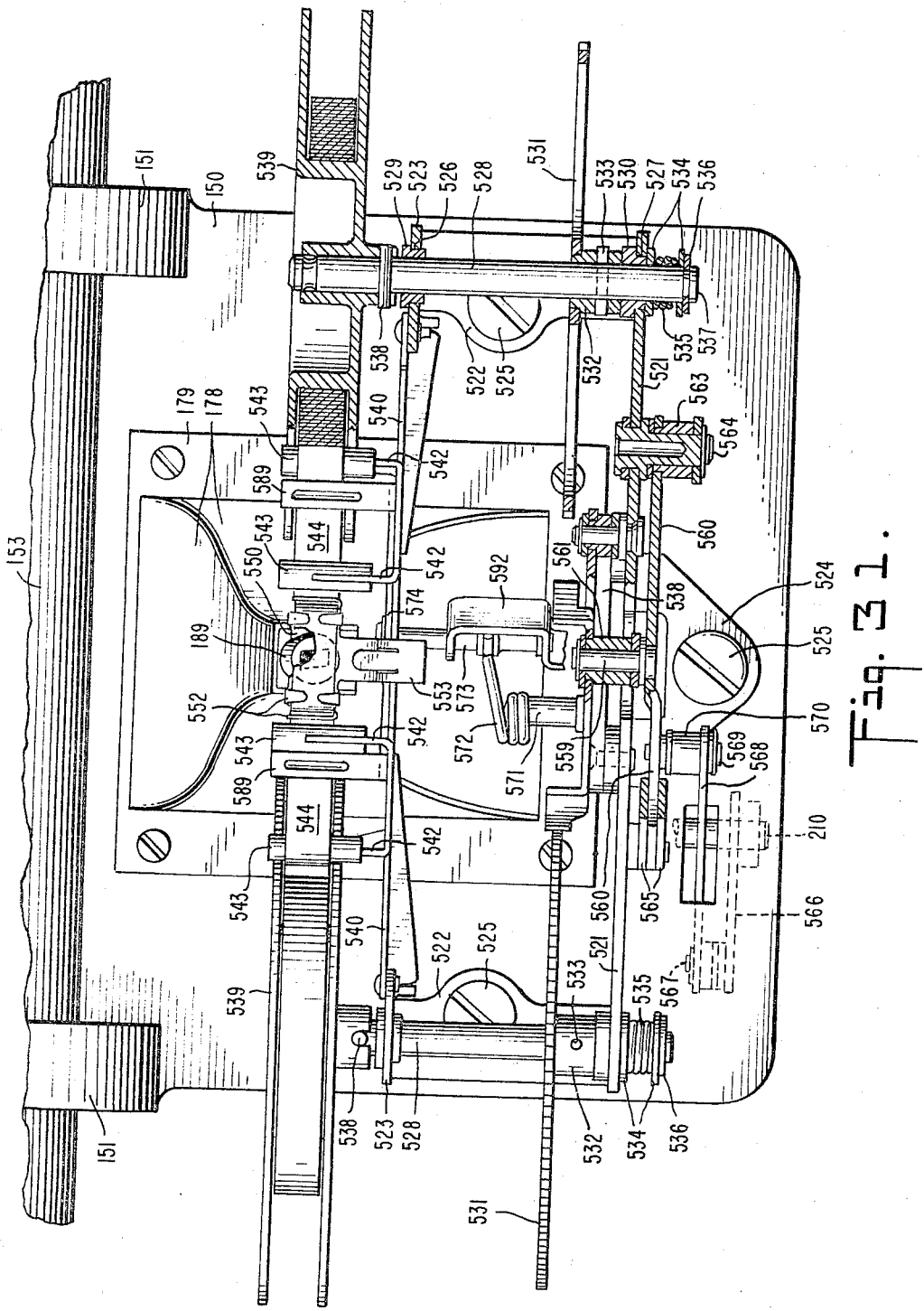

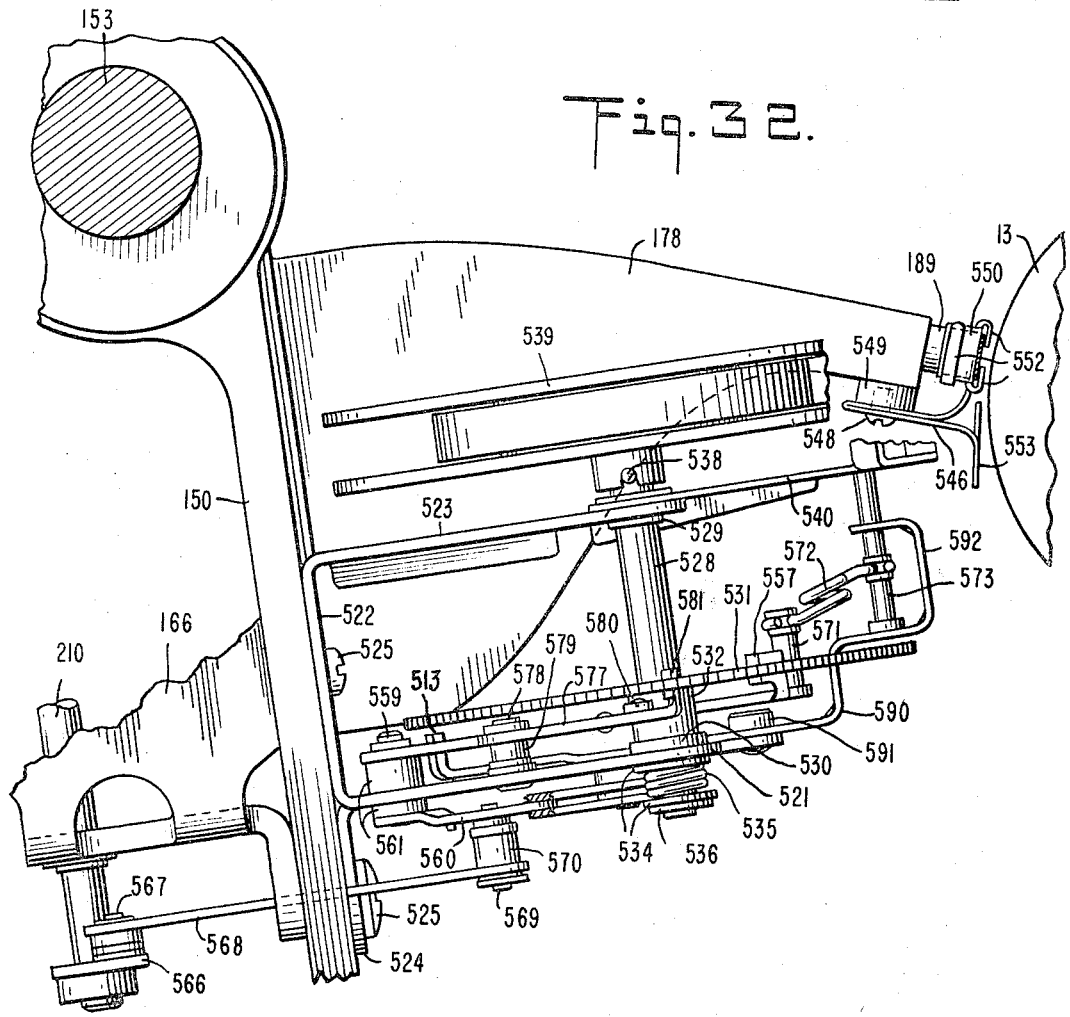
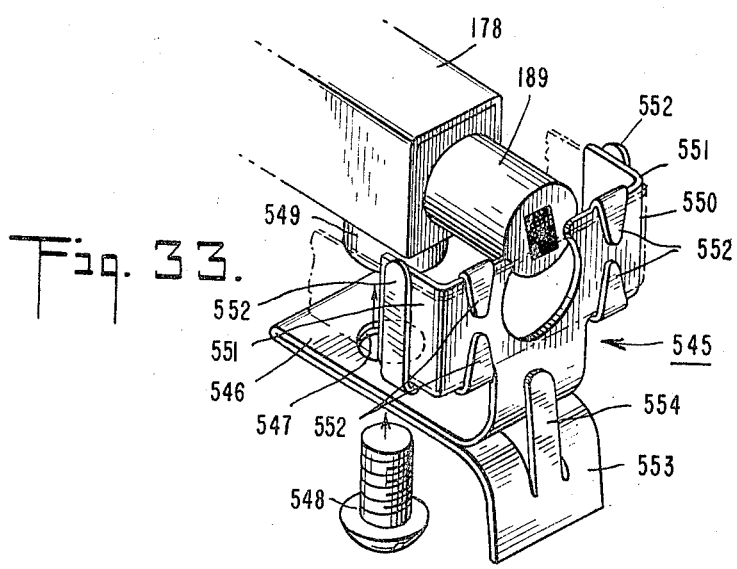

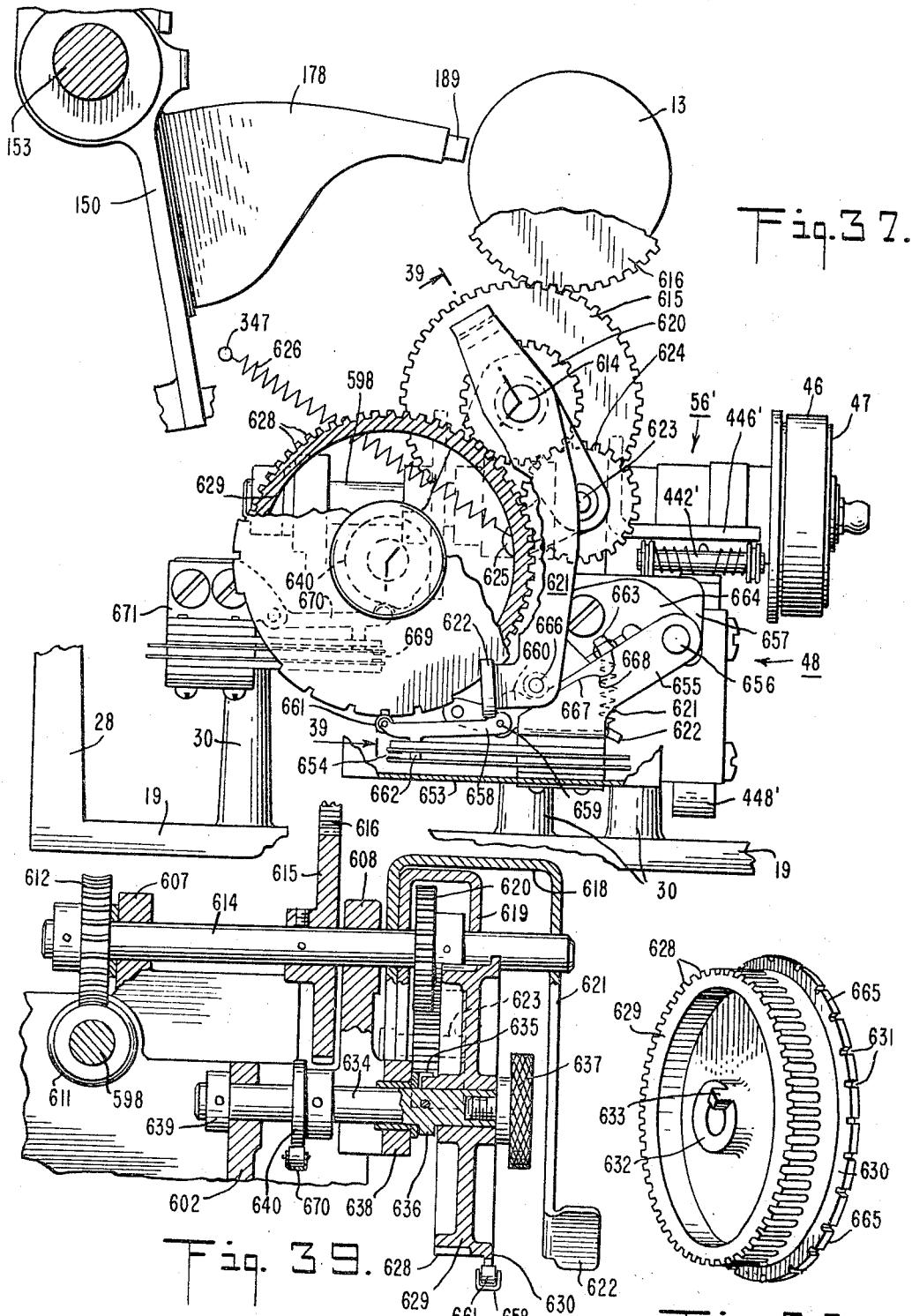

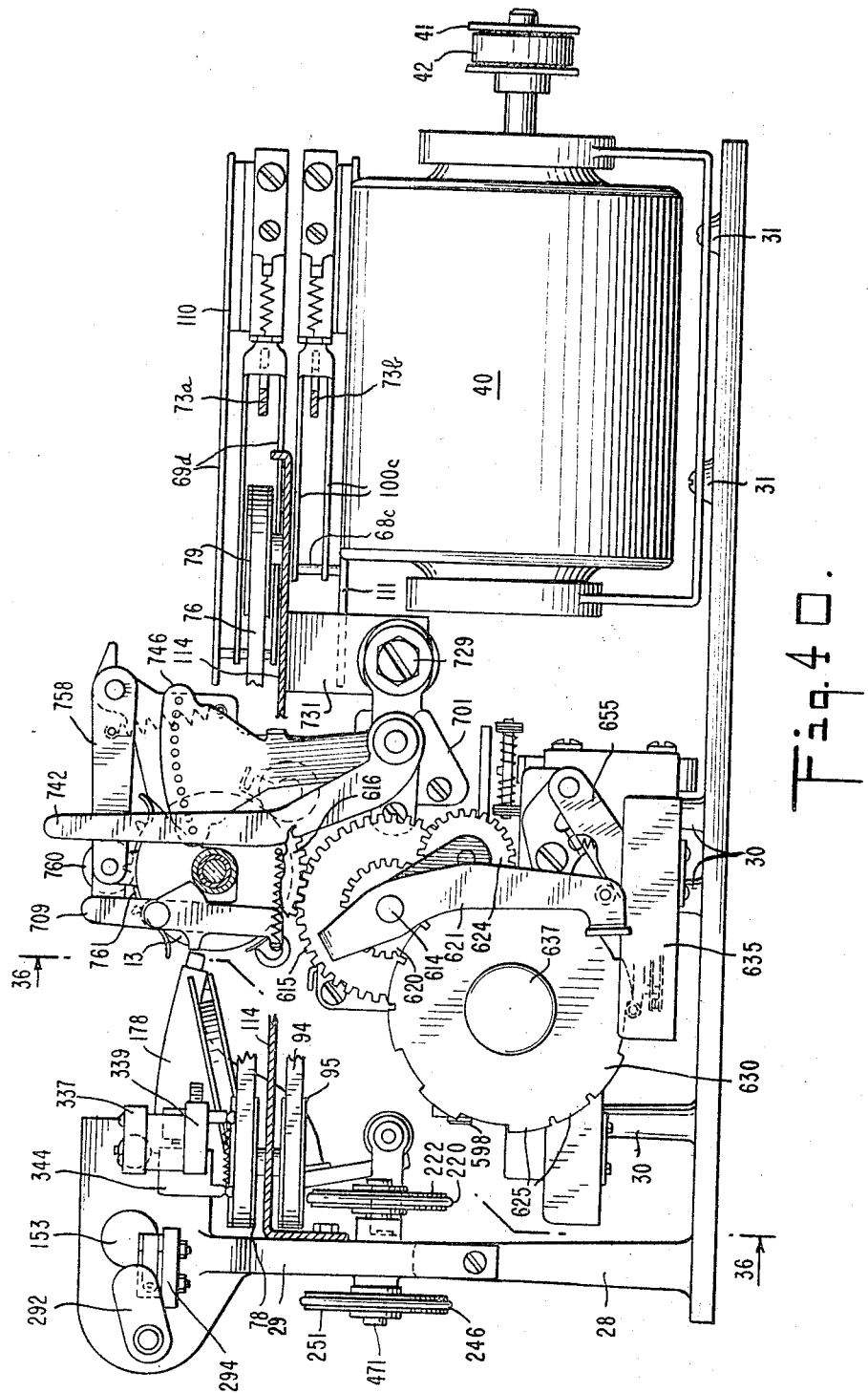

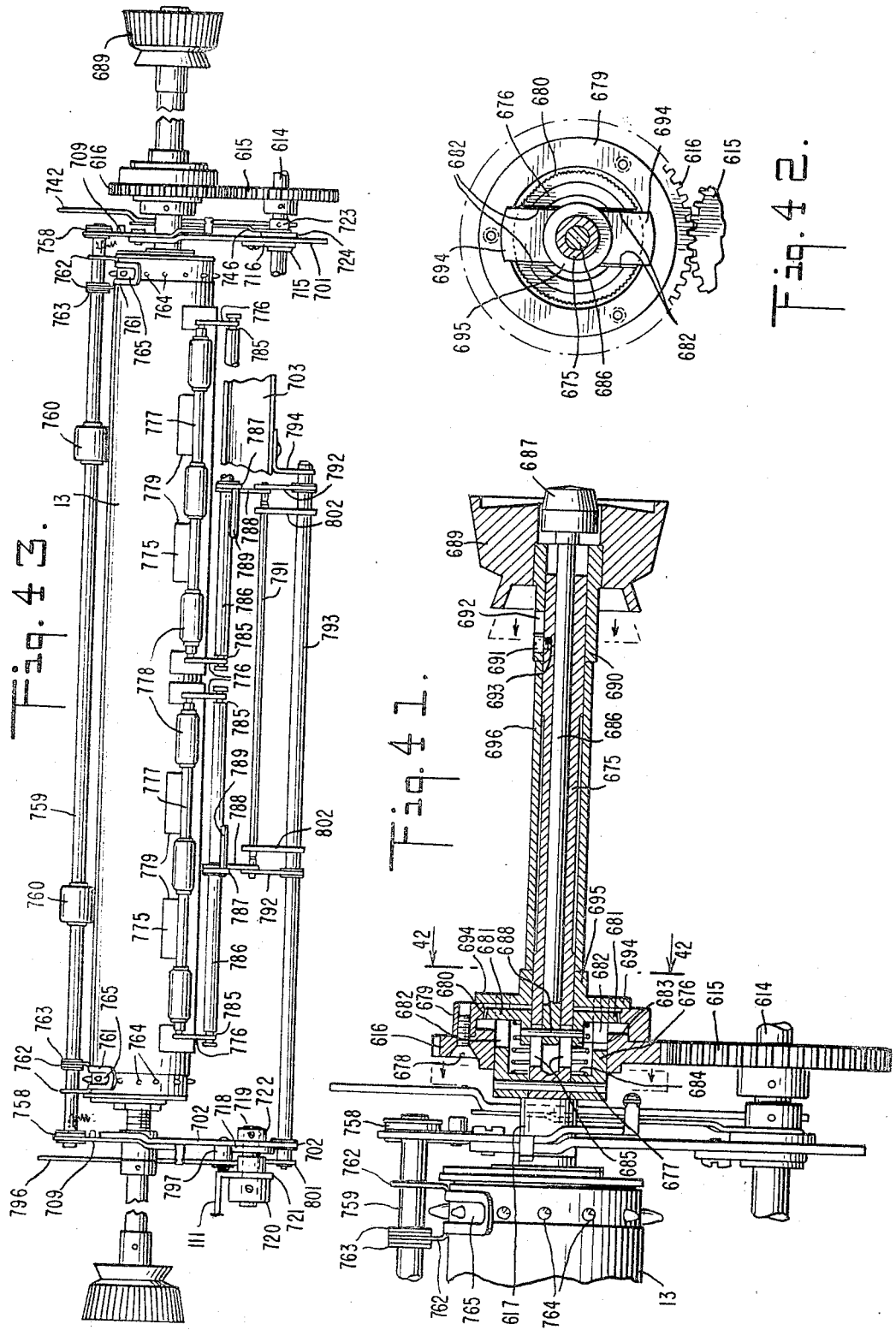

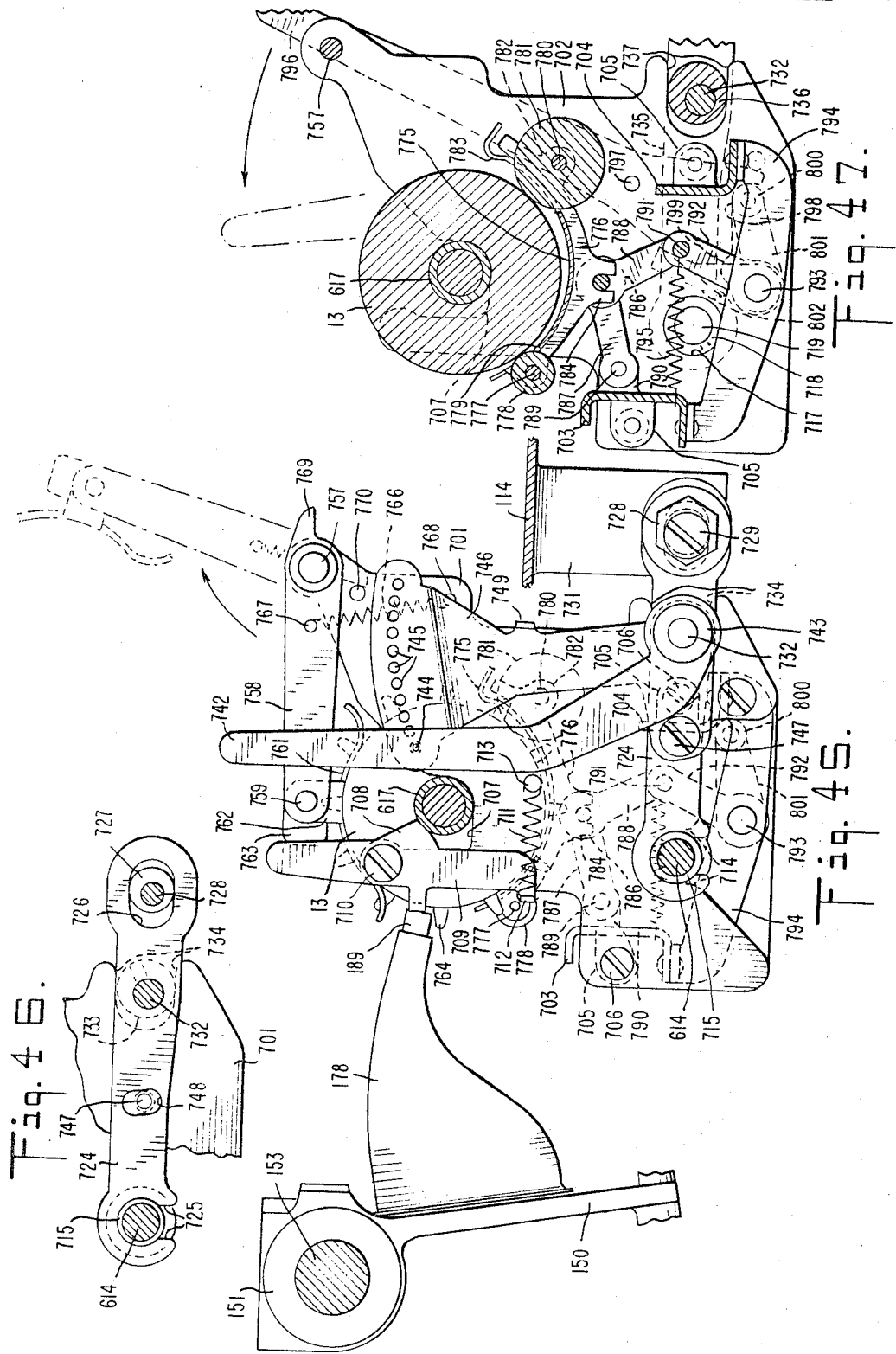

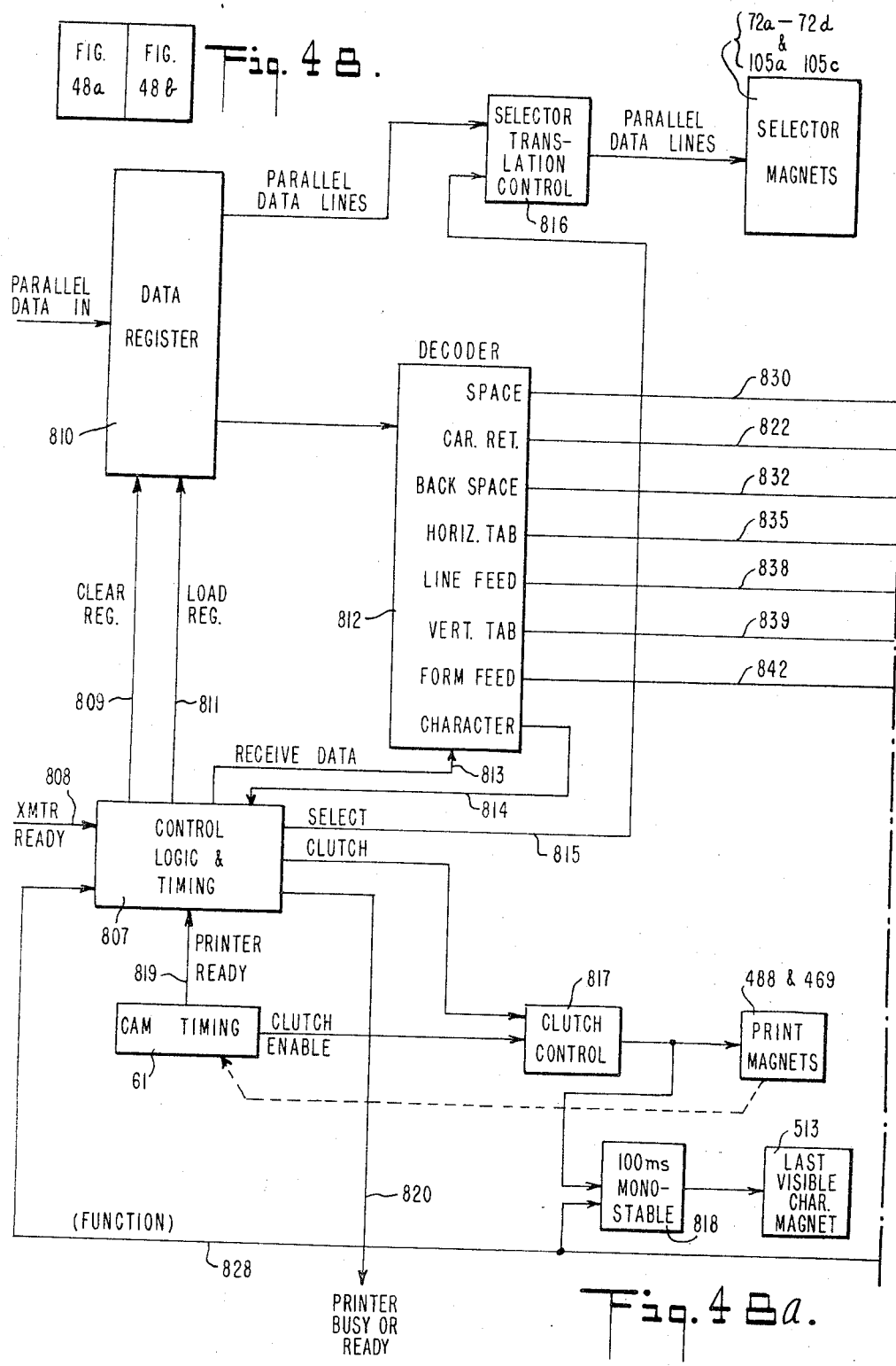

3,426,880
SERIAL CHARACTER MATRIX PAGE PRINTER
Edwin O. Blodgett, Rochester, N.Y., assignor to Friden, Inc., a corporation of Delaware
Filed Apr. 14, 1967, Ser. No. 630,904
U.S. Cl. 197—1
Int. Cl. B41j 5/38, 7/34
35 Claims

ABSTRACT OF THE DISCLOSURE

A serial character matrix page printer has a stationary platen and a wire-matrix print-head carrier supported and guided by a rail for movement longitudinally of the platen in printing a line of copy. The print head has a print-wire character-selection plate actuatable between wire-print and wire-selection positions by a pressure plate structure, and the carrier includes a first spring-biased member for actuating the pressure plate structure between print and non-print positions and additionally includes a pair of spring-biased actuating members for actuating the selection plate in individual ones of two perpendicular directions to print-wire character-selection positions thereof. Two idler pulley systems are each provided with a group of pulleys supported upon individual pivotal bell cranks each movable between latchable and unlatched positions for pivotal radial displacement of the pulleys of each group relative to the other pulleys thereof. A third idler pulley system includes a third pulley group having one pulley supported upon a pivotal bell crank movable between latchable and unlatched positions for pivotal radial displacement of the one pulley relative to the other pulleys of the group. A pair of elongated flexible bands extends over the pulleys of individual ones of the first and second pulley systems and have the ends of each secured between the carrier structure and an individual one of the selection-plate actuating members at points thereon spaced along a line substantially parallel to the rail. A third elongated flexible member extends over the pulleys of the third pulley system and has its ends secured between the carrier structure and the pressure-plate-structure actuating member at points thereon spaced along a line substantially parallel to the rail. Each of the flexible bands is tensioned by spring-bias force exerted thereon by the associated actuating member. A print cycle control cam initiates and terminates each character print cycle with all of the bell cranks concurrently positioned in their latchable positions. A latch-control electromagnet associated with the bell crank of the third pulley group permits or restricts displacement of the one pulley of this group effectively to expand and contract the third flexible member and effect a print operation by actuation of the pressure plate structure, and code energizable latch-control electromagnets associated with and individual to the bell cranks of the first and second pulley systems effect print character selection by selection plate positioning under control of effective incremental-step expansions and contractions of the pair of flexible members extending over the pulleys of the first and second pulley systems. Character spacing escapement of the carrier begins after the print wires have been moved a small distance from character impression position toward non-print position, thereby avoiding any blurring of the printed characters by carrier escapement motion.

The printer includes a novel character selection plate and a novel method of utilizing it. The character selection plate is fabricated to effect printing of numerals, punctuation, and a full alphabet of both upper-case and lower-case characters accurately aligned upon a print line and in respect any depending portion of a lower-case character and of punctuation to effect printing of such portion in descending relation below the print line. This is accomplished simply by the selection plate and its character-selection positioning without the need for special shift control of the print head as between upper-case and lower-case selection of alphabetic characters, numerals, punctuation and symbols.

The present invention relates to serial character page printers and, more particularly, to power operated printers which respond to data presented in coded form and automatically print such data in serial character form at desirably high printing rates.

A well-known form of serial character page printer is typified by the conventional office typewriter having a fixed type basket and a longitudinally movable platen. When power operated, and especially when constructed for automatic printing of serial character data such as that supplied in coded form from the reading of a punched tape as in applicant's U.S. Patent No. 2,700,446, a character print rate of the order of twelve to fifteen characters per second is attainable. This printing rate is appreciably lower than desirable for many applications, and often places a limit upon presentation at higher available rates of serial character data for printing.

One factor which places such limitation on the printing rate of printers of the type just considered arises from the limited rate at which type bars can be operated through a reciprocal cycle of angular motion from rest to print position and return to rest without interference between two type bars in motion. It has been proposed that an increase in printing rate be attained by using in lieu of type bars any one of several forms of print head which is controlled to move in character-space steps longitudinally of a platen.

One such print head heretofore proposed is of the type-box form having elongated and longitudinally movable metal type of rectangular cross-section and arranged in rows and columns of type each having an end type face bearing a print character. Further forms of proposed print heads are comprised by a type stick or cylinder or ball having print characters arranged in circumferential multi-character rows.

The type-box form of print head is controlled to move in type row and column directions to select an individual print character by positioning the corresponding metal type in front of a print hammer, which then strikes the end of the selected type to move it to character-impression position from which the type is restored by spring bias. The type stick or cylinder form of print head is controlled to select a print character by moving the stick or cylinder longitudinally concurrently with angular rotation thereof, and character selection in the ball form of print head is effected by tilting the axis of the ball with concurrent angular rotation about its axis. After character selection positioning, the print stick or print ball is physically moved to make character impression impact with paper wrapped around the platen whereas the print cylinder form of print head cooperates with a narrow print hammer positioned behind and moving to press a paper web or tape into print impression with the selected character.

While these print-head forms of proposed printer may attain a maximum print rate of approximately fifteen characters per second, the mechanical structures required in them to accomplish print-head character-selective positioning and cooperating print hammer operation involves an undesirably complex and expensive construction often lacking the requisite degree of sturdiness for reliable operation over prolonged periods and failing to attain precise alignment and spacings of the printed characters on a print line as is desirable for neatness and optimum legibility of the printed copy. These disadvantages and limitations of previously proposed forms of print-head printers are aggravated with increase in the size of the character set required in particular applications such as one requiring a full alphabet of upper-case and lower-case characters, integral and fractional numerals, a substantial number of symbols, and a full complement of punctuation.

While wire matrix print heads have for some years been used in limited substitute for printing type mounted on type bars or the like, the complexity of print head control to effect print wire character selection and print impression has generally limited their use to applications other than page printers. In particular, the application of such print heads has usually been limited to printers of the form wherein the print head remains stationary and the paper stock to be printed upon is moved past the stationary print head as in interpretive printing of characters along the edge of a tabulating card or paper tape which records the characters in punch-coded form. Typical of such applications is that disclosed in the Blodgett et al. United States Patent No. 3,082,687.

It is an object of the present invention to provide a novel serial character matrix page printer having a substantially higher serial-character printing rate than has heretofore been readily attainable.

It is a further object of the invention to provide a new serial character matrix page printer wherein a wire matrix print head longitudinally traverses a stationary platen and one wherein print-wire character selection and print impression with uniform character spacings and precise alignment on a print line is easily, readily and precisely effected at high serial-character print rates.

It is an additional object of the invention to provide a novel serial character matrix page printer of unitary self-contained form and one characterized by quiet operation and such sharply outlined and firm character print impression as to enable reproduction of highly legible print copy with equally legible multiple carbon copies.

It is yet a further object of the invention to provide a serial character matrix page printer which provides print copy having enhanced and more perceptive readability by oblique printing of a full alphabet of upper-case and lower-case characters, numerals, symbols, and punctuation, and one having maximized simplification of mechanical structure wherein the available character set may be easily and readily increased as desired without the addition of any significant number of mechanical components.

It is an additional object of the invention to provide for a serial character page printer a new and improved wire matrix print head which effects printing of a full alphabet of both upper-case and lower-case characters, numerals, punctuation and symbols precisely aligned upon a print line and with any depending portions of lower-case characters and punctuation descending below the print line, and one which accomplishes this novel result without the need for inefficient and time-consuming shift control of the print head for upper-case and lower-case character selection.

Other objects and advantages of the invention will appear as the detailed description thereof proceeds in the light of the drawings forming a part of this application and in which:

FIGS. 5–8 illustrate more clearly in plan and elevational cross-sectional views the mechanical structure schematically shown in FIG. 4;

FIGS. 9–11 show in elevational, end and cross-sectional views the construction of a wire matrix print head and associated carrier utilized in the printer, and FIG. 12 illustrates in plan view the carrier support and its cooperative arrangement with horizontal tabulation and paper margin control structures included in the printer;

FIG. 13 illustrates certain details of construction of the print nose portion of the wire matrix print head employed in the printer, and FIG. 13a illustrates a unique print result attained by use in the print head of a novel character selection plate and novel method of its utilization;

FIGS. 14 and 15 illustrate in elevational cross-section and plan views the construction of a novel letter-escapement structure utilized in the printer for effecting letter-escapement spacings of the print-head carrier;

Figure 48B:
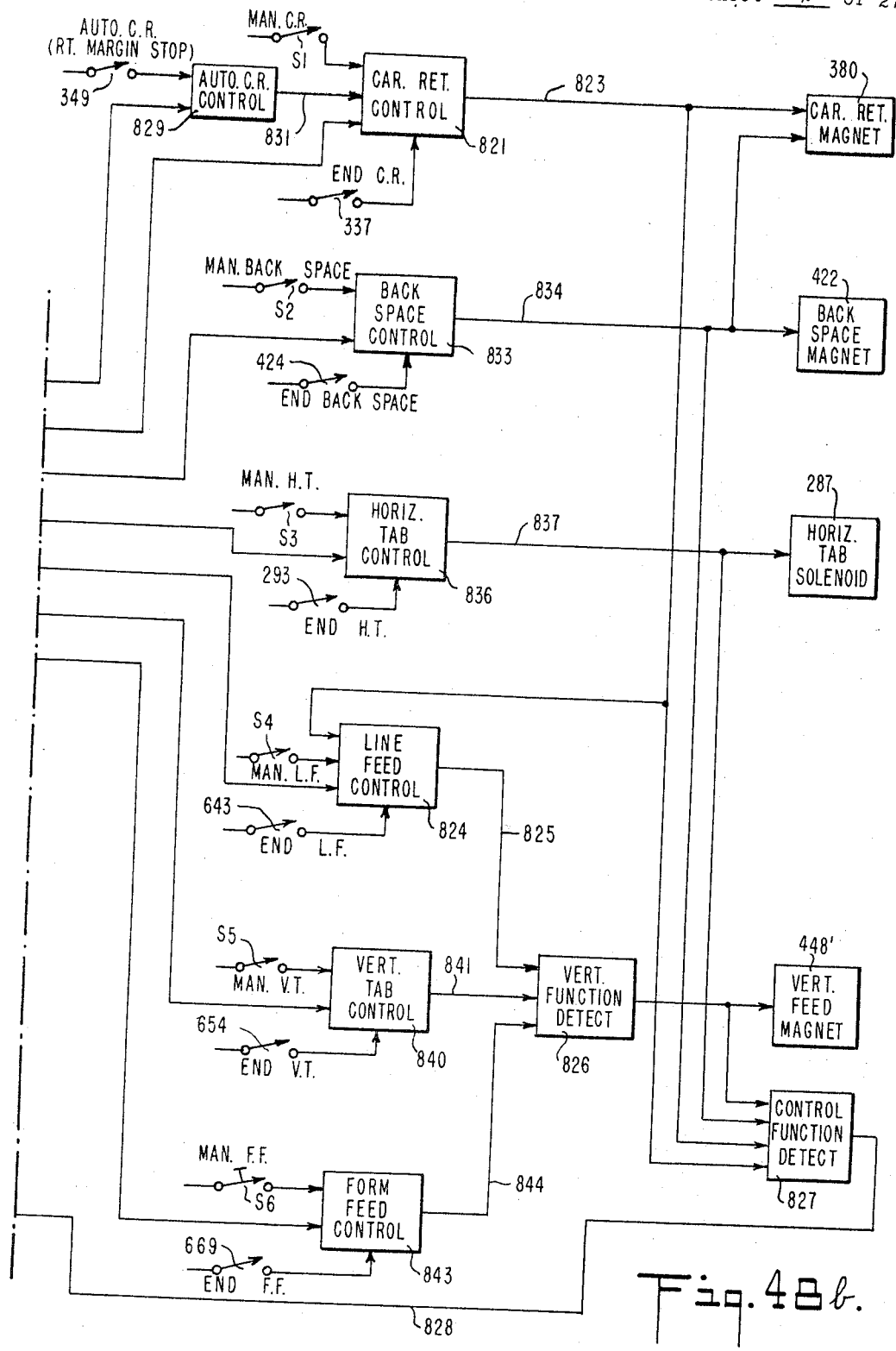

FIGS. 16–18 in conjunction with FIGS. 12 and 15 illustrate a novel horizontal-tabulation structure and a novel paper margin control structure employed in the printer herein described;

FIGS. 19–21 show the print-head carrier spring-motor and power drive structures used for character and tabulation spacing, for carrier backspacing, and for carrier return to the left-hand paper margin;

FIGS. 22–25 illustrate the printer power driven print-cycle control structures;

FIGS. 26–29 show the construction of an arrangement for controlling the print-head carrier to attain visual inspection of the last character printed;

FIGS. 30–34 illustrate the construction of a print ribbon feed structure utilized in the printer;

FIGS. 35–40 illustrate a novel structure for rotational power drive of the printer platen to effect line spacing, vertical tabulation and form feed platen operations;

FIGS. 41 and 42 illustrate constructional details of the printer platen permitting both coarse and fine manual rotational positioning thereof to a desired print line;

FIGS. 43–47 illustrate the support structure for the printer platen including manually adjustable control thereof to accommodate different thicknesses of paper wrapped about the platen and manual control of paper guide structures used in initially inserting paper into position on the platen; and FIGS. 48a and 48b arranged as in FIG. 48 show in schematic form an electrical control system employed in the printer.

In the following description of a matrix page printer embodying the present invention in a particular form, and in the appended claims, reference is made to the selection and printing of characters. The term "character" is used in the present specification and claims in its generic sense as connoting signs, marks and symbols of graphic form and hence will be understood to include alphabetic symbols such as employed in the recording of a language, numerals, punctuation, and other general symbols useful in the graphic expression of information.

Figure 1:
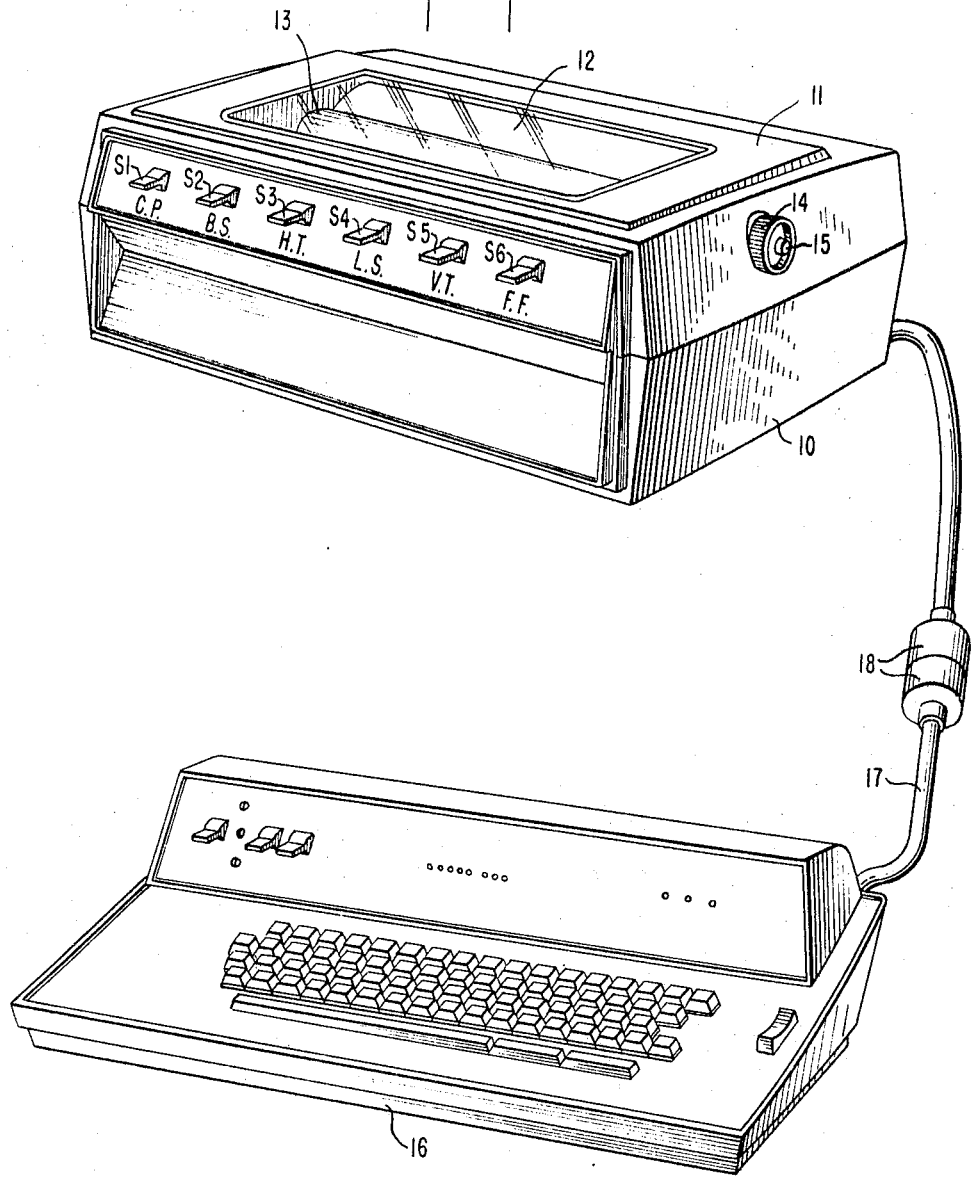
FIG. 1 illustrates the appearance of a unitary self-contained serial character matrix page printer embodying the present invention and shown by way of example as electrically controlled by a manual keyboard which conveniently is fabricated as a unit separate and apart from the printer.

Referring now more particularly to FIG. 1 of the drawings, the printer structure hereinafter described is enclosed within a housing 10 having a rearwardly-hinged cover 11 provided with a glass window 12 to permit visual observation of the progress in printing each line of copy. The cover 11 is manually raised to insert and wrap paper about a platen 13 by manual manipulation of a line spacing knob 14 and interline spacing button 15. A narrow horizontal slot (not shown) extending across the top of the rear wall of the housing permits the supply to the platen of a continuing connected series of duplicate paper forms for successive form printing operations. As will presently be explained more fully, the print operations of the printer are controlled by plural code electromagnets and functional operations of the printer are controlled by control electromagnets energized by an electrical control circuit. The code electromagnets and functional electromagnets may be electrically energized alone and in permutational code combinations by various types of code-recorded information sources, such as a punched tape reader of the type shown in the Blodgett U.S. Patent No. 2,927,158 or, as shown in FIG. 1, by a manual keyboard 16 which is electrically connected to the printer by a cable 17 and electrical connector 18 and which may be of the type disclosed and claimed in the Dannatt pending application Ser. No. 522,873 now Patent 3,327,-828 assigned to the same assignee as the present application. The front panel of the housing 10 supports a plurality of manually operable spring-return switches S1–S6 for manual control of printer functions such as carrier return, carrier backspace, carrier horizontal tabulation, line spacing and vertical tabulation spacing of the platen 13, and form feed of the platen 13 by which after completion of printing of one form a new form is moved into printing position on the platen.

Figure 2:
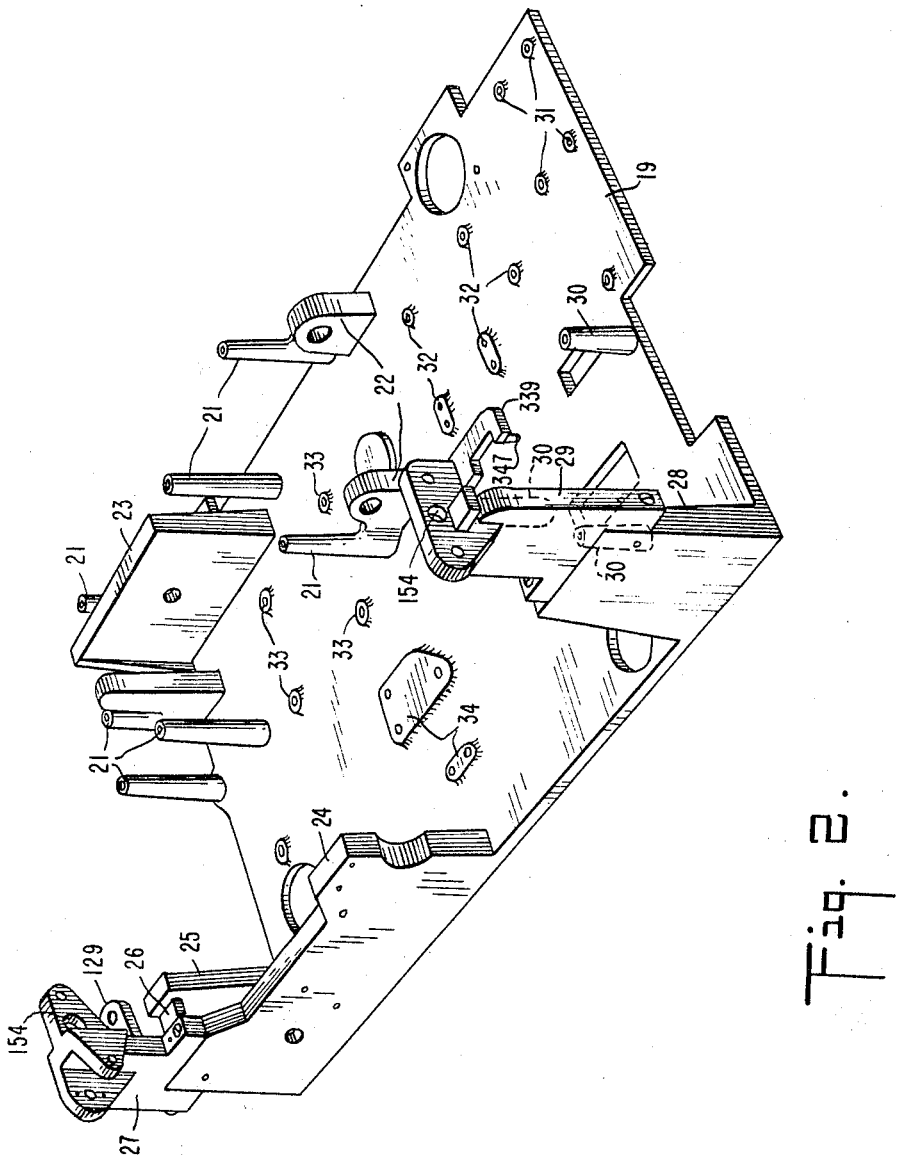
FIG. 2 illustrates in isometric view a cast metal baseplate structure upon which the printer described herein is fabricated.

The printer herein described is fabricated upon a cast metal base plate 19 having the configuration illustrated in FIG. 2. It includes a plurality of upstanding pedestals 21 which support a code selector assembly hereinafter described, trunnions 22 which journal a power drive jack shaft, an upstanding flange 23 which journals the rear end of a print shaft, and an upstanding flange 24 which journals the forward end of the print shaft and supports certain printer components hereinafter more particularly identified including a print-head pressure-plate actuating cam follower with associated components. A flange 25 with integral bridge 26 provides stiffening reenforcement of the left-hand corner of the flange 24 as shown, and a cast pedestal 27 is secured on the upper left-hand corner of the flange 24. The base plate 19 also includes a right-hand corner flange 28, and a cast pedestal 29 is secured on the upper right-hand corner of the latter. The pedestals 27 and 29 support certain pulleys used in the code selection structure hereinafter described, support the ends of a horizontal-tab control rack, support a paper margin stop rack, and support a print-head carrier support and guide rail all as more particularly described hereinafter. The printer platen is rotationally power driven for line spacing, vertical tabulation spacing, and form-feed spacing and the base casting 19 includes pedestals 30 for supporting the platen power drive assembly hereinafter described. The base casting also includes a plurality of bosses such as drive-motor support bosses 31, electrical control integrated-circuit panel support bosses 32, circuit energizing transformer support bosses 33, and support bosses 34 for supporting a print-head carrier drive structure hereinafter described and which effects carrier character and word spacing, backspacing, and carrier return to initiate new line printing.

Figure 3:
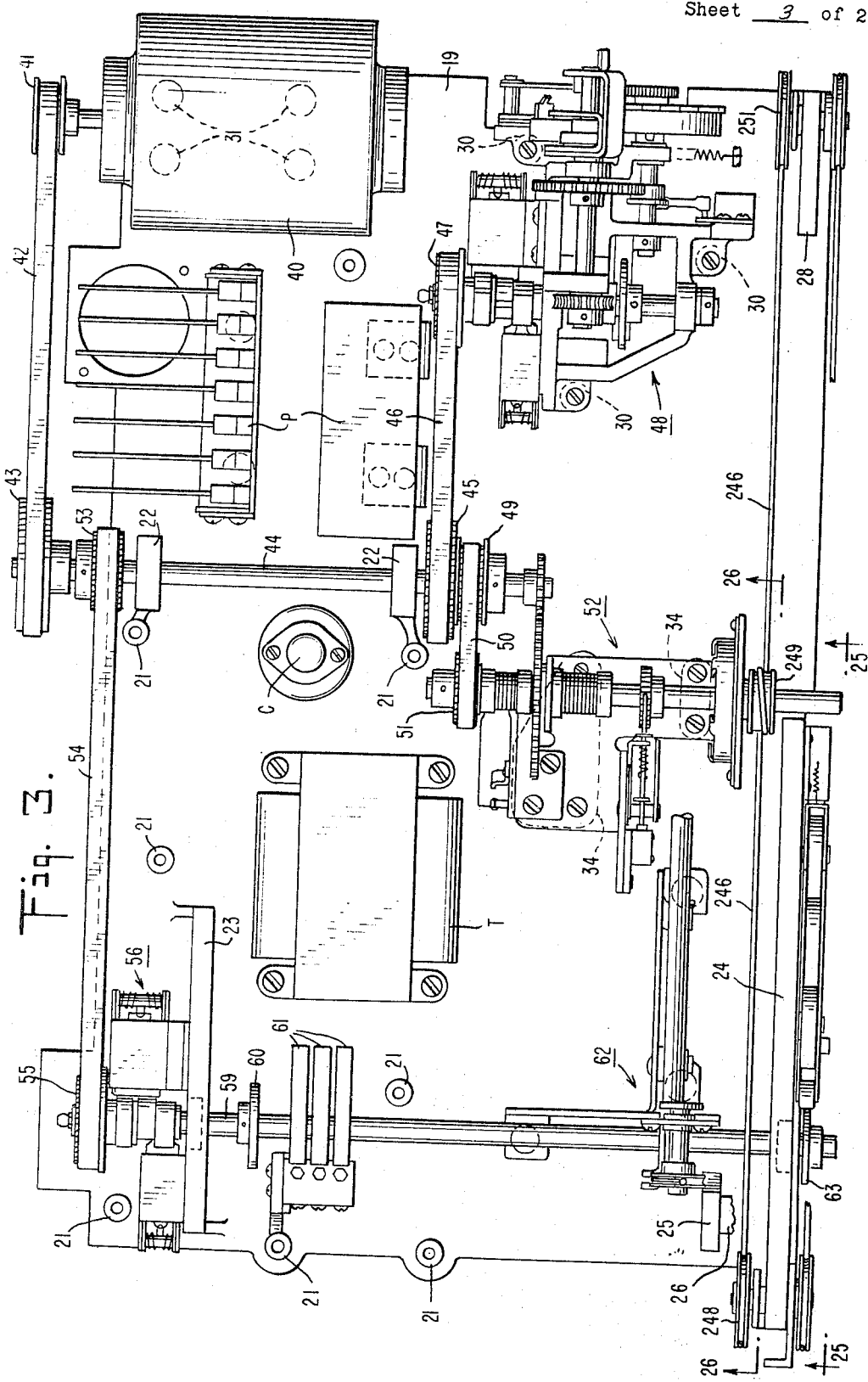
FIG. 3 illustrates in plan view a partial assembly on the baseplate of FIG. 2 of a number of printer components utilized in such printer.

FIG. 3 illustrates an assembly of printer components mounted directly upon the base casting 19 and trunnions and flanges thereof. These components include a source of drive power comprised by an electric motor 40 mechanically connected by pulley 41 and belt 42 to a pulley 43 secured on the end of a power drive jack shaft 44 journaled by ball or roller bearings in the trunnions 22 of the baseplate. Affixed to the jack shaft 44 is a pulley 45 having peripheral transverse grooves and which is mechanically coupled by a ribbed belt 46 to a similar pulley 47 providing mechanical drive of an assembly 48 which rotationally drives the printer platen to effect line spacing, tabulation spacing, and form-feed spacing thereof. Also affixed to the jack shaft 44 is a pulley 49 having transverse peripheral grooves and which is coupled by a transversely ribbed belt 50 to a similar pulley 51 which drives a subassembly 52 more fully described hereinafter and operating to effect print-head carrier bi-directional displacement longitudinally of the printer platen as during character and word spacing, backspacing, and carrier-return operations. Additionally affixed to the jack shaft 44 is a pulley 53 having peripheral transverse grooves and which is coupled by a transversely ribbed belt 54 to a similar pulley 55 driving a 180° helical wire spring clutch 56 having clutch-control components supported upon the flange 23 of the baseplate 19. The clutch 56 is only generally here shown, but is of the type more fully disclosed and claimed in a copending application of Edwin O. Blodgett, Ser. No. 627,377, filed Mar. 31, 1967 and which is assigned to the same assignee as the present application. The clutch 56 is described more fully hereinafter and has rotational components supported upon the end of a print control jack shaft 59 journaled by roller or ball bearings in the flanges 23 and 24 of the baseplate 19 as shown. Secured to and spaced along the length of the jack shaft 59 are a cam 60 which controls certain aspects of the operation of the code selector assembly hereinafter described, a plurality of cams operating electrical contact assemblies 61 of the general type shown in the Blodgett U.S. Patent No. 2,927,158 (and identified therein as cam-actuated contacts CC), a cam (not visible) which actuates a last-character visibility subassembly structure 62, and a cam 63 used as hereinafter described in actuating a wire print-head to effect character printing. Also conveniently supported on the base casting 19 are components of an electrical control system hereinafter described and which may include by way of example an energizing transformer T, a unidirectional power supply filter condenser C, and integrated-circuit panels P.

Figure 4:
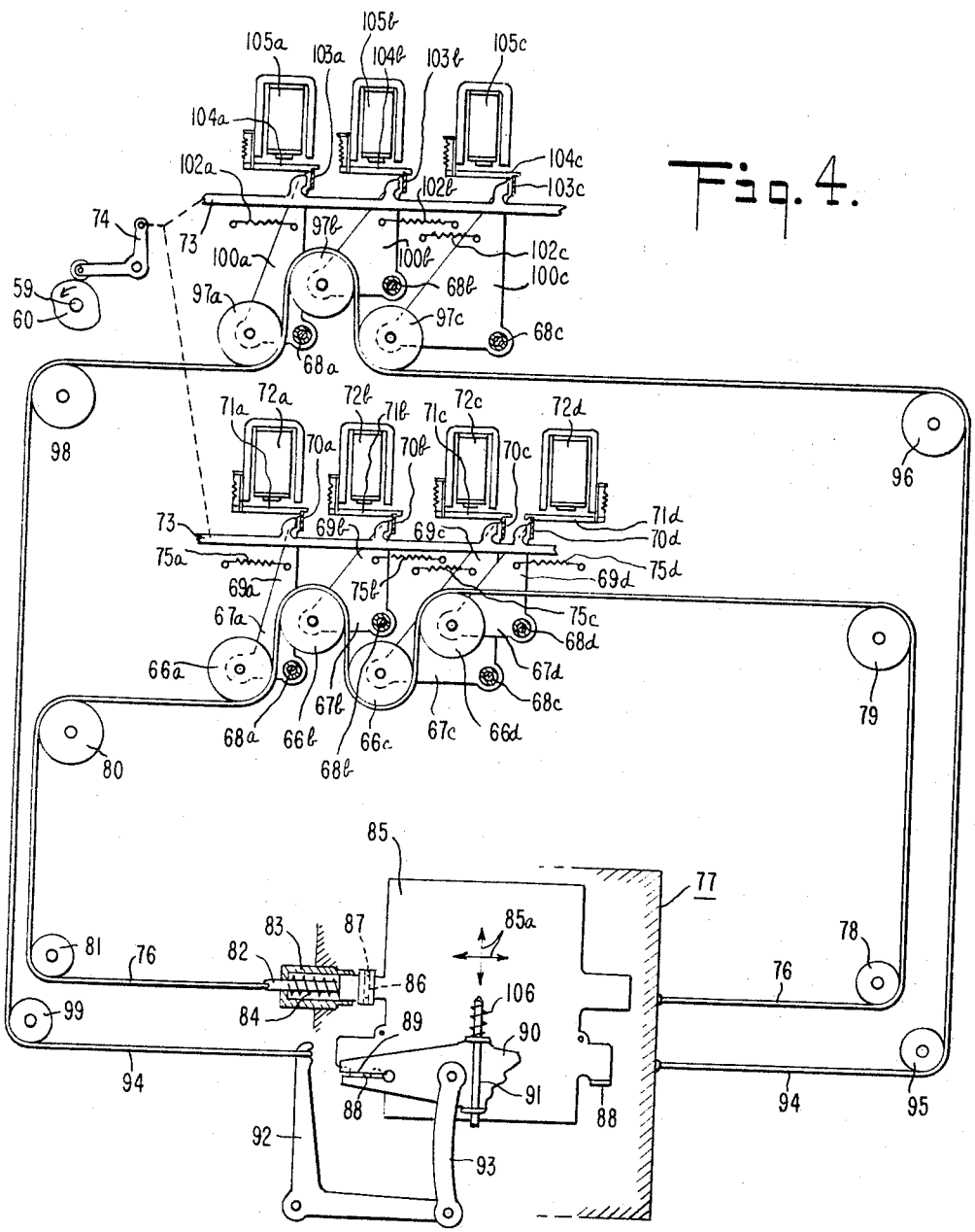
FIG. 4 is a schematic representation of structure used for character-selective control of a character selection plate included in a wire matrix print head utilized in a printer embodying the present invention.

The wire print head mentioned just above includes a character selector plate which is positioned in discrete steps in each of two perpendicular directions to effect selection of individual characters for printing. This positioning of the selector plate is accomplished by the code selector assembly earlier mentioned, but before considering the construction of the latter it will be helpful to refer to FIG. 4 which schematically shows and makes evident the general arrangement and operation of this assembly. The assembly has a first pulley system which includes a plurality of grouped pulleys 66a–66d that are rotationally supported at the end of an arm of a plurality of respective bell cranks 67a–67d pivotally supported on a plurality of respective pin-shafts 68a–68d. The bell cranks 67a–67d have respective arms 69a–69d which terminate at their ends in respective latch portions 70a–70d adapted latchably to be engaged by a latch notch provided in respective pivotally supported and spring biased armatures 71a–71d of respective code energizable electromagnets 72a–72d. At the completion of each print cycle, the bell crank latch portions 70a–70d are concurrently positioned to have latchable engagement with the latch notch of the respective armatures 71a–71d. Such positioning is accomplished by a control slide 73 which is reciprocated by a cam follower bell crank 74 engaging the control cam 60. At the outset of the succeeding print cycle, the control slide 73 under control of the cam followed bell crank 74 and cam 60 moves to the left as seen in FIG. 4 and each deenergized one of the electromagnets 72a–72d will permit its respective armature 71a–71d to maintain the associated bell crank 67a–67d stationary by latched engagement of its respective latch portion 70a–70d with the latch notch of the associated armature 71a–71d. On the other hand, each energized code electromagnet 72a–72d will attract its respective armature 71a–71d to prevent latch engagement of its latch notch with the associated bell crank latch portion 70a–70d thus permitting the unlatched bell crank to pivot counterclockwise as seen in FIG. 4 and follow the control slide 73 under bias of a tension spring 75a–75d associated with the respective bell cranks 67a–67d.

A flexible steel band 76 has one end secured to a print-head carrier structure 77, extends over rotationally supported guide pulleys 78 and 79 included in the first pulley system, is wrapped about the grouped pulleys 66a–66d of the first pulley system as shown, extends over rotationally supported guide pulleys 80 and 81 also included in the first pulley system, and has its opposite end secured to a piston 82 which is guided within a cylinder 83 secured to the print-head carrier structure 77 and is biased by a compression spring 84 to tension the band 76. The piston 82 is mechanically connected, in a manner presently to be described, to a print head character-selection plate 85 which is supported in the print head carrier structure 77 for horizontal and vertical displacements from at-rest or home horizontal and vertical positions as indicated by the arrows 85a. Such mechanical connection causes the piston 82 to horizontally to position the plate 85. The piston 82 thus comprises a spring-biased member included in the carrier structure 77 for actuating the character-selection plate 85 in the horizontal direction to print-wire character-selection positions thereof. If during a print cycle none of the code electromagnets 72a–72d are energized, the bell cranks 67a–67d are held against pivotal displacement by reason of their latched engagement with the latch notch of the associated armatures 71a–71d and the character-selection plate 85 remains stationary at a preselected home position in the print head carrier structure 77. If on the other hand any one of the code selector magnets 72a–72d is energized at the outset of the print cycle, its associated bell crank 67a–67d is permitted to pivot counterclockwise as shown in FIG. 4 and follows the movement of the control slide 73 to the left until the latter halts in the middle of the print cycle at a position established by a low point on the cam 60. If either of the bell cranks 67a or 67c pivots counterclockwise at this time, the resultant displacement of their associated pulleys 66a or 66c will pull the ends of the band 76 apart and thus by effectively increasing the length of the latter displace the character selection plate 85 to the left as seen in FIG. 4 against the compressive force of the spring 84. Similar pivotal movement of either of the pulleys 66b or 66d will permit the compression spring 84 to move the ends of the bank 76 closer together, thus effectively decreasing the length of the latter, and displace the character selection plate 85 to the right as seen in FIG. 4. Each of the bell cranks 67a–67d has a ratio of arm lengths between its respective pivot point 68a–68d and the axis of rotation of its respective pulley 66a–66d and that between its respective pivot point 68a–68d and the point of engagement of its respective latch portion 70a–70d with the latch slide 73 that the pivotal displacements of the pulleys 66a–66d under control of the common low point of the cam 60 provide differing increments of horizontal step displacement of the character selection plate 85 in the carrier structure 77. For example, the pulley 66a may effect displacement of the selection plate 85 one unit of displacement to the left as seen in FIG. 4, the pulley 66c may effect displacement of the selection plate 85 four units to the left, the pulley 66b may permit displacement of the selection plate 85 four units to the right as seen in FIG. 4, and the pulley 66d may permit displacement of the selection plate 85 two units to the right.

Thus by energization of the code electromagnets 72a–72d singly and in permutational code combinations, the character selection plate 85 may be displaced to the left as seen in FIG. 4 by equal incremental steps having values one through six and may be displaced to the right in equal incremental steps having values one through five. In this displacement of the selection plate 85, the compression spring 84 provides the major bias force for displacing the plate and the bias springs 75a–75d merely reduce to a uniform value at the latch portion of the respective bell cranks 67a–67d the resultant bias force which the compression spring 84 exerts through the band 76 as a pivotal bias force on the bell cranks. Thus the pivotal bias force exerted by the springs 75a and 75c on the respective bell cranks 67a and 67c must be larger than the bias force exerted by the compression spring 84 on these bell cranks in order that the net bias force exerted on the bell cranks is such as to pivot them counterclockwise. The bias force exerted by the bias springs 67b and 67d must correspondingly reduce the bias force exerted by the compression spring 84 on these bell cranks to leave a net bias force tending likewise to pivot the bell cranks counterclockwise.

The character selection plane 85 is similarly displaced upwardly from an at-rest or home position as seen in FIG. 4 by equal incremental steps having values one through four and downwardly in equal incremental steps having values one through three. To this end, the selection plate 85 has a turned-over ear 86 which engages a vertical groove 87 of the piston 82 to permit vertical displacement of the plate 85 with respect the piston 82, and has side positioned turned-over ears 88 which are engaged by end grooves 89 of a positioning arm 90 vertically guided on a guide rod 91 carried by the carrier structure 77 and vertically moved by a pivoted bell crank 92 mechanically coupled to the arm 90 by a link member 93. A flexible steel band 94 has one end secured to the carrier structure 77 and extends over rotationally supported guide pulleys 95 and 96 of a second pulley system, is wrapped about a group of pulleys 97a–97c of such system as shown, extends over rotationally supported guide pulleys 98 and 99 of the second pulley system, and has its opposite end connected to an arm of the bell crank 92 as shown. The grouped pulleys 97a, 97c are rotationally supported on one arm of respective bell cranks 100a–100c which are pivotally supported on the respective pivot pins 68a–68c and have their other arms biased by tension springs 102a–102c. The latter bell crank arms terminate in latch portions 103a–103c which, at the end of one print cycle and outset of the next, are concurrently positioned by the control slide 73 to latchable engagement with latch notches provided in respective armatures 104a–104c of respective code electromagnets 105a–105c. The manner in which the character selection plate 85 is vertically positioned by the structure just described is similar to that earlier described in respect the horizontal positioning of the selection plate 85. Thus the energization of the code electromagnets 105a and 105c causes their respective pulleys 97a and 97c to move the ends of the band 94 apart, effectively increasing the length of the latter, and move the arm 90 and selection plate 85 vertically upward from its vertical at-rest or home position against the bias force of a compression spring 106 of the carrier structure 77. Energization of the electromagnet 105b causes its pulley 97b to permit the spring 106 to move the ends of the band 94 closer together, effectively decreasing the length of the band, and thereby displace the arm 90 and selection plate 85 downwardly from its at-rest or home position. The pulley 97a may for example provide one unit of upward displacement of the selection plate 85, the pulley 97c may provide two units of upward displacement of the selection plate 85, and the pulley 97b may provide four units of downward displacement of the selection plate 85. Thus energizations of the code electromagnets 105a–105c singly or in permutational code combinations effect vertical displacements of the character-selection plate 85 upwardly and downwardly by equal step increments and over the range of values last mentioned, the bell crank 92 comprising a spring-biased member which tensions the band 94 and actuates the selection plate in the vertical direction to print-wire character-selection positions thereof.

The construction of the code selector assembly just described is shown in FIGS. 5–8. It is fabricated between upper and lower plates 110 and 111 maintained in spaced relation by plural scattered spacer members 112 as indicated in FIG. 5 and 6, the lower plate 111 being secured to the pedestals 21 of the baseplate 19. The horizontal code electromagnets 72a–72d are secured to the upper plate 110 by suitable brackets, not shown for simplicity, which permit small adjustments of the positions of these electromagnets on the plate 110 and thus enable individual slight position adjustments of the latch notches of their respective armatures 71a–71d both slightly to space the end of each latch notch from the associated bell crank latch portion 70a–70d and thereby enable unrestrained movement of the armatures 71a–71d to attracted positions and also adjustably to preselect the latched positions of corresponding ones of the bell crank latch portions 70a–70d. The vertical code electromagnets 105a–105c are similarly secured to the lower plate 111 and are positioned directly beneath the respective electromagnets 72a–72c. As shown more clearly in FIGS. 6 and 7, the horizontal selection bell cranks 67a–67d and the vertical selection bell cranks 100a–100c are each fabricated of spaced side members of identical configuration and which are integrally joined both by a common latch portion (i.e. the latch portion 70a of the bell crank 69a) and by a bushing 113 which pivotally supports the bell crank upon an associated one of the pin shafts 68a–68c. As earlier mentioned and as shown in FIG. 6, a horizontal selection and a vertical selection bell crank are pivotally supported upon a common one of the pin shafts (i.e. the bell cranks 67a and 100a are supported on the common pin shaft 68a) and are maintained in spaced relation to an adjacent one of the side plates 110 and 111 and to each other by spacer washers positioned along the common pin shaft as shown. While not shown for simplicity, the tension springs 75a–75d and 102a–102c each have their remote end anchored to a stud secured to an adjacent one of the plates 110 and 111 and at a position thereon adjustable to enable adjustment of each spring tension to a desired value.

As illustrated in FIGS. 5 and 6, an L-shaped bracket member 114 of sheet metal, having upturned stiffening edge flanges 115, is secured by an L-shaped foot portion 116 at one end to the end of the lower plate 111 and is secured at its opposite end to the cast pedestal 29. The member 114 is supported intermediate its ends by pedestals 117 secured to and extending from the baseplate 19, and is provided with a fixed upstanding stud shaft 118 upon which the guide pulley 79 is rotationally supported. The member 114 at its end adjacent the cast pedestal 29 is also provided with a fixed stud 120 upon which the guide pulley 78 is rotationally supported above the member 114 and the guide pulley 95 is supported below the member 114. The guide pulley 80 is rotatably supported by a stud shaft 121 on one end of an arm 122 pivotally secured at 123 to the upper plate 110. The arm 122 has a laterally extending and upturned end 124 which extends through an aperture 125 of the upper plate 110 and threadingly receives a machine screw 126 which engages an L-shaped bracket 127 secured to the upper surface of the plate 110. Adjustment of the machine screw 126 moves the axis of the guide pulley 80 on an arcuate path centered on the pivot point 123 and thereby causes the pulley 80 to increase or decrease the spacings between the ends of the steel band 76 by which to adjust the horizontal at-rest or home position of the character-selection plate 85 (FIG. 4). The guide pulley 98 is similarly supported on a stud shaft 121' of an arm 122' pivotally supported in the same manner on the lower baseplate 111 and having an upturned arm 124' threadingly receiving a machine screw 126' which engages a bracket 127' secured to the baseplate 111. Upon adjustment of the machine screw 126', the pulley 98 may be arcuately adjusted to adjust the vertical at-rest or home position of the character selection plate 85 by increasing or decreasing the spacings between the ends of the steel band 94. The guide pulleys 81 and 99 (FIG. 4) are rotationally supported upon a common stud shaft 128 fixed to and projecting on either side of a shelf 129 extending from the cast pedestal 27.

As illustrated more clearly in FIG. 7, the control structure 73 is fabricated to upper and lower members 73a and 73b having identical configuration and which are secured at their ends to respective spacer-support members 132 and 133, the member 73a providing common positional control of the horizontal selection bell crank arms 67a–67d and the member 73b similarly providing common positional control of the vertical selection bell cranks 100a–100c. The control structure 73 is supported for reciprocal motion by a pin 134 pivotally connecting the spacer-support member 132 to the cam follower bell crank 74 and by a pin 135 pivotally connecting the spacer-support member 133 to an arm 136, the cam follower bell crank 74 being pivotally supported at 137 on a flange 138 depending from the lower plate 111 and the arm 136 being pivotally supported at 139 on a flange 140 also depending from the lower plate 111. The cam follower bell crank 74 rotationally supports a follower roller 141 which is maintained in engagement with the control cam 60 by a spring 142 connected between a stud 143 on the plate 111 and the spacer-support member 132 as shown.

As illustrated by the fragmentary enlarged view of FIG. 8, the control structure 73 moves the horizontal selection bell crank arms 69a–69d to a position at which their respective latch portions 70a–70d are spaced a small distance from the end of the respective latch notches 144a–144d provided as earlier mentioned at or near the ends of the respective electromagnet armatures 71a–71d. This positioning occurs at the end of one print cycle and continues into the initial portion of the next print cycle, and permits any one of the armatures 71a–71d to move freely to attracted position, without latch pressure engagement between its latch notch and the latch portion of the associated bell crank, upon energization of its associated code electromagnet. The same is true in respect to the cyclic positioning of the latch portions 103a–103c of the selector bell cranks 100a–100c (FIG. 4) in relation to the latch notches of the electromagnet armatures 104a–104c.

The construction of the print head and print-head carrier 77 is illustrated in FIGS. 9–13. The carrier includes a rigid metal base casting 150 of rectangular O-frame configuration, providing a central rectangular aperture 149, and terminates at its upper end in integrally cast spaced flanges 151 each having an aperture 152 for slidably and pivotally supporting the base casting 150 upon a support and guide rail 153. The latter, as shown in FIG. 12, is supported in apertures 154 provided in the cast pedestals 27 and 29 and is fixedly secured to these pedestals by set screws 155. The lower end of the base casting 150 has an integral depending arm 156 (FIG. 10) to the end of which a U-shaped yoke 157 is secured by a machine screw 158. For reasons more fully explained hereinafter, the yoke 157 engages an eccentrically supported shaft 159 pivotally to move the print-head carrier to either of two angular positions on the guide rail 153 according to the prevailing one of two eccentric positions of the shaft 159. This angular positioning of the print-head carrier takes place independently of longitudinal positioning of the carrier along the guide rail. The lower end of the base casting 150 is provided with a short pedestal 160 terminating in a shoulder 161 with projecting stud 162 upon which the bell crank 92 is pivotally supported and retained in place by a C-spring 163, a felt oil washer 164 and metal washer 165 being positioned between the shoulder 161 and bell crank 92 as shown. A rigid L-shaped bracket 166 having out-turned feet 167 is secured to the base casting 150 by machine screws 168 for a purpose presently to be explained. A bracket 169 having out-turned feet 170 is likewise secured to the base casting 150 by machine screws 171 for a purpose presently to be explained.

The print head is of the wire printer type and includes a funnel housing 178 of U-shaped transverse cross-section open at the bottom and which is affixed by brazing or solder to a plate 179 (FIG. 11) secured by machine screws 180 to a mounting plate 181. The latter is positioned in the central rectangular aperture 149 of the base casting 150 and is provided with edge flanges 182 which are secured to the base casting by machine screws 183. The plate 179 has rows and columns of equally spaced apertures 184 slidably to receive a plurality of print wires 185. The latter are guided by hollow tubes 186 which are generally of S-shape along their lengths and have a terminal length of the remote end of each tapered in wall thickness to converge to a compact cluster of parallelogram cross-section with the side of their distant ends ultimately engaging one another in parallel relationship as shown in FIG. 13. The tubes 186 thus cause the print wires 185 to converge to a similar cluster of parallelogram cross-section engaging one another over a short end length and projecting through a converging aperture 188 of parallelogram cross-section provided longitudinally of a metal nose block 189 which is soldered in place within the remote open end of the funnel housing 178. The tubes 186 have one end soldered to the plate 179 as shown and have their opposite ends soldered together as a converged cluster of tubes and also soldered or similarly affixed in like manner at the rear or non-printing end of the nose block 189.

Figure 9:
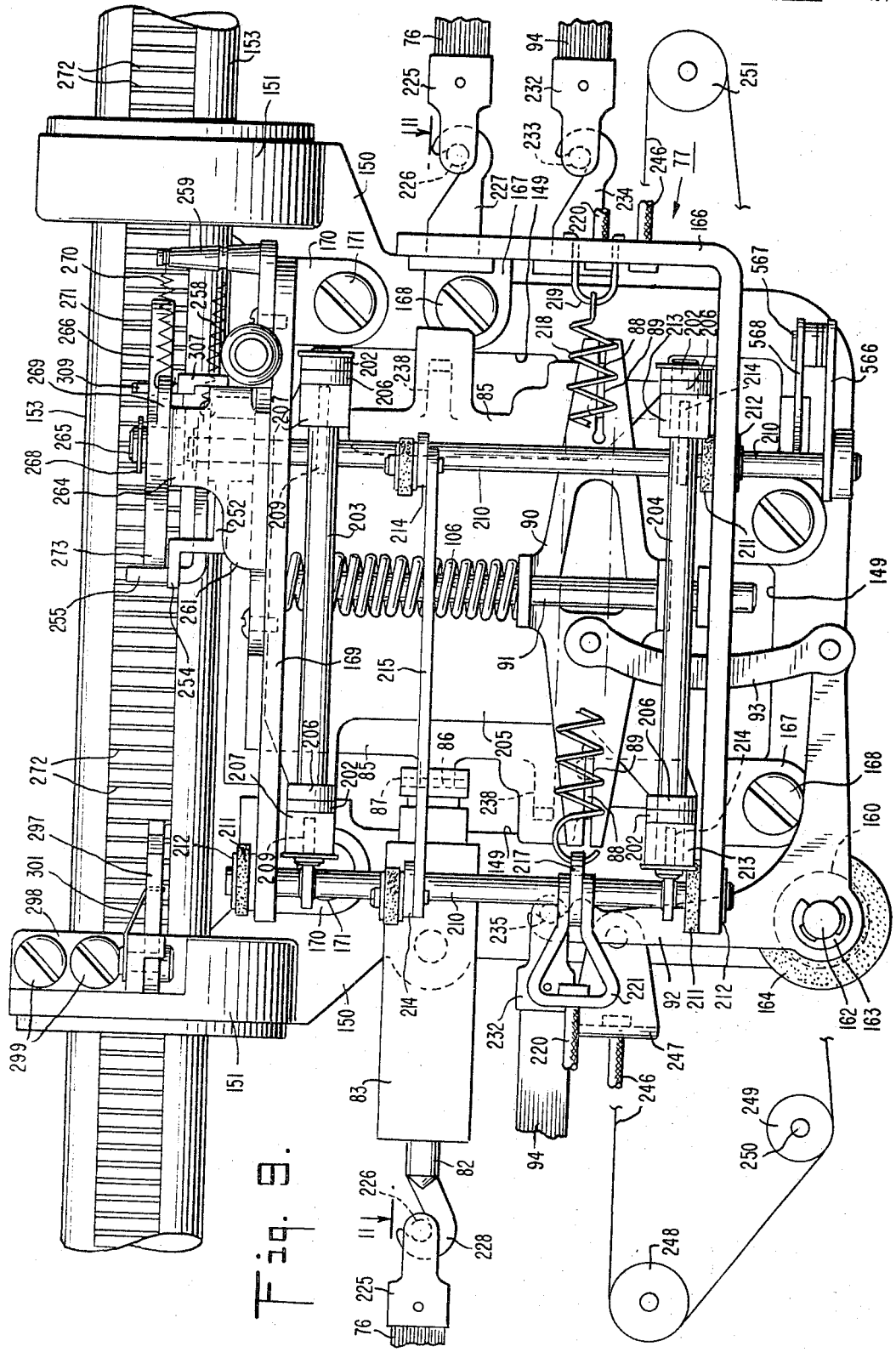

Each of the print wires 185 has secured on its forward end a sleeve 190, and these sleeves are received and guided by apertures 191 of the mounting plate 181 aligned with the apertures of the plate 179. The mounting plate 181 has a central well 192 in which an oil felt pad 193, apertured to receive the print wires 185, is placed to provide lubrication for the print wires as the latter reciprocate through the apertures 184 of the plate 179 and guide tubes 186 in a manner presently to be explained. The sleeves 190 also slidably extend through individual apertures 194 of a stripper plate 195 and terminate in a flanged head 196 having a central nose portion 197 of hardened steel to provide wear resistance. The heads 196 are slidably positioned within apertures 198 of a plate 199 which is affixed by machine screws 200 to short pedestals 201 provided on the forward face of the mounting plate 181. The stripper plate 195 has upper and lower pairs of forwardly extending arms 202 by which it is supported upon and reciprocally moved by an upper rod 203 and a lower rod 204. A pressure plate 205 has forwardly extended pairs of arms 206 which are also supported upon the rods 203 and 204. Also supported on the rod 203 are a pair of metal blocks 207 which are pivotally connected at 208 to the ends of individual ones of a pair of arms 209 secured to the upper ends of a pair of spaced shafts 210 rotationally journaled, as shown in FIG. 9, by the brackets 166 and 169. The shafts 210 are provided with oil felt washers 211 and are retained in position in the brackets 166 and 169 by C-springs 212. The lower rod 204 similarly supports metal blocks 213 which are similarly pivotally connected to arms 214 secured on the lower ends of the shafts 210. Each of the shafts 210 has an arm 214 secured thereto, and the ends of these arms are pivotally connected by a link member 215 for angular rotation in unison. The left hand one of the shafts 210 as seen in FIGS. 9 and 11 also has secured thereto an arm 216 having an extended portion 217 and a tension spring 218 anchored between the arm portion 217 and a U-shaped staple 219 secured to the bracket 166, biases the shafts 210 for counterclockwise rotation as seen in FIG. 11. Such rotation is restrained, however, until the midpoint of a print cycle under control of a pressure plate permissive-restrictive actuation structure. The latter will presently be described more fully, but is schematically shown in FIG. 11 as comprised by a cable 220 which is connected between a yoke 221 on the arm 216 and a diametrically opposed point on the bracket 166 and extends over a pulley system including a pair of remotely spaced and fixedly positioned idler pulleys 222 and a group of closely spaced pulleys including two closely spaced idler pulleys 222 and an intervening movable print-control idler pulley 223 as shown. The diametrically opposed points at which the ends of the cable 220 are connected to the carrier structure lie on a line parallel to the axis of the rail 153 so that the cable bias forces balance one another and have no tendency to twist or rock the carrier on the rail.

The character selection plate 85 is positioned between the ends 197 of the print wire heads 196 and the pressure plate 205 and in the retracted position of the pressure plate shown in FIG. 11 is retained in slidable engagement with the pressure plate by spaced flanges 238 extending from the stripper plate 195 to engage the adjacent surface of the character selection plate 85. As earlier explained, the horizontal selection-plate positioning steel band 76 has one end secured to the print head carrier structure 77 and its other end secured to the piston 82. In particular, a yoke 225 is secured (as by riveting) to each end of the band 76 and the remote end of the yoke has a pin 226 secured between the arms of the yoke to engage a hooked member 227 secured to the bracket 166 and a diametrically opposed hooked end portion 228 of the piston 82 as shown more clearly in FIG. 9. The piston 82 is guided for longitudinal motion by a groove 229 (FIG. 11) formed longitudinally of a piston member 230 and by a pin 231 secured to and projecting internally of the housing 83 into the groove 229. The ends of the band 94 similarly have yokes 232 secured thereto and yoke end pins 233 engage a hooked member 234 secured to the bracket 166 and a diametrically opposed hooked end portion 235 of the arm 92. Each of the bands 76 and 94 has its ends secured, by the structure just described, between diametrically opposed spaced points lying on a line parallel to the axis of the carrier support and guide rail 153 so that the tension forces exerted on the carrier structure by one end of either band are wholly balanced by equal tension forces exerted in opposite direction thereon by the other end of the band. Accordingly, there is no remaining component of tension force perpendicular to the axis of the rail 153 and which would cause either band to exert a force tending to twist or rock the carrier on the rail.

As earlier explained, effective expansion or contraction of the horizontal selection band 76 effects corresponding movement of the piston 82 to position the character selection plate 85 horizontally, and effective expansion or contraction of the vertical selection band 94 angularly moves the crank arm 92 which through the link 93 and arm 90 positions the character selection plate 85 vertically. As each possible position of the character selection plate 85, as step displaced horizontally or vertically or both under control of the code selector assembly earlier described, the selection plate is provided with either a plateau 236 or a valley 237 opposite the end 197 of each print-wire head 196. Thus at each such possible position of the character selection plate 85, the plateaus 236 of the selection plate select certain of the print wires 185 to print an individual character and the valleys 237 effect non-selection of the remaining print wires. Having thus positioned the selection plate 85, the pressure plate actuation structure effectively lengthens the cable 220 by movement of the idler pulley 223 from its position shown in full lines to its position shown in broken lines in FIG. 11. The arm 216 and arms 214 with interconnecting link 215 are thereby permitted to rotate the shafts 210 under bias force of the tension spring 218. The arms 209 and 214 operating through the block members 207 and 213 thereupon move the rods 203 and 204 toward the character selection plate 85. This moves the stripper plate 195 away from the flanged heads 196 of the sleeves 190 and concurrently moves the pressure plate 205 against the character selection plate 85 to engage the plateaus 236 of the selection plate 85 with the ends 197 of selected ones of the print-wire heads 196 after which continued movement of the pressure plate 205 and selection plate 85 causes the selected print wires 185 to be displaced into print position forwardly of the nose surface of the nose block 189. Thereafter the pressure plate actuating structure effectively shortens the cable 220 by restoring the idler pulley 223 to its initial position shown in solid lines, and this effects reverse angular rotation of the arm 216 and shafts 210 to restore the pressure plate 205 and stripper plate 195 to their positions of rest. As the stripper plate 195 returns to its position of rest, it engages the flanged heads 196 of the selected print wires 185 and returns the heads and print wires to their non-print positions.

The character selection plate 85 has a novel structure wherein character selection effected by its plateaus 236 and valleys 237 effect printing of all upper-case characters and numerals accurately aligned upon an imaginary printing line of the printed copy and this is true also of all lower-case characters and punctuation which require no portion thereof to descend below the imaginary printing line. Lower-case characters and punctuation having a descending portion are printed with the descending portion thereof projecting below the imaginary printing line. This permits the printing of a full alphabet of upper-case and lower-case characters, and particularly lower-case characters and punctuation having a portion thereof descending below the imaginary printed line of character alignment, without need of the use of particular shift codes for transfer of character selection as between upper-case characters and lower-case characters as on a conventional office typewriter. The operational efficiency is accordingly increased by eliminating the operational time otherwise required for execution of such shift codes and the machine structure is substantially simplified in respect selection of upper-case and lower-case characters. In particular and referring to FIG. 13a, which illustrates in cross-section an end portion of the cylindrical nose extension of the nose block 189 having by way of an illustrative example an array of print wires arranged in nine rows and five columns thereof, the upper seven rows and all five columns of the print wires 185 are selected by the character selection plate 85 to print upper-case alphabetic characters and numerals aligned on an imaginary print line 244. This same array of print wires is selected by the selection plate 85 to print all lower-case alphabetic characters, symbols and punctuation which do not have a descending portion. However, for those lower-case alphabetic characters and punctuation having a descending portion, the lower two rows of print wires 185 are selected by the selection plate 85 for printing the descending portion 245 thereof. This, as noted, is effected entirely by the novel structure and method of using the character selection plate 85 and without the need of special upper-case and lower-case codes for controlling the print head to effect selection of upper-case and lower-case characters. For enhanced readability of the printed copy, the aperture 188 of the cylindrical extending nose portion of the nose block 189 preferably has its long sides at an angle of the order of 11° to the imaginary print line 244 to effect slanted printing of the selected alphanumeric characters, symbols and punctuation.

The print head carrier 77 during printing of successive characters of a line of copy is urged by spring motor drive to move in a direction from left to right of the printer platen, and upon completing a line of copy is rapidly power driven in the opposite direction. This bi-directional drive motion of the carrier 77 is accomplished by a drive structure hereinafter described more fully but shown schematically in FIG. 9 as comprised by a cable 246 which is connected by a yoke 247 to the carrier base casting 150, extends over an idler pulley 248, is wrapped about a drive pulley 249 supported upon a drive shaft 250, extends over an idler pulley 251, and is secured to the carrier bracket 166 as shown. The spaced points at which the ends of the cable 246 are connected to the carrier structure lie on a line parallel to the axis of the rail 153 so that drive forces exerted by the cable have no tendency to twist or rock the carrier on the rail. After each print operation to effect printing of an alphanumeric character, symbol or punctuation mark, and after each word space operation effected by what would otherwise be a print operation except that the character selection plate 85 remains both horizontally and vertically stationary at its at-rest or home position, a letter escapement movement of the carrier 77 takes place under spring motor drive of the carrier to the right. This escapement movement is accomplished by an escapement structure illustrated in FIGS. 9, 10, 12, 14 and 15 and which is shown and claimed in a copending application of Henry E. Smith, Ser. No. 666,583, filed Sept. 11, 1967, and assigned to the same assignee as the present application.

As shown more clearly in FIG. 14, the escapement structure includes an arm 252 secured by a set screw 253 upon the upper end of the right-hand one of the two shafts 210 shown in FIG. 9 and which is angularly reciprocated as earlier explained to reciprocate the pressure plate 205 between non-print and print positions during each print operation. The arm 252 has a Z-shaped slotted end portion 254 to receive the end of an L-shaped arm 255 having an elongated slot 256 by which it is supported for longitudinal pivotal and reciprocal motion on the shaft 210 as shown more clearly in FIG. 14. The arm 255 is retained in position on the shaft 210 by a C spring 257, and is biased to the right as seen in FIG. 14 by a tension spring 258 having one end anchored by a pedestal 259 mounted upon the base portion 260 of a U-shaped bracket 261 (FIG. 10) which is provided with an aperture 262 to receive the shaft 210 and is secured by machine screws 263 on the carrier bracket 169. The upper portion 264 of the U-shaped bracket 261 has affixed thereto a stud 265, and an escapement pawl 266 is provided with an elongated aperture 267 by which it is mounted upon the stud 265 and is secured in position thereon by a C spring 268. As shown more clearly in FIG. 15, the pawl 266 has an apertured side projecting portion 269 anchoring one end of a tension spring 270 which is anchored at its opposite end on the pedestal 259 and by which the pawl 266 is biased to the right as seen in FIG. 15. The pawl 266 has a pawl nose portion 271 which normally engages rack teeth 272 milled longitudinally along a side length of the support rail 153, and has an arm 273 which may engage the upturned end portion of the arm 255.

The operation of the escapement structure just described will now be considered. Upon initial rotational drive of the shafts 210 to move the pressure plate and character selection plate to their print positions as earlier described, the arm 252 of the escapement structure is rotated by its supporting shaft 210 counterclockwise as seen in FIG. 15. Its slotted end portion 254 correspondingly rotates the arm 255 in a counterclockwise direction to displace the latter to one side of the pawl arm 273. As soon as the upturned end portion of the arm 255 clears the end of the pawl arm 273, the arm 255 is moved by the spring 258 longitudinally to the right as viewed in FIG. 15 to engage the end of the slot 256 with the shaft 210. This places the upturned end of the arm 255 to one side of the pawl arm 273. The pressure plate and character selection plate, having been moved to their print positions, are now moved in reverse direction toward their non-print positions of rest by reverse rotational drive of the shafts 210 as earlier explained. This causes reverse rotation of the arms 252 and 255 in clockwise direction as seen in FIG. 15, and the upturned end portion of the arm 255 now engages the side of the pawl arm 273 to pivot the pawl 266 clockwise about the stud 265 as seen in FIG. 15. As soon as the pawl nose portion 271 moves out of engagement with the rack tooth 272 which it previously engaged, the carrier 77 is no longer restrained by the pawl against spring motor displacement drive longitudinally of the rail 153. Due to the inertial mass of the carrier, it starts from rest and begins to move with small but increasingly larger velocity to effect a letter space operation. At the time this occurs, all print wires previously selected by the character selection plate for the print operation have been partially restored to their non-print positions by action of the stripper plate 195 (FIG. 11) operated in the manner previously described. In particular, each print wire at this time is sufficiently resorted toward non-print position that it no longer engages the print ribbon (described hereinafter) with the paper on the printer platen and hence there is no tendency of a print wire to cause blurring of the character just printed upon initiation of letter space movement of the carrier 77 after its release by the pawl 266. The pawl nose portion 271, having been disengaged from the previously engaged rack tooth 272 and having relatively small inertial mass, is now rapidly moved by the pawl spring 270 longitudinally to the right as seen in FIG. 15. As soon as the end of the pawl arm 273 clears the upturned end portion of the arm 255, the pawl spring 270 pivots the pawl 266 in a counterclockwise direction about the stud 265 to engage the pawl nose portion 271 with the next succeeding rack tooth 272. The letter escapement movement of the carrier 77 moves the stud 265 toward the right-hand end of the pawl aperture 267 as seen in FIG. 15 and the letter escapement motion of the carrier 77 is halted upon engagement of the stud 265 with the right-hand end of the pawl aperture 267. While this is occurring, the end of the pawl arm 273 reengages the upturned end portion of the arm 255 and displaces the latter to the left against the tension of the spring 258, thus restoring the arm 255 to its initial position in readiness to initiate a further letter space operation. The pawl 266 engages the ratchet teeth 272 close to the center of gravity of the carrier 77 and thus minimizes torsional twisting of the carrier due to its mass and also minimizing any vibration tending to be developed by the escapement operation.

The carrier 77 under spring motor drive is moved in selectable tabulation steps from left to right of the printer platen by a tabulation structure shown generally in FIG. 12 and shown in more detail in FIGS. 9, 10, 15 and 16 and which is shown and claimed in a copending application of Ronald Tristram and Donald L. Rolph, Ser. No. 673,440, filed Oct. 2, 1967 and assigned to the same assignee as the present application. The tabulation structure includes a tab rack 280 which, as shown in FIG. 12, is provided with cylindrical end portions 281 and 282. The end portion 281 is supported for longitudinal displacement and rotational motion by a journal aperture provided in one forwardly projecting arm 283 of the cast pedestal 27, and has a fixed radial pin 284 slidably received in a longitudinal slot 285 provided at the end of the rotary shaft 286 of a rotary electromagnet 287 supported on a second arm 288 of the cast pedestal 27. The end portion 282 of the tab rack 280 is similarly supported for longitudinal displacement and rotational motion by an aperture provided in the cast pedestal 29. A collar 289 secured on the end portion 282 anchors one end of a helical spring 290 having its other end anchored by the cast pedestal 29 to bias the tab rack 280 to the left as seen in FIG. 12 and rotate it to the deenergized stop position of the electromagnet 287 at which position the tab rack 280 occupies the angular position shown in FIG. 10. A collar 291 affixed to the end portion 282 of the tab rack carries an arm 292 which at either of two tab rack angular positions, shown in full and broken lines in FIG. 16 corresponding to the deenergized and energized states of the rotary electromagnet 287, operates a Microswitch 293 supported on an integral laterally extending flange 294 of the cast pedestal 29.

Conventional tab stop members 295 are manually positioned on the tab rack 280 at preselected tab positions as defined by conventional side slots 296 of the tab rack. A tab pawl member 297 is pivotally supported, as shown more clearly in FIGS. 9, 10 and 15 on a bracket 298 secured by machine screws 299 on a radially extending flange 300 (FIG. 10) of the left-hand cast flange 151 as seen in FIGS. 12 and 15, the pawl member 297 being biased by a spring 301 normally to engage a dependent stop portion 302 of the bracket 298. The deenergized state of the rotary electromagnet 287 angularly positions the tab rack 280 as shown in FIG. 10 at which the pawl member 297 normally does not engage the tab stop members 295 during movement of the carrier 77 longitudinally along the rail 153.

A tab function code supplied to the printed is decoded by a decoder unit of the printer electrical control system hereinafter described and effects energization of the rotary electromagnet 287 to rotate the tab rack 280 through a small counterclockwise angle as seen in FIG. 10 and thus position the tab stop members 295 in engageable relation with the tab pawl member 297. At the same time, the tab code effects deenergization of an electromagnet of a last character visibility structure hereinafter described, and this structure rotates the eccentric shaft 159 to its position shown in broken lines in FIG. 10 to pivot the carrier 77 through a small counterclockwise angle as seen in FIG. 10. This pivotal position of the carrier 77 and the rotated position of the tab rack 280 effected by energization of the rotary electromagnet 287 engages a roller 303 with a track strip 304 secured along the lower surface of the tab rack 280 as shown. The roller 303 is rotationally supported by a stud 305 provided on the overturned end 306 (FIG. 15) of a lever 307 pivotally secured at 308 on the escapement bracket 261 and has an upturned end 309 which engages the rear edge of the pawl 266 to withdraw the pawl nose portion 271 from engagement with the rack teeth 272 upon pivotal motion of the lever 307 by engagement of the roller 303 with the track strip 304. This enables the carrier 77 to be spring motor driven in a direction from left to right of the printer platen until the pawl member 297 engages one of the tab stop members 295 of the tab rack 280. When such engagement occurs, the tab rack 280 is moved longitudinally to the right (FIG. 12) against the compressive force of the spring 290 and through the arm 292 operates the Microswitch 293 to deenergize the rotary electromagnet 287. Such deenergization permits the rotational bias force of the spring 290 to rotate the tab rack 280 to the position shown in FIG. 10. This permits the pawl spring 270 once more to move the pawl nose portion 271 to a position where it can engage the next succeeding rack tooth 272 of the rail 153. The disengagement of the pawl member 297 with the tap stop 295 permits the carrier 77 to complete a character space to the right as controlled by the earlier described engagement of the pawl nose portion 271 with the next succeeding rack tooth 272 of the rail 153 under bias of the pawl spring 270, thus completing the tabulation operation. If the rotary electromagnet 287 should remain energized during power driven movement of the carrier 77 from the right margin position to the left margin position of the platen, a cam surface 310 (FIG. 15) of the pawl member 297 pivots this member counterclockwise as seen in FIG. 11 to permit passage of the tab stop members 295 past it.

The carrier 77 upon reaching a right-hand margin stop initiates and enters a printing zone within which a carrier return operation takes place. Within this zone the printer continues printing and character spacing successive alphanumeric characters, symbols and punctuation until the next word-space code is received, whereupon the carrier is rapidly power driven until it engages a left-hand margin stop. This zone character of carrier return operation prevents interruption of printing before the entire last word of the line has been printed. The novel structure and electrical system for accomplishing such zone character of carrier return from right to left of the printer platen is shown and claimed in a copending application of David W. Engdahl, Ser. No. 702,305, filed Feb. 1, 1968, and assigned to the same assignee as the present application. The margin control structure is shown in plan view in FIG. 12 and is shown in more detail in FIGS. 10 and 15–18. It includes a margin stop rack 315 having cylindrical end portions 316 and 317 supported for longitudinal displacement to the left as seen in FIG. 12 and for rotational motion by journal apertures provided in the respective cast pedestals 27 and 29. A conventional left-hand margin stop member 318, biased by a leaf spring 319 (FIG. 15) to engage internal teeth 320 with edge slots 321 of the rack 315, may be manually depressed for setting at any desired left-hand marginal stop position. A similar right-hand margin zone-control member 322 may be manually set at any desired right-hand marginal stop-control position. One side of the stop-control member 322 has an integral boss 323 (FIG. 10) having a stud 324 upon which a roller 325 is rotationally supported and retained in position by a C-spring 326. The stop rack 315 is biased to the right as seen in FIGS. 12 and 17 by a compression spring 327 positioned between the cast pedestal 29 and a collar 328 secured by a set screw 329 on the cylindrical portion 317, but its right-hand at-rest position is fixed by a pin 330 projecting through and secured to the cylindrical portion 317 and which engages a flanged bushing 331 seated in an aperture 332 of the cast pedestal 29 as shown. Longitudinal displacement of the stop rack 315 to the left (as seen in FIG. 12) from its at-rest position is permitted by compression of a washer 333 of an elastomer material positioned between a boss 334 on the pedestal 27 and a collar 335 secured on the cylindrical end portion 316 of the stop rack. The right-hand end of the cylindrical end portion 317 has an internally threaded axial bore receiving a flat-headed machine screw 336, shown more clearly in FIG. 17, which in the at-rest position of the stop rack 315 operatively engages a Microswitch 337 supported upon an upstanding flange 338 of an L-shaped bracket 339 cast on the side of the pedestal 29 as shown.

As illustrated in FIGS. 10, 12 and 15, the left-hand flange 151 of the carrier 77 has an integral projection 340 which during power drive movement of the carrier 77 to the left engages the left-hand margin stop 318 and displaces the stop rack 315 to the left. This displacement operates the Microswitch 337 which is included in an electrical control circuit hereinafter described and effects termination of the power drive of the carrier 77. The right-hand flange 151 of the carrier is provided with a projecting nose member 341 which, during spring motor print escapement of the carrier 77 to the right, engages the roller 325 on the right-hand margin stop-control member 322 and thereby pivots the stop rack 315 about the axis of its end portions 316 and 317 but without longitudinal displacement of the stop rack to the right since such movement is restrained by the pin 330 of the end cylindrical portion 317. Thus pivotal motion of the stop rack 315 effects corresponding rotational movement of the collar 328 (FIGS. 16–18). A platform 342 has an upturned side flange 343 which is extended upwardly and is secured to the collar 328, and has a further upturned side flange 344 having a downwardly extended arm 345 which anchors one end of a tension spring 346. The latter has its opposite end anchored by a stud 347 carried by the bracket 339 and biases the platform 342 to a position engaging the end of an adjusting screw 348 threaded through the bracket 339. The position of the platform 342 as established by the set screw 348 places the platform in operative engagement with a Microswitch 349 supported on the bracket 339 and also by the connection of the platform flange 343 to the collar 328 establishes the at-rest angular position of the marginal rack 315. When the latter is rotated by engagement of the carrier nose member 341 with the roller 325 of the right-hand margin stop-control member 322, the platform 342 is angularly displaced to operate the Microswitch 349 which is included in an electrical control circuit hereinafter described and causes the next received word space code to effect power driven return movement of the carrier 77 to the left-hand margin position as established by the left-hand margin stop member 318.

The spring motor and power drive structure for moving the print-head carrier 77 bi-directionally along the platen of the printer is comprised by the subassembly 52 illustrated in FIGS. 19 and 20. The subassembly is fabricated upon a sheet metal baseplate 355 having upturned flanges 356 and 357 and which is affixed by machine screws as shown to the bosses 34 of the baseplate 19. The flange 356 is apertured to receive a sleeve bearing 358 which rotationally journals one end of the drive shaft 250 and to which is secured the drive pulley 249 around which the drive cable 246 is wrapped as earlier mentioned in reference the carrier drive structure schematically shown and described in relation to FIG. 9. The flange 357 of the baseplate 355 journals the other end of the shaft 250 in a manner presently to be described. The carrier power drive structure is directly driven from the printer drive motor through belts and pulleys as earlier described in connection with FIG. 3 and which include the shaft 44, the pulley 49, the belt 50, and the pulley 51. The latter is secured by a set screw 359 on a sleeve 360 which is journaled by bearing bushings 361 and 362 for rotational support upon the shaft 250 and is positionally secured on the latter by a collar 363 secured by a set screw 364 on the shaft 250. The sleeve 360 has a cylindrical sleeve end extension portion 365 which comprises a drive sleeve of a fast-acting wire spring clutch having a driven sleeve 366 secured by a machine screw 367 on the shaft 250. A helical wire spring 368 is wrapped about the sleeve portion 365 and the sleeve 366 and has one end effectively clamped to the sleeve portion 365 by a clamp sleeve 369, the other end of the spring 368 being engageable by a shoe 370 pivotally secured at 371 to an extended end 372 of an armature support structure 373 pivoted on a stud 374 of an L-shaped bracket 375 secured by machine screws 376 to the baseplate 355. A tension spring 377, having one end anchored to the armature support structure 373 and having its opposite end anchored by a stud 378 on the bracket 375, normally biases the armature support structure 373 against the end of a stop bracket 379 affixed to the bracket 375 at an angularly adjustable position such that the shoe 370 does not have significant frictional engagement with the wire spring 368. With the shoe 370 so positioned, the clutch drive sleeve 360 drives the wire spring 368 but the latter has only a sliding fit with the sleeve 366 and thus does not drive the shaft 250 at this time. An electromagnet 380, having a magnetic yoke 381 affixed by a bracket 382 to the bracket 375, may be energized to attract the armature of the armature support structure 373 and thus cause the shoe 370 to have significant frictional engagement with the spring 368 whereupon the latter wraps itself tightly about the clutch sleeve 366 and transmits rotational drive of the pulley 51 to rotational drive of the shaft 250. This drive of the shaft 250 is transmitted through the pulley 249 and cable 246 to drive the print-head carrier 77 rapidly in a direction from the right-hand end toward the left-hand end of the printer platen.

When the carrier 77 performs a relatively prolonged tabulation operation under drive of the spring motor presently to be described, it is desirable for well known reasons to limit the maximum velocity which the carrier may attain during the tabulation operation. This is accomplished in the subassembly 52 by a rotational speed limit clutch which includes a pinion gear 387 secured on the shaft 44 and meshing with a ring gear 388 having an integral hub 389 rotationally journaled by a bearing sleeve 390 seated in an aperture 391 of the baseplate flange 357. The hub 389 has an end cylindrical extension sleeve 392 comprising one component of the speed limit clutch. The hub 389 is rotationally journaled upon and supports one end of the shaft 250 by a sleeve bearing bushing 393 and a flanged bearing bushing 394. The speed limit clutch also includes a sleeve 395 which is secured by a set screw 396 on the shaft 250 and further includes a helical wire spring 397 wound over the extension sleeve 392 and the sleeve 395. The spring 397 is clamped to the extension sleeve 392 by a clamp ring 398. The spring 397 is wound in such a direction that its rotational drive by the extension sleeve 392 tends to unwrap the spring from the sleeve 395 so that the speed limit clutch has no tendency to drive the shaft 250. When the latter is driven by the spring motor during a tabulation operation, the angular velocity of the shaft 250 increases until the sleeve 395 begins to have slightly higher angular velocity than the extension sleeve 392 which is driven at constant angular velocity through the gears 387 and 388 from the shaft 44. Any velocity of the shaft 250 in even slight excess of the angular velocity of the extension sleeve 392 causes the spring 397 to wrap tightly about the sleeve 395 and extension sleeve 392 so that the shaft 250 must thereafter rotate at the same angular velocity as the extension sleeve 392 thus limiting the maximum velocity which the carrier 77 may attain during a tabulation operation.

A bushing 399 secured by a set screw 400 on the shaft 250 anchors one end of a spiral spring 401 having its opposite end secured to a cylindrical housing 402 integral with an apertured baseplate 403 secured by machine screws 404 to the baseplate flange 356. This structure comprises the spring motor drive for the carrier 77, the spring 401 being wound during return of the carrier from right to left of the printer platen under power drive effected by energization of the clutch electromagnet 380 as previously described. The wound spring 401 thereafter provides spring motor drive of the carrier 77 from the left-hand end to the right-hand end of the printer platen during printing operations.

The subassembly 52 includes a backspace mechanism, having a construction shown in FIGS. 19 and 21, which is disclosed and claimed in a copending application of Henry E. Smith, Ser. No. 672,241, filed Oct. 2, 1967, and assigned to the same assignee as the present application. This structure includes a ratchet gear 407 secured by a set screw 408 on the shaft 250. A pawl 409 has an elongated aperture 410 by which it is supported on a stud 411, for pivotal and slight longitudinal motion, provided on the side of an upturned flange 412 of the baseplate 355. A U-shaped yoke 413 having rectangular apertures 414 to receive the pawl 409 is secured with an armature 415 upon a support plate 416 having an upturned edge 417 extended and apertured for pivotal support on the stud 411. A tension spring 418, anchored between a hook projection 419 extending from the edge of the pawl 409 and an L-shaped bracket 420 secured to the flange 412, biases the pawl 409 longitudinally to the right (as seen in FIG. 21) to engage the end of the aperture 410 with the stud 411 and against the bracket 420 to hold the pawl out of engagement with the teeth of the ratchet wheel 407. The pawl 409 in turn spaces the armature 415 from a yoke 421 associated with an electromagnet 422 and suported by an L-shaped bracket 423 on the flange 412. A microswitch 424 having an operating plunger 425, adapted to be engaged and operated by the pawl 409, is secured with a space shim 426 on the flange 412. In a backspace operation, the electromagnet 422 is energized to attract its armature 415 and thus cause the yoke 413 to pivot on the stud 411 and pivot the pawl 409 into engageable relation with the teeth of the ratchet wheel 407. The electromagnet 380 (FIG. 20) of the fast-acting drive clutch earlier described is concurrently energized to drive the shaft 250 in counterclockwise direction as seen in FIG. 21 and thus initiate movement of the print-head carrier 77 toward the left-hand end of the printer platen. The engagement of the pawl 409 with the teeth of the ratchet wheel 407 at this time causes the pawl to be displaced longitudinally to the left as seen in FIG. 21 until the end of the pawl engages and operates the operating plunger 425 of the Mircroswitch 424. The operation of the latter thereupon causes an electrical control system hereinafter described concurrently to deenergize the electromagnet 422 of the backspace structure and the electromagnet 380 of the fast-acting clutch to halt drive of the shaft 250 and thus terminate the backspace operation.

It was earlier explained in connection with FIG. 3 that each print cycle of operation is initiated under control of a 180° clutch 56 having a construction and operation more fully disclosed and claimed in the copending Blodgett application Ser. No. 627,377, filed Mar. 31, 1967.

The construction of this clutch is illustrated in FIGS. 22–24, but will only briefly be considered sufficient to enable an understanding of the control which the clutch exerts over successive print cycles of operation. The pulley 55 is rotationally journaled by bushings 431 on the driven print-control shaft 59 and has an integral stepped sleeve 432 about which a helical wire clutch spring 433 is wrapped. The latter also extends over a sleeve 434 which is keyed to the shaft 59 and anchors one end of the spring 433. The other end of the spring 433 is anchored by a cylindrical housing 435 rotationally supported on the sleeve 432 and on a flanged sleeve 436. The latter is secured by a set screw 437 to a stop member 438 fixedly secured on the shaft 59. The housing 435 and the stop member 438 have respective 180° displaced peripheral protuberances 439 and 440. These are engageable by the end of a stop member 441 which is pivotally supported on a pin 442 carried by the extended ends of downturned flanges 443 of a support member 444. The latter is bonded to and supported by a stiff resilient rubber pad 445 which in turn is bonded to and supported by an L-shaped rigid bracket 446 secured to the flange 23 of the baseplate 14. The stop member 441 is biased by a spring 447 normally to engage corresponding pairs of the protuberances 439 and 440, but may be pivoted out of engageable relation with the protuberances by energization of a clutch electromagnet 448 to attract its armature 449 which is secured to and is carried by the stop member 441.

Clutch drive of the print-control shaft 59 is effected by briefly energizing the electromagnet 448 to pivot the stop member 441 out of engagement with the protuberances 439 and 440. This permits the clutch spring 433, by spring bias rotation of the housing 435, to wrap itself tightly around the sleeves 432 and 434 and thus mechanically couple the driving pulley 55 to the driven shaft 59. After the brief energization of the electromagnet 448, the stop member 441 is returned by the spring 447 to engage the next succeeding protuberance 439 which during drive of the clutch occupies a position slightly in advance of the associated protuberance 440 of the stop member 438. Engagement of the stop member 441 with the protuberance 439 halts rotation of the housing 435 and thus unwraps the spring 433 from the sleeves 432 and 434. Immediately thereafter the associated protuberance 440 moves into engagement with the stop member 441 to halt the shaft 59 precisely at a half revolution of its rotation. Thus the driven print-control shaft 59 is controlled by the clutch to perform successive half revolution rotation steps each corresponding to a print cycle of operation. The stop member 438 has further 180° displaced peripheral detent protuberances 450 laterally and angularly displaced from its protuberances 440, and upon halt of the driven shaft 59 as last described, one of the detent protuberances 450 is immediately engaged by a detent member 451. The latter is pivotally supported on a pin 452 carried by the extended ends of downturned flanges 453 of a support member 454 which is secured to an L-shaped rigid bracket 455 fastened to the flange 23 of the baseplate 19. The detent member 451 is biased by a spring 456 into engageable relation with the detent protuberances 450 and serves to prevent any significant amount of reverse rotation of the driven print-control shaft 59 from a shaft revolution halt position thereof.

Since a full revolution of the print-control shaft 59 corresponds to two successive print cycles as just explained, the code selector assembly earlier described in relation to FIGS. 4–8 operates under control of each half revolution of its associated cam 60 to position the character selection plate 85 of the print head for a character selection. This character selection is completed after the print-control shaft 59 and cam 60 have completed approximately 103° of rotation from their 0° or at-rest home positions and is retained to a rotational angle of approximately 127°. During the remainder of the half cycle of rotation of the print-control shaft 59 and cam 60, the code selector assembly returns the character selection plate to its home or at-rest position. Beginning at approximately 86° and just prior to completion of character-selection positioning of the character selection plate 85, the pressure plate of the print head begins to move the character selection plate 85 toward the heads of the print wires under drive of the pressure plate actuation structure shown schematically and described in relation to FIG. 11. The print wires are moved to character-impression print position at aproximately 115° and are restored to non-print position at approximately 144° of the half cycle of rotation of the print-control shaft 59. During the next half revolution of the latter, the operations just described are repeated at shaft rotational angles 180° larger than each of those just recited.

Figure 25:
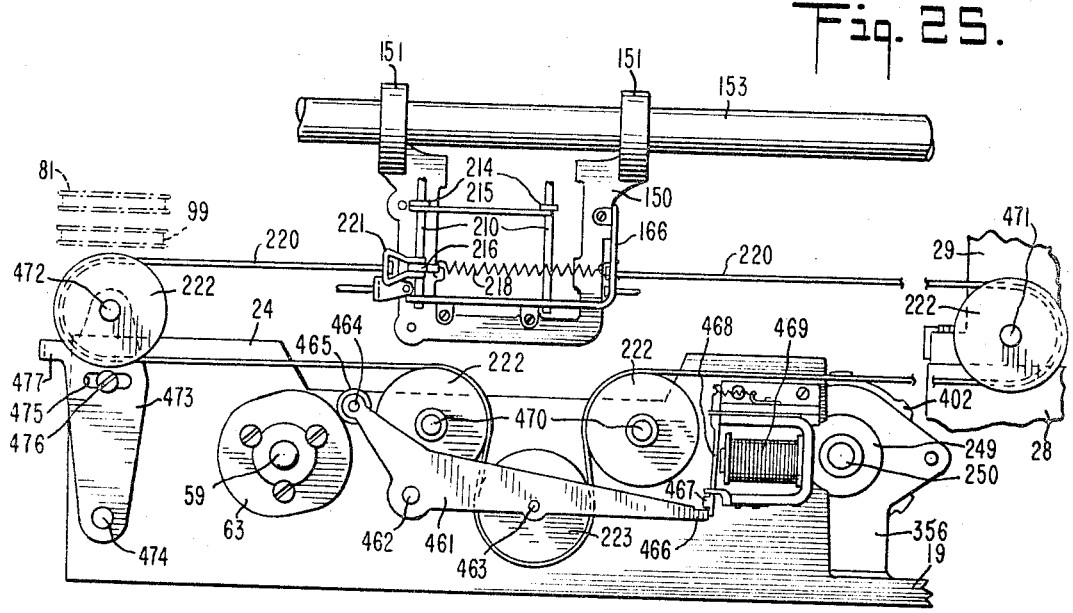

The construction of the pressure plate actuation structure mentioned just above is illustrated in FIG. 25 and includes the pressure plate actuation cam 63 mounted on the end of the print-control shaft 59. A cam follower lever 461 is pivotally supported by a stud 462 on the forward face of the baseplate bracket 24 and carries a stud 463 upon which the pulley 223 is rotationally supported and a stud 464 upon which a cam follower roller 465 is supported as shown. The cam follower roller 465 is maintained in engagement with the peripheral cam surface of the cam 63 by the tension of the pressure plate spring 218 exerted on the pulley 223 by the cable 220. The two high points of the cam 63 position the arm 461 such that its remote end portion 466 is in latchable engagement with but slightly spaced from the latch end of a latch notch 467 of the armature 468 of a pressure-plate actuation control electromagnet 469 until the latter is energized. Such energization attracts the armature 468 out of latchable engagement with the remote end 466 of the arm 461, thereby to permit pivotal motion of the arm 461 counterclockwise (as seen in FIG. 25) as the cam roller 465 follows onto each of the two low points of the peripheral cam surface of the cam 63. Such unlatched pivotal motion of the arm 461 first raises and thereafter lowers the pulley 223 respectively to increase and decrease the effective length of the cable 220 whereby the pressure plate of the print head may be reciprocated by reciprocal rotation of the arm 216 and shafts 210 under tension of the spring 218. The electromagnet 469 is selectively energized during each print cycle by an electrical control circuit hereinafter described. It will be seen that the pulleys 222 adjacent the pulley 223 are rotationally supported by studs 470 on the front face of the base flange 24, that the right-most pulley 222 as seen in FIG. 25 is rotationally supported on a stud 471 which is supported by the cast pedestal 29 and projects both forwardly and rearwardly of the front and rear surfaces thereof, and that the left-most pulley 222 as seen in FIG. 25 is rotationally supported upon a stud 472 carried by an arm 473 pivoted by a stud 474 on the front face of the base flange 24. The arm 473 has an elongated slot 475 through which a machine screw 476 is threaded into the flange 24 to lock the arm 473 at a pivotal position which establishes, through the arm 216 and shafts 210, the at-rest position of the pressure plate of the print head. The arm 473 is provided with an integral bracket extension 477 having a turned-over end by which to facilitate angular adjustments of the arm 473 about its pivot stud 474, and against the tension of the tension spring 218, by insertion of a screw driver or like tool between the turned-over end of the bracket extension 477 and the end of the base pedestal 24.

Figure 26:
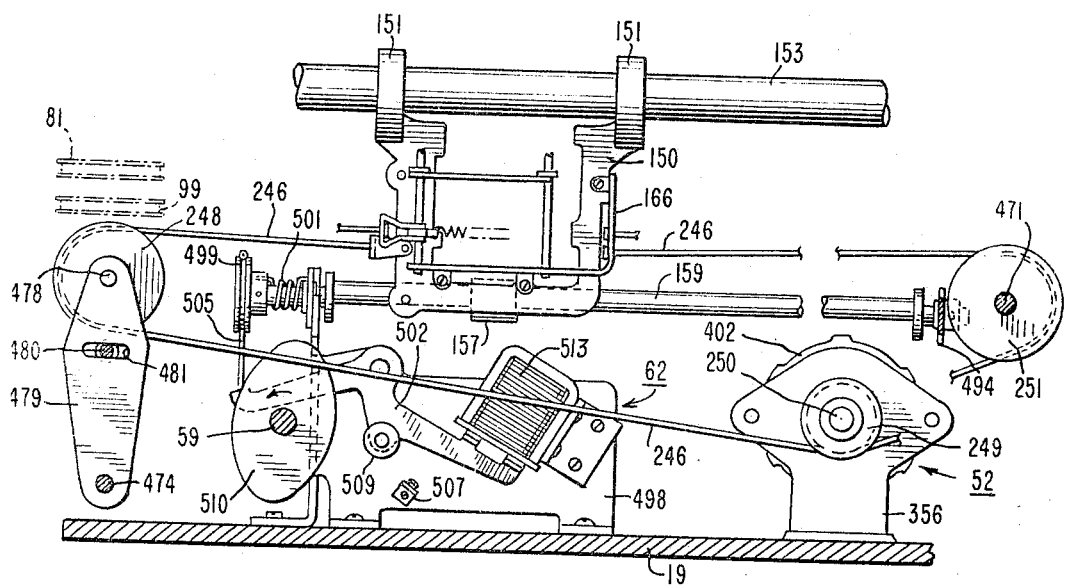

The cable and pulley bi-directional spring motor drive and power drive of the carrier 77 longitudinally of the rail 153 was schematically shown and described in relation to FIG. 9 and is illustrated structurally in FIG. 26. It includes the drive pulley 249 of the drive subassembly 52 previously described in relation to FIGS. 19 and 20, and provides for rotational support of the pulley 248 on a stud 478 of an arm 479 positioned on the rear face of the base bracket 24 and pivoted on the stud 474 of the latter. The arm 479 has pivotal adjustment to provide adequate drive tension on the cable 246, and is locked in its adjusted position by a machine screw 480 which projects through a slot 481 of the arm 479 and is threaded into the base bracket 24. The pulley 251 is positioned at the rear of the pedestal 29 and is rotationally supported on the rearwardly projecting stud 471 thereof.

FIG. 26 also illustrates in conjunction with FIGS. 27–29 the subassembly structure 62 for pivotally moving the print-head carrier 77 about the axis of the support rail 153 between a position at which the nose block 189 of the print head is in normal line printing position shown in full lines in FIG. 28 and a position at which the nose block is dropped as indicated in broken lines to enable visual inspection by an operator of the last printed character. This structure is disclosed and claimed in a copending application of Henry E. Smith, Ser. No. 661,915, filed Aug. 21, 1967, and assigned to the same assignee as the present application. The structure includes the shaft 159 which is of hollow tubular configuration and is eccentrically supported at its ends by coaxially aligned opposing studs 486 and 487 formed on respective flanges 488 and 489 of respective shafts 490 and 491. The shaft 490 is rotationally supported and positionally located, by means of a flanged bushing 492 and collar 493, on an end-apertured L-shaped bracket 494 secured on the rear face of the cast pedestal 29 as shown in FIG. 27. The shaft 491 is similarly rotationally supported and positionally located by a bearing structure 495 secured by machine screws 496 on the upper end of a projecting arm 497 of an L-shaped bracket 498 affixed by out-turned feet to the baseplate 19 as shown. A pulley 499 having a hub 500 is secured on the end of the shaft 491. A helical wire spring 501 having ends anchored by the bearing structure 495 and bushing 500 rotationally biases the eccentric shaft 159 toward a position shown in broken lines in FIG. 29 at which the yoke 157 pivots the base casting 150 of the carrier 77 about the axis of the rail 153 to drop the nose block 189 of the print head to the broken line position shown in FIG. 28. A bell crank 502 pivotally supported by a stud 503 on the bracket 498 establishes the two limits of pivotal movement of the carrier 77.

For this purpose, the bell crank 502 has a first arm 504 which is connected by a cable 505 to the pulley 499 as shown and has a second arm 506 that moves to engage a stop member 507, supported on the bracket 498, when the carrier 77 has been pivoted as last described to drop the nose block 189 a sufficient amount to enable visual inspection of the last printed character. The arm 506 has a stud 508 for rotational support of a cam follower roller 509 which, upon engagement of the arm 506 with the stop member 507, is spaced a small distance from the peripheral surface of a double-lobed cam 510 secured on the print-control shaft 59. Upon each driven half revolution of the latter, the cam 510 engages the cam roller 509 and pivots the bell crank 502 counterclockwise as seen in FIG. 27 and against the bias force of the spring 501. This pivotal motion of the bell crank 502 positions an armature 511 carried by the end of the bell crank arm 506 in close proximity with the magnetic yoke 512 of an electromagnet 513, the yoke 512 being supported by an L-shaped bracket 514 on the bracket 498 as shown. The energized state of the electromagnet 513 attracts the armature 511 and, during further rotation of the cam 510, maintains the bell crank 502 in the pivoted position shown in FIG. 27. This position of the bell crank 502 is such that the eccentrically supported shaft 159 pivots the carrier 77 to a position at which the nose block 189 of the print head is in proper line print position shown in solid lines in FIG. 28. Such positioning of the nose block 189 begins, under control of the cam 510, at the initiation of a half revolution of the print-control shaft 59 and is completed just prior to the 115° or 295° rotational positions of the latter at which time a character print impression is made by the print wires in the manner earlier described. An electrical control system hereinafter described maintains the electromagnet 513 energized during printing of successive alphanumeric characters, symbols and punctuation but deenergizes the electromagnet 513 after a short time delay following a character print operation accompanied by a succeeding pause longer than that required to print two successive characters. Such deenergization of the electromagnet 513 permits the helical wire spring 501 relatively rapidly to pivot the bell crank arm 506 against the stop member 507 and thereby quickly drop the nose block 189 of the print head for visual inspection of all printed characters including the last one printed.

The print-head carrier 77 includes a print ribbon support and feed structure by which a print ribbon is fed between ribbon supply and take-up reels and passes across the end of the printing head nose block. This structure is illustrated in FIGS. 30–34 and is disclosed and claimed in a copending application of Harold F. Stiffler, Ser. No. 680,-632, filed Nov. 6, 1967 and assigned to the same assignee as the present application. It is fabricated upon a baseplate 521 terminated at its ends in upstanding L-shaped arms having an arm portion 522 perpendicular to the baseplate 521 and an arm portion 523 spaced from and parallel to the baseplate and having a turned-over edge providing a stiffening flange. A tab 524 is struck out from the baseplate 521, and machine screws 525 secure the arm portions 522 and tab 524 on the rear face of the carrier base casting 150 below the nose block 189 of the print head as shown in FIGS. 31 and 32. As illustrated in detail in FIG. 31, an aperture 526 provided in the end of each arm portion 523 and a coaxial aperture 527 provided in the baseplate 521 support individual ones of two ribbon reel spindles 528 by means of a flanged bushing 529 seated in the aperture 526 and a flanged bushing 530 seated in the aperture 526. A ratchet wheel 531 having a hub 532 is secured by a pin 533 on each spindle, and each spindle is rotationally secured in place on the baseplate 521 by spaced washers 534 with intervening compression spring 535 and a C spring 536 seated in a peripheral groove 537 provided in the end of each spindle 528 as shown. The upper end of each spindle 528 is provided with a radial pin 538 which engages the slotted end of the hub of a ribbon reel 539 placed on the spindle and thus drivingly couples the spindle and its associated reel.

A V-shaped bracket 540, having a flat base portion 541 and turned-over arm edges to provide stiffening flanges, has the ends of its arms riveted to the ends of individual ones of the arm portions 523 as shown more clearly in FIGS. 30 and 31. Peripheral spaced edge portions of the bracket base portion 541 are turned up to provide plural spaced pedestals 542 upon which split cylindrical sleeves 543 are secured and over which the print ribbon 544 passes in its travel from one of the ribbon reels 539 to the other. The ribbon 544 is guided around and past the end of the print-head nose block 189 by a unitary guide structure 545 having a configuration shown more clearly in FIG. 33. This guide structure includes a mounting base portion 546 having an aperture 547 through which a machine screw 548 passes to secure the guide structure on a projecting boss 549 fabricated on the underside of the nose block 189 as shown. The guide structure 545 has an upturned arm 550 of T-configuration having turned-back end portions 551 and turned-over edge tongues 552 spaced from the surface of the arm 550 to guide the print ribbon 544 along the length of the arm 550. The guide structure includes a depending arm 553 having a tongue 554 struck therefrom and serving to deflect the edge of paper, as it is being inserted on the platen 13 of the printer, past the guide structure 545.

The print ribbon 544 is pulled by one of the reels 539, operating at a given time as a driven takeup reel, off of the other such reel operating at the given time as a freely rotational supply reel. Each time the supply of ribbon on the prevailing supply reel is nearly exhausted, the direction of ribbon feed is automatically reversed in a manner presently to be described and the functions of the reels as takeup and supply reels also reverse. In considering the reel drive arrangement, assume that the right-hand reel 539 as seen in FIG. 30 is currently driven to operate as the ribbon takeup reel. The drive of the right-hand reel is accomplished by stepped rotational drive of its associated spindle 528. To this end, the teeth of the associated ratchet wheel 531 are engaged by the right-hand one of two end pawls 557 of a drive pawl member 558. The drive pawl member 558 is pivotally supported on a stud 559 carried by the arm 560, the pawl member 558 being spaced from the arm 560 by a spacer bushing 561 (FIG. 32) carried by the stud 559 and extending through an aperture 562 (FIG. 30) of the baseplate 521 formed by striking the tab 524 therefrom. One end of the arm 560 has an integral hub 563 (FIG. 31) by which it is pivotally supported on and in spaced relation to the baseplate 521 by a baseplate stud 564. The other end of the arm 560 extends between spaced guide bars 565, secured on the underside of the baseplate 521, for guided motion over a range of reciprocal angular movement of the arm 560. Such reciprocal angular movement of the arm 560, accompanied by longitudinal reciprocation of the drive pawl member 558, is effected by the right-hand one of the print-head pressure-plate actuating shafts 210 (as seen in FIG. 9) as the latter reciprocates through a range of angular motion during each character print operation earlier described. To this end, the shaft 210 carries an arm 566 having a stud 567 for pivotal connection to one end of a link member 568. The opposite end of this link member is pivotally connected by a stud 569 to the arm 560 near its free end as shown and is spaced from the latter by a spacer bushing 570 (FIGS. 31 and 32).

The drive pawl member 558 is provided with a central end stud 571 which anchors one end of an overcenter spring 572 having its opposite end anchored by a depending stud 573 of a slide member 574 having a pair of elongated slots 575 (FIG. 30) by which it is reciprocally secured by headed rivets 576 on the base portion 541 of the bracket 540. Under the foregoing assumed conditions that the right-hand ribbon reel 539 in FIG. 30 is driven to operate as the takeup reel, the overcenter spring 572 biases the drive pawl member 558 clockwise (as seen in FIG. 30) about its pivot stud 559 to engage the right-hand pawl 557 with the teeth of the adjacent ratchet wheel 531. The reciprocal angular drive of the arm 560 and resultant reciprocal longitudinal drive of the drive pawl member 558, by the pressure-plate actuating shaft 210, provides a one-tooth stepped rotational drive of the ratchet wheel 531 and reel 539. A pair of spaced detent members 577 are pivotally supported on and in spaced relation to the baseplate 521 by baseplate studs 578 and associated spacer bushings 579 (FIG. 32), are mechanically connected by a link member 580 for concurrent pivotal motion on their pivot studs 578, have free ends formed to provide detent pawls 581, and are connected by tension springs 582 to the drive pawl member 558 as shown. It will be evident that the positioning of the pawl member 558 to drive the right-hand ratchet wheel 531 as seen in FIG. 30 increases the tension of the left-hand spring 582 and thereby biases the right-hand detent pawl 581 into engagement with the teeth of the adjacent ratchet wheel 531 to maintain the latter stationary as the drive pawl 557 advances to engage the next succeeding tooth of the ratchet wheel. During driven longitudinal reciprocal motion of the drive pawl member 558, the latter is confined for guided motion between the link member 580 and a guide bar 583 which is secured to the baseplate 521, but is spaced therefrom by spacer bushings 584 as illustrated in FIG. 34.

During the assumed drive of the right-hand reel 539 in FIG. 30 as the takeup reel, the overcenter spring 572 biases the slide 574 to the left to a position at which the right-hand end of the slots 575 of the slide engage the headed rivets 576. The slide 574 has integral U-shaped arms 589 positioned at its ends and through which the ribbon 544 passes. When the ribbon on the left-hand supply reel 539 becomes nearly exhausted, an eyelet provided on the ribbon moves into engagement with the left-hand arm 589 of the slide 574 and continuing takeup pull exerted on the ribbon by the right-hand takeup reel 539 causes the ribbon eyelet to move the slide 574 to the right against the bias of the overcenter spring 572. A drive reverse lever 590 pivotally secured on the baseplate 521 by a rivet 591 has an upstanding arm 592 of U-shaped configuration (FIG. 32) pivoted on the depending stud 573 of the slide member 574 and has its opposite end terminating in an upstanding foot 593. As the slide member 574 is moved to the right as last explained, the slide member pivots the drive reverse lever 590 clockwise as seen in FIG. 30. This pivotal motion of the lever 590 eventually positions its foot 593 so that in response to the next longitudinal drive motion of the pawl member 558 the foot 593 is engaged by a step 594 provided on an enlarged O-shaped portion 595 of the pawl member 558 and causes the latter to pivot on the arm 560 and move the left-hand pawl 557 into engagement with the teeth of the left-hand ratchet wheel 531. It is biased into such engagement by the overcenter spring 572 which completes movement of the slide member 574 to the right where the left-hand end of its slots 575 engage the headed rivets 576. This pivotal motion of the pawl member 558 acting through the springs 582 disengages the detent pawl 581 of the right-hand detent member 577 from the teeth of the right-hand ratchet wheel 531 and concurrently engages the pawl 581 of the left-hand detent member 577 with the teeth of the left-hand ratchet wheel 531. The ribbon feed is thereupon reversed, the left-hand ribbon reel 539 now operating as the takeup reel while the right-hand reel 539 operates as the supply reel. Upon near exhaustion of the supply ribbon on the right-hand reel, an eyelet provided on the ribbon engages the right-hand arm 589 of the slide member 574 and moves the latter to the left as seen in FIG. 30 with consequent counterclockwise pivotal motion of the drive reverse lever 590 and eventual pivotal movements of the drive pawl member 558 and right-hand detent member 577 to effect driving engagements of the right-hand pawl 557 and detent pawl 581 with the right-hand ratchet wheel 531 thus again reversing the direction of the ribbon feed.

The construction of the assembly 48 which rotationally drives the printer platen 13 to effect line spacing of the platen, tabulation spacing of the platen, and form-feed spacing of the platen, is illustrated in FIGS. 35–40. This structure is shown and claimed in the copending application of Henry E. Smith and Donald C. Wilcox, Ser. No. 688,441, filed Dec. 6, 1967, and assigned to the same assignee as the present application. The assembly 48 is driven by a pulley 47, as explained in relation to FIG. 3, which is rotationally supported upon a shaft 598 and drives the latter through a helical wire spring clutch 56'. The latter has the same construction as the clutch 56 earlier described in relation to FIGS. 22–24, components of the clutch 56' which correspond to the same components of the clutch 56 being identified by the same reference numerals primed, except that the clutch 56' is of the 90° type to effect halt of the driven shaft 598 at each quarter revolution thereof. To this end, the cylindrical housing 435' and stop member 438' have four 90° spaced stop protuberances engaged by the stop member 441' and the stop member 438' has four 90° spaced detent protuberances engaged by the detent member 451'. The shaft 598 is journaled by opposed walls 599 and 600 joined by end walls 601 and 602 which together form an integral assembly casting of box-frame configuration open at top and bottom. A support flange 603 is provided at the lower outside corner of the juncture of the walls 599 and 601, a thick fillet 604 of rectangular cross-section is provided at the lower inside corner of such juncture, a support flange 605 is provided at the lower outside corner of the juncture of the walls 600 and 602, and the wall 602 terminates at its rearward end in a U-shaped portion 606 having upstanding trunnions 607 and 608 at the ends thereof and which are joined to the wall 599. The shaft 598 drivingly supports a cam 609 having four cam lobes with equal 90° spacings for a purpose presently to be explained. A bushing 610 secured on the end of the shaft 598 cooperates with the clutch 56' longitudinally to position the shaft in the assembly casting.

Figure 35:
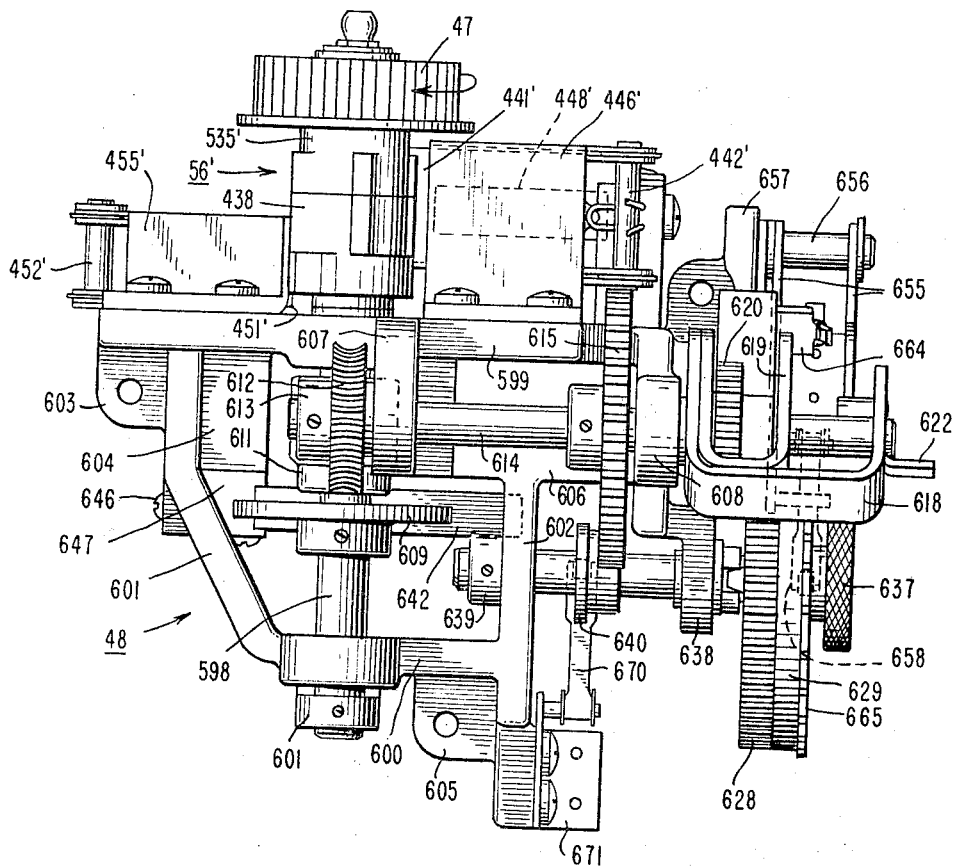

A worm gear 611 is secured on the shaft 598 in driving mesh engagement with a pinion gear 612 secured by a gear hub 613 on a shaft 614 journaled in the assembly casting trunnions 607 and 608. A drive gear 615 secured on the shaft 614 drives the printer platen 13 through a driven gear 616 (FIG. 36) which is supported upon and is drivingly connected to the right-hand shaft 617 of the platen. The shaft 614 rotationally supports outer and inner U-shaped yokes 618 and 619, which are mechanically connected together for rotation in unison on the shaft 614, and drivingly supports a drive pinion gear 620 secured to the shaft within the inner yoke 619 as shown in FIGS. 35 and 39. The outer arm 621 of the outer yoke 618 is extended to terminate in an out-turned tab 622 which may be manually grasped to pivot the yokes 618 and 619 about the shaft 614 for a purpose presently to be explained. The free ends of the arms of the inner yoke 619 carry a shaft 623 upon which an idler gear 624 is rotationally supported in meshed engagement with the drive pinion gear 620 at all angular positions of the yoke 619 on the shaft 614. The inner arm of the yoke 619 has a projecting end edge portion 625 which anchors one end of a tension spring 626 having its opposite end anchored by the stud 347 provided on the bracket 339 of the cast pedestal 29. This spring biases the idler gear 624 in drive meshing engagement with the teeth 628 of a vertical tab program drum 629 formed of a molded thermoplastic material. The drum 629 has a configuration shown more clearly in FIG. 38. It includes a projecting end flange 630, having spaced edge serrations 631 for a purpose presently to be explained, and a central hub 632 with axially projecting tongue 633 by which the drum 629 is supported upon the end of a shaft 634 (FIG. 39) and drives the latter by engagement of the tongue 633 with a radial notch 635 of a collar 636 pinned to the shaft 634. The drum 629 is removably secured on the end of the shaft 634 by a thumb nut 637 threaded axially into the end of the shaft 634. The shaft 634 is journaled by the casting wall 602 and by an integral casting end bracket 638, is longitudinally positioned by the collar 636 and a collar 639, and has secured thereto a single-lobe cam 640 as shown.

Figure 36:
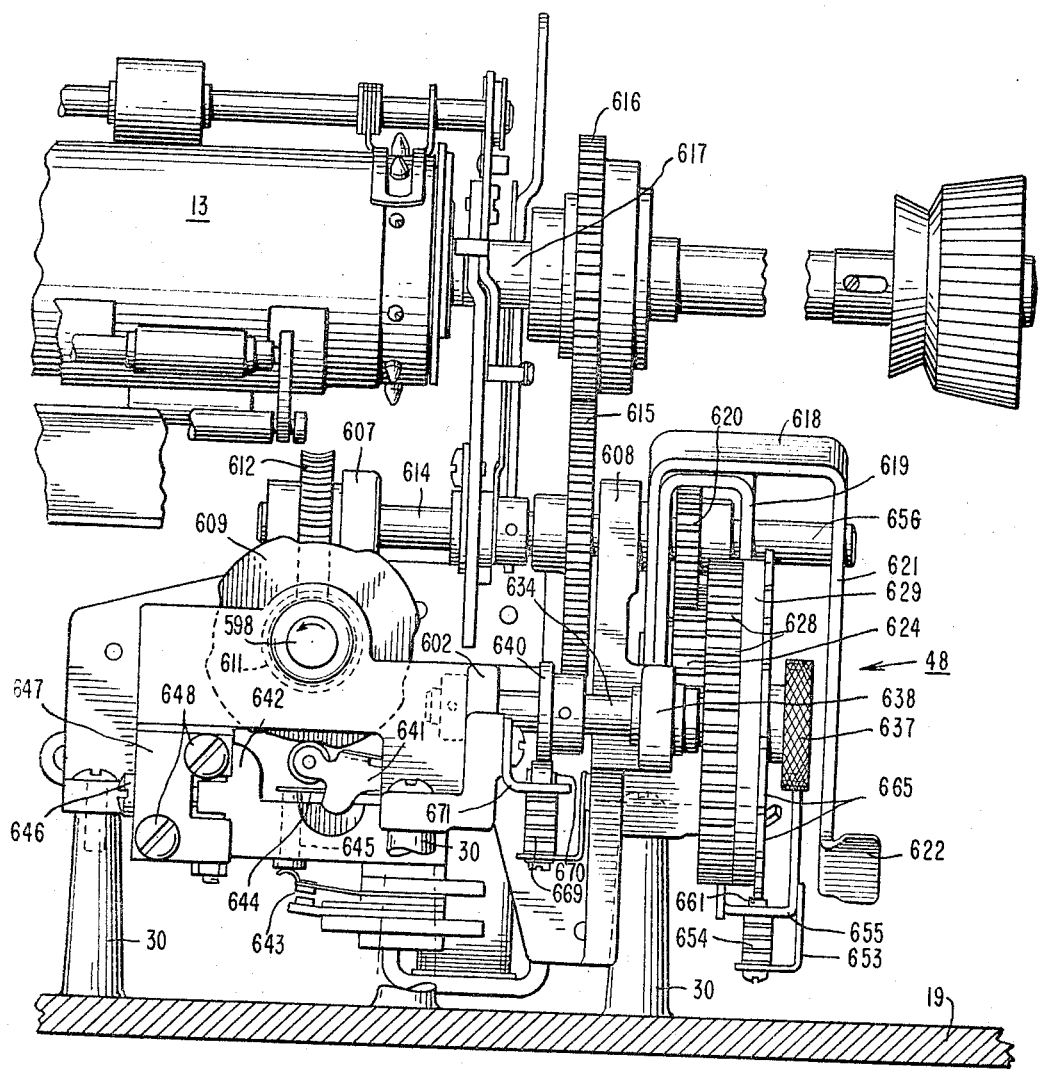
Figure 44:
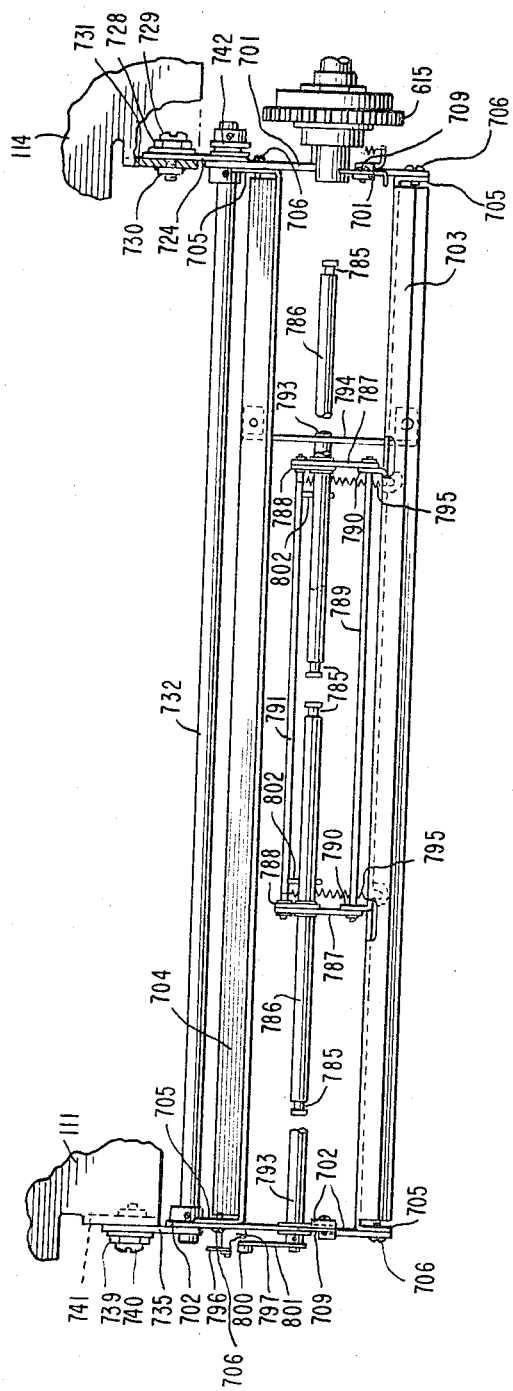

As illustrated more clearly in FIG. 36, the cam 609 is engaged by a cam follower 641 of an electrical contact assembly 642 having a pair of normally open electrical contacts 643 operated by the cam follower 641 to closed-contact position through a leaf spring 644 and a reciprocally guided push rod 645 of electrical insulating material. The contact assembly 642 is of the type more fully shown and described in the Blodgett U.S. Patent No. 2,927,158 (i.e. the cam-actuated contact assembly CC thereof) and is affixed by a machine screw 646 in vertically adjustable position within a vertical groove provided on the right-hand face of a mounting block 647 secured by machine screws 648 on the end of the fillet 604 as shown in FIG. 35. During each complete rotation of the driven shaft 598, the gear ratio between the worm gear 611 and the pinion gear 612 and that between the gears 615 and 616 is such that the platen 13 is rotated through an angle corresponding to four print lines. Accordingly, the four 90° lobes of the cam 609 correspond to four line spacings of the platen and each lobe actuates the electrical contacts 643 to closed contact position each time the platen 13 is rotated one line space. The electrical contacts 643 are utilized in an electrical control system hereinafter described to control the energization of the electromagnet 448' at each 90° clutch position of the clutch 56' as the latter controls platen line spacing, platen tabulation spacing, and tabulation form-feed operation.

An L-shaped bracket 653 supporting a pair of electrical contacts 654 is supported on the end of a U-shaped bracket 655 (FIG. 37) pivotally supported upon a stud 656 of a rearwardly extending end portion 657 of the assembly casting wall 599. A cam follower arm 658 pivoted on a stud 659, provided on the extended end 660 of the inner arm of the bracket 655, carries a cam follower roller 661 which engages the periphery of the flange 630 of the vertical tab program drum 629 and is maintained in engageable relation therewith by the resilient bias of the movable contact of the electrical contact pair 654 exerted through a projecting portion 662 integrally formed as a side extension of the cam follower arm 658. The bracket 655 is normally so pivotally positioned on the stud 656 that the engagement of the cam roller 661 with the serrated periphery of the drum end flange 630 operates through the projection 662 normally to maintain the contacts 654 in open contact position. This positioning of bracket 655 is accomplished by a tension spring 661 which is anchored between a projection 662 on the bracket 655 and the projecting end 663 on an L-shaped bracket 664 secured on the side of the casting portion 657 and which thereby biases the yoke 655 against the out-turned arm of the bracket 664. The ratio between the gears 620 and 624 and between the gear 624 and the toothed drum 629 is such that the spacing between the edge serrations 631 of the drum flange 630 corresponds to one line space of the printer platen 13. The land 665 between each adjacent pair of the edge serrations 631 identifies an individual print line of the platen, and the diameter of the flange 630 is selected to provide an integral number of such lands 665 totaling in number one more than the total number of print lines on a particular form wrapped about the platen 13. By breaking away or otherwise removing selected lands 665 corresponding to selected print lines of the platen 13, the cam follower roller 661 drops into the space otherwise occupied by each such removed land to permit closure of the electrical contacts 654 and this closing of the electrical contacts is employed in the electrical control system hereinafter described to effect programmed rotational tab spacings of the platen 13.

Different lengths of form wrapped about the platen 13 have correspondingly different numbers of print lines, and such change of form length is accommodated merely by changing one vertical tab program drum 629 with another having a correspondingly larger or smaller number of circumferential teeth 628 and a larger or smaller number of lands 665 provided on the flange 630 of the drum. A change from one drum to another is accomplished by manually grasping the tab 622 and pivoting the yoke 619 counterclockwise as seen in FIG. 37 to disengage the idler gear 624 from the teeth 628 of the drum 629. A pin 666 carried by the lower end of the yoke arm 621 cooperates at this time with a cam surface 667 formed on the upper edge of the outer arm of the bracket 655 to pivot the latter also counterclockwise as seen in FIG. 37 and thereby space the cam roller 661 from the flange 630 of the drum. A small depression 668 at the end of the cam surface 667 provides detent engagement with the pin 666 to maintain the yoke arm 621 as thus angularly positioned. The thumb nut 637 is then manually unscrewed to permit the old vertical tab program drum to be slipped off of the shaft 634 and a substitute drum to be slipped onto the shaft after which the thumb nut 637 is manually replaced to secure the new drum in position on the shaft. Thereafter the tab 622 is manually grasped and the yoke arm 621 rotated clockwise as seen in FIG. 37 once more to engage the pinion gear 624 with the teeth 628 of the new drum and to move the cam roller 661 into engagement with the periphery of the flange 630 of the new drum.

Since one complete revolution of the drum 629 corresponds to one print line more than the total number of print lines on a given length of form wrapped about the platen 13, and since the drum 629 drives the shaft 634 and with it the cam 640, it will be evident that one complete revolution of the cam 640 corresponds to rotation of the platen 13 from a given print line of one form to the same print line of a succeeding form. The single lobe of the cam 640 thus enables form-feed rotational drive of the platen 13, and to this end the cam 640 operates a pair of normally open electrical contacts 669 (FIG. 37) through a cam follower 670 pivotally supported together with the contacts 669 on an L-shaped bracket 671 secured on the outside forward end of the assembly casting wall 602 as shown in FIGS. 35 and 37. The electrical contacts 669 are utilized in the electrical control system hereinafter described to control form-feed rotational drive of the platen 13.

It was explained above that the gear 616 is supported upon and is drivingly connected to the right-hand shaft 617 of the platen 13. This driving connection is such that the gear 616 may be manually displaced axially of the shaft 617 to disengage the gears 616 and 615 and permit manual rotation of the platen to the approximate position of a desired print line on the form wrapped about the platen. Thereafter the gears 616 and 615 are allowed to reengage and a further manual control enables manual rotation of the platen more precisely to the desired print line of the form. This platen position control has a construction illustrated in FIGS. 41 and 42. The platen shaft 617 is provided with a reduced-diameter shaft end portion 675 upon which a cup-shaped member 676 is positioned and secured by a pin 677. The gear 616 is rotationally supported on the member 676 and is secured by machine screws 678 to a concentric ring clutch member 679. The latter has a short internal radial flange 680 terminating in a tapered internal wall formed with a succession of closely spaced fine clutch teeth. A pair of radially projecting arms 681 of rectangular cross-section extend through radial end slots 682 of the member 676 and are movably supported by a hub 683 upon the shaft portion 675. The arms 681 have rounded and tapered ends provided with fine clutch teeth mating with those of the flange 680 of the ring clutch member 679. A helical wire compression spring 684 enclosed by the member 676 biases the arms 681 to engage the clutch teeth thereof with the clutch teeth of the ring member 679. The shaft end portion 675 is provided at its inner end with an elongated longitudinally extending radial slot 685 and is axially bored slidably to receive a push rod 686 having a finger-push knob 687 secured on its outer end. A pin 688 projects through the slot 685 of the shaft portion 675 and connects the inner end of the push rod 686 with the hub 683 so that axial movement of the push rod 686 by finger pressure applied to the knob 687 moves the arms 681 against the bias of the spring 684 to disengage the clutch teeth of the arms 681 from the clutch teeth of the internal flange 680 of the clutch ring member 679. The platen 13 may now be manually rotated by a knob 689 which is supported by a knob sleeve 690 on the end of the shaft end portion 675 and is mechanically connected to the latter by a machine screw 691 extending through an elongated longitudinal slot 692 of the sleeve 690 and received in an internally threaded aperture 693 of the shaft end portion 675. Such rotational adjustment of the platen 13 may be in incremental steps according to the pitch or spacing of the clutch teeth on the arms 681 and on the internal flange 680 of the ring member 679, the platen in adjusted position being then locked to the platen drive gear 616 by release of finger pressure on the knob 687 to reengage the clutch teeth of the arms 681 with the clutch teeth of the flange 680 of the ring member 679.

To disengage the platen gear 616 from the drive gear 615 and thus permit manual rotation of the platen to the approximate position of a desired print line of a form wrapped about the platen, a pair of radial arms 694 of rectangular cross-section are positioned within the radial end slots 682 of the member 676. The arms 694 are slidably supported on the shaft end portion 675 by a hub 695, and have sufficient arm lengths to overlap the outer end of the ring member 679. A sleeve 696 is slidably positioned on the shaft end portion 675 between the hub 695 and the end of the knob sleeve 690. Upon manually pushing the knob 689 toward the platen 13 to a position indicated in broken lines at which the machine screw 691 engages the end of the sleeve aperture 692, the sleeve 696 effects corresponding movement of the arms 694 longitudinally on the shaft end portion 675. The arms 694 engage and correspondingly move the ring member 679 and the gear 616 axially on the member 676 to a gear position indicated in broken lines where it is disengaged from the gear 615. The ring member 679 in so moving effects compression of the spring 684 through engagement of the ring flange 680 with the arms 681. Subsequent manual rotation of the knob 689 is transmitted through its sleeve 690 and the machine screw 691 to effect corresponding rotation of the shaft end portion 675 and thereby of the platen 13 to the approximate position of a desired print-line of the form, such positional rotation of the platen being in steps according to the pitch of the teeth of the gears 615 and 616. The platen is then locked in this adjusted position by manually pulling the knob 689 away from the platen to permit the compression spring 684 to operate through the arms 681 and the ring member 679 and restore the gear 616 into meshed engagement with the gear 615, the arms 694 and sleeve 696 returning with the ring member 679 to the positions which they occupied prior to the platen adjustment.

A structure for rotatably supporting the platen 13 in the printer, with end-of-platen adjustments to adjust the platen for parallelism with the locus of movement of the end of the print-head nose block as the latter moves longitudinally of the platen in printing a line of copy, is illustrated in FIGS. 40, 41 and 42–47. These drawing figures also illustrate a mechanism for pivoting the platen support structure to vary the spacing of the platen surface from the end of the print-head nose block for optimum print wire impression when various numbers of sheets of paper are wrapped together around the platen. Also illustrated is a paper bail structure and a paper guide structure which may be manually operated to disengaged position with relation to the platen during insertion of a sheet or sheets of paper into position on the platen.

The platen support structure includes a right-hand end plate 701 and a left-hand end plate 702 which are fixedly secured in spaced relation as an assembly by a front U-shaped channel member 703 and a rear L-shaped channel member 704 each having end turned-out tabs 705 by which these channel members are secured by machine screws 706 to the end plates 701 and 702. It is preferable additionally to employ one or more tie rods (not shown) secured at their ends to end plates 701 and 702 for enhanced rigidity of the support structure.

The end plates 701 and 702 have essentially the same configuration and each includes a conventional saddle 707 which receives and rotationally supports the end shafts of the platen. As shown for the right-hand end plate 701, but also provided for the left-hand plate 702 although not shown for simplicity, the end shafts of the platen upon their insertion into the end plate saddles 707 engage an upper sloping surface of a projection 708 provided on the edge of a conventional manually operable lever 709 pivotally secured by a machine screw 710 on the end plate.

The lever 709 thereupon pivots against the bias of a tension spring 711 anchored between a turned-out flange 712 on the lower end of the lever 709 and a stud 713 on the end plate to permit entry of the end shafts into their saddles 707, after which the end shafts are rotationally retained in their saddles by spring bias return of the levers 709 to engage the lower surface of the projection 708 with the platen shaft. The front lower edge of the right-hand end plate is provided with a reentrant notch 714 as shown by which it is pivotally supported near its front end, by means of a bearing bushing 715 inserted in the notch 714 and retained in position by a retaining ring 716 secured to the end plate, on the shaft 614 of the platen drive structure earlier described in relation to FIG. 36. The left-hand end plate 702 is similarly supported near its front lower edge by an aperture 717 seated upon a flanged spacer bushing 718 carried by a stud 719 which is positioned in coaxial relation to the shaft 614 and is secured, as shown more clearly in FIG. 43, by a bushing 720 affixed to the end of a depending flange 721 of the code selector assembly lower plate 111. The end plate 702 is positionally located on the stud 719 by a bushing 722 secured on the latter. In similar manner, and as also shown in FIG. 43, the opposite end plate 701 is positionally located on the shaft 614 by a bushing 723 secured on the latter.

Each of the end plates 701 and 702 is individually adjustable through a small pivotal angle to ensure parallelism of the platen 13 with the locus of movement of the print-head nose block 189 as the latter moves longitudinally of the platen in printing a line of copy. This adjusting structure for the end plate 701 includes a link member 724 having a notch 725 (FIG. 46) provided at its forward end for pivotal support of this end of the link member on the bushing 715 and having a longitudinal slot 726 provided at its rearward end for engagement by an eccentrically supported cam member 727. The latter is formed integral with a hexagonal rotational adjustment head 728 (FIG. 45) and is eccentrically rotationally supported upon a locking machine screw 729 threaded into a bushing 730 (FIG. 44) integral with a depending flange 731 of the bracket member 114. The link member 724 is mechanically connected to the end plate 701 by a shaft 732 which is journaled by the link member and supports an eccentric cam 733 received in a rear edge notch 734 of the end plate 701. It will be evident that rotational adjustment of the cam member 727 by manipulation of its hexagonal head 728 effects pivotal movement of the link member 724 and end plate 701 about the axis of the shaft 614, thus providing a factory or field adjustment of the right-hand end of the platen 13 for parallelism. The left-hand end plate 702 is similarly pivotally adjustable about the axis of the stud 719 for parallelism adjustment of the platen. To this end, the forward end of the link member 735 is apertured for pivotal support on the bushing 718, journals the left-hand end of the shaft 732 which carries an eccentric cam 736 (having the same angular position on the shaft as does the cam 733) engaging a rear edge notch 737 of the end plate 702, and is supported at its rear end by an elongated slot (not shown but corresponding to the slot 726 of the link member 724) and cooperating eccentric cam member 739 (FIG. 44) mounted by a machine screw 740 on a depending flange 741 of the lower plate 111 of the code selector assembly earlier described.

A manually operable lever 742 (FIG. 45) secured by a hub 743 on the right-hand end of the shaft 732 enables manual rotation of the latter over a limited angular range, and thus by concurrently rotating the cam members 733 and 736 effects concurrent pivotal adjustment of the end plates 701 and 702 to vary the spacing of the platen surface from the end of the print-head nose block 189 to attain optimum print impression when various numbers of sheets of paper are wrapped together around the platen. The lever 742 is retained in each angular position to which it is adjusted by a dimple 744 provided on the lever and arranged to engage individual ones of a succession of arcuately positioned apertures 745 provided on a detent member 746. The latter has its lower end apertured for support on the shaft 732 and is secured by a machine screw 747, extending through a transverse slot 748 (FIG. 46) of the link member 724 to allow pivotal motion of the latter, on the side of the end plate 701 in spaced relation to the latter such as to lie on the outside of the link member 724 with a small spacing therefrom permitting pivotal movement of the link member. A small out-turned flange 749 provided on the rear edge of the detent member 746 limits rearwardly directed manual positioning of the lever 742 while the forwardly directed manual positioning of the lever is limited by its engagement with the shaft 617 of the platen.

A rod 757 extending between and secured to the upper rear ends of the end plates 701 and 702 pivotally supports a paper bail comprised by spaced arms 758 of similar configuration and which carry a bail rod 759 at their forward ends. Conventional spaced paper hold-down rollers 760 are rotatably supported on the bail rod 759, and paper edge hold-down shoes 761 have turned-up edge flanges 762 apertured for pivotal support on the bail rod 759 and are adjustably retained in position longitudinally along the length thereof by V-shaped spring clips 763 as shown. The platen 13 is shown by way of example as of the form having circumferentially spaced end radial feed pins 764 received in edge perforations of a document form wrapped around the platen, and the shoes 761 are turned up at their ends as shown and have elongated central slots 765 to permit passage of the pins 764 past the shoes. Lesser widths of paper devoid of edge perforations may, of course, be used on the platen and in such case the spring clips 763 may be manually compressed to move the shoes 761 and reposition them longitudinally inwardly along the bail rod 759 to engage the edges of the less wide paper. Tension springs 766 anchored between a stud 767 on each arm 758 and endplate studs 768 bias the paper bail into engagement with paper wrapped around the platen, and also operates as over-center springs to hold the paper bail in manually-raised position (indicated in broken lines in FIG. 45) at which extended end portions 769 of the arms 758 engage individual end-plate stop pins 770.

A paper guide structure, for guiding paper around the platen 13, includes a pair of elongated and spaced paper guide pans 775 of curvilinear tranverse cross-section each having radial end flanges 776 secured thereto. The forward ends of the flanges 776 associated with each pan 775 support a rod 777 upon which paper pressure rollers 778 are rotatably supported in spaced relation and project into paper engagement through mating edge slots 779 of the associated pan. A rod 780, rotatably supporting larger diameter spaced pressure rollers 781, is similarly supported by projections 782 provided on the rear ends of the flanges 776. The rollers 781 likewise project into paper engagement through mating edge slots 783 of the associated pan. The central region of the flanges 776 have a depending projecting portion 784 which is end slotted for pivotal support in end grooves 785 of shafts 786 pivotally supported at their centers by pairs of link members 787 and 788. The link members 787 project forwardly for pivotal support on a shaft 789 (FIG. 44) carried by pairs of apertured flanges 790 turned out from the channel member 703. The link members 788 project downwardly for pivoted support on a shaft 791 in turn supported at its ends by spaced link members 792 pivotally supported on a shaft 793. The latter is rotatably journaled at one end by a bridge member 794 having overturned ends riveted to the lower flanges of the channel members 703 and 704, as more clearly shown in FIGS. 44 and 47, and is rotatably journaled at its opposite end by the end plate 702. Tension springs 795 anchored between the shaft 791 and the channel member 703 tend to move the link members 788 and 792 into alignment and thereby bias the pressure rollers 778 and 781 into pressure engagement with paper wrapped about the platen 13.

To permit paper to be newly inserted on the platen and wrapped about it, an arm 796 is pivotally supported on the end plate 702 by an end-plate stud 797. The arm 796 has its lower end formed with two detent notches 798 and 799 as shown in FIG. 47 and these notches are engaged by a detent roller 800 rotatably supported on the end of an arm 801 secured on the end of the shaft 793. With the arm 796 in the position shown in full lines in FIG. 47, the detent notch 798 of the latter permits the arm 801 and the shaft 793 to rotate to an angular position at which the pressure rollers 778 and 781 are biased by the springs 795 into pressure engagement with the platen 13. When the arm 796 is manually moved to the position shown in broken lines in FIG. 47, however, the detent notch 799 of the arm rotates the arm 801 and shaft 793 clockwise as seen in FIG. 47. This rotation of the shaft 793 is transmitted through a pair of arms 802 (FIG. 43) to the shaft 791 to pivot the link member 792 clockwise (as seen in FIG. 47) against the tension of the springs 795. The detent notch 799 retains the arm 796 in the position to which it has been moved, and the paper guide pans 775 and pressure rollers 778 and 871 now drop downward by gravity to space the pressure rollers from the platen surface. They are thereby positioned to guide paper around the platen upon manual insertion of the paper downwardly and at an angle to engage the rear edges of the guide pans. The edge perforations of the paper are engaged by the platen pins 764, and manual rotation of the platen in the manner earlier described brings the paper into position on the platen. The arm 796 is then manually returned to the position shown in full lines in FIG. 47 to engage the detent notch 798 with the detent roller 800, which engagement retains the arms 796 in its new position, and the resultant rotation of the arm 801 and shaft 793 permits the tension springs 795 to straighten the link members 788 and 792 and thereby return the pressure rollers 778 and 781 into pressure engagement with the paper now wrapped about the platen.

The electrical control system of the printer is schematically represented in block diagram form in FIGS. 48a and 48b arranged as in FIG. 48. The control system includes a control logic and timing unit 807 which is controlled by a signal applied to an input circuit 808 indicative of the readiness of the data source to supply an item of data information such as an alphanumeric character, symbol, or punctuation mark for printing or a functional control information item. Upon receipt of such signal, the unit 807 operates through the control circuit 809 to clear an information item previously supplied in binary coded form and by parallel-presented binary code bits from the data source and stored in binary coded form in a data register 810. Having cleared the register 810, the unit 807 through a control circuit 811 causes the data register 810 to receive and store a further information item supplied by the data source for printing or functional control. The information item stored in the register 810 is thereupon supplied in binary coded form and by parallel-presented binary code bits to a decoder unit 812, which is briefly controlled by the unit 807 through a control circuit 813 to receive and decode the item to ascertain whether the stored item is a character to be printed or a functional control information item.

If the information item stored in the register 810 is a character to be printed, the decoder 812 supplies a signal through a control circuit 814 to the control unit 807 which thereupon through a control circuit 815 causes a selector translator control unit 816 (which for example may be comprised by individual code-bit input AND gates, all conditioned by the control circuit 814, and individual cathode followers) concurrently to translate the individual binary code bits representing the information item stored in the register 810 to corresponding energizations of individual ones of the character selector magnets 72a–72d and 105a–105c of the code selector assembly. The control unit 807 under control of the control circuit 814 also controls a clutch-control unit 817 of AND gate form to energize the print clutch control magnet 448 and the print-head pressure plate actuation magnet 469 for a short interval, such interval being defined by energization supplied to the unit 817 by one of the cam-actuated electrical contacts 61 each time the printer has completed one print cycle and is ready to initiate a further print cycle. The printer prints successive characters at less than 100 millisecond intervals, and the energization supplied to the print electromagnets 448 and 469 is also supplied as a control potential pulse to control a monostable multivibrator 818. If the latter is OFF at this time, the control potential pulse turns it ON and it remains ON for 100 milliseconds; if the multivibrator 818 is ON at this time, the control potential pulse effects recharging of the multivibrator cycle-control time constant network to cause the multivibrator to start a new 100-millisecond time cycle. The ON state of the multivibrator 818 effects energization of the electromagnet 513 of the last character visibility structure to maintain the print head elevated to character print position as previously described. Should a pause in the printing of successive characters permit the multivibrator 818 to complete its cycle and turn OFF, the resulting deenergization of the electromagnet 513 drops the print head to permit visual inspection of all printed characters. As a print cycle progresses after energization of the print electromagnets as just described, another of the cam-actuated electrical contacts 61 operates through a control circuit 819 and causes the control unit 807 to supply a signal to an output circuit 820 informing the data source that the printer is executing a print cycle. At the end of the printing operation, a further one of the cam-actuated electrical contacts 61 causes the control unit 807 to supply to the output circuit 820 a signal indicating to the data source that the printer is ready to accept a further information item.

If the decoder 812 ascertains that the information item stored in the register 810 is a functional control information item, the control unit 807 and the control unit 817 are not then controlled through the control circuit 814 and the print electromagnets 448 and 469 are not energized.

Should the decoder 812 ascertain that the stored information item of the register 810 is a carrier return information item, a carrier return control unit 821 through an OR input circuit thereof is energized through a control circuit 822 of the decoder 812 to turn ON a bistable multivibrator included in the unit 821. The ON state of the multivibrator effects energization of an output circuit 823, as by use of a cathode follower stage, which energizes the carrier return clutch electromagnet 380 and initiates a carrier return operation. The energization of the output circuit 823 is also supplied to a line feed control unit 824 to turn ON a multivibrator included therein and thereby effect energization, as by use of a cathode follower stage, of the vertical feed clutch electromagnet 448' through an output circuit 825 of the unit 827 and through a vertical function detector unit 826 of the OR form. The line feed operation is terminated in a manner hereinafter described in connection with the line feed functional operation. The energization of the output circuit 823 of the unit 821 is also supplied to a control function detector unit 827 of the OR form and having an output circuit 828 which is thereupon energized to turn OFF the monostable multivibrator 818, and thus deenergize the last visible character electromagnet 513 to drop the nose of the print head for visual inspection of all characters last printed, and so to control the control unit 807 as to supply a signal to the output circuit 820 indicating to the data source that the printer is not ready to accept a further information item. When the carrier has returned to the left-hand margin to close the contacts of the microswitch 337 as earlier described, the multivibrator of the control unit 821 is turned OFF to deenergize the output circuit 823 and carrier return clutch electromagnet 380 and thereby terminate the carrier return operation. When this occurs, and upon completion of the line feed operation under control of the unit 824, the platen has been rotated one line space by the previous energization of the vertical feed clutch electromagnet 448' and the output circuit 820 now supplies a signal to the data source indicating that the printer is ready to accept a further information item.

The carrier return operation just described may also be manually initiated for any prevailing position of the print-head carrier by brief manual actuation of a panel switch S1 (FIG. 1) to close its contacts and thereby, through an OR input circuit of the control unit 821, cause the latter to turn ON the multivibrator thereof with resultant energization of the output circuit 823 of this unit.

An automatic carrier return zone of operation is established when the right-hand margin-control microswitch electrical contacts 349 are briefly closed in the manner earlier described. The closure of these contacts turns ON a bistable multivibrator included in an automatic carrier control unit 829 to condition one input leg of a double-leg AND gate of this unit. The next word space code causes the decoder unit 812 to energize an output circuit 830, and this energization conditions the second input leg of the AND gate of the unit 829 and thereby causes the output circuit of the AND gate to energize an output circuit 831 of this unit. The energization of the output circuit 831 is translated through an OR input circuit of the unit 821 to turn ON the multivibrator of the unit 821. The carrier return operation is thereupon initiated and completed in the same manner as described just above in relation to the energization of the decoder output circuit 822 by a carrier return function code.

Should the decoder 812 ascertain that the information item stored in the register 810 is a backspace information item, an output circuit 832 of the decoder 812 conditions an OR input circuit of a backspace control unit 833 to turn ON a bistable multivibrator included therein. This effects, as by use of a cathode follower stage, energization of an output circuit 834 of this unit. The energization of the output circuit 834 concurrently energizes the carrier return clutch electromagnet 380 and the backspace electromagnet 422 to initiate a backspace operation. When the carrier has moved to the left one character space the electrical contacts of the microswitch 424 close to turn the multivibrator of the unit 833 OFF and thus deenergize the output circuit 834 with resultant deenergizations of the electromagnets 380 and 422. Upon energization of the output circuit 834 of the control unit 833, the control function detector 827 through its output circuit 828 turns OFF the monostable multivibrator 818 for last character visibility, and during the period of energization of the output circuit 834 and for a short delay interval thereafter causes the output circuit 820 to indicate to the data source that the printer is not ready to accept a further information item. The backspace operation may also be initiated by brief manual actuation of a panel switch S2 to close its contacts and thereby effect through an OR input circuit of the unit 833 turn ON of the multivibrator of this unit with resultant energization of its output circuit 834.

When the decoder 812 ascertains that the information item in the register 810 is a horizontal tabulation information item, the decoder unit 812 energizes an output circuit 835 to cause an OR input circuit of a horizontal tabulation control unit 836 to turn ON a bistable multivibrator included in this unit and thereby effect energization (as by use of a cathode follower stage) of an output circuit 837. Energization of the latter circuit energizes the horizontal tabulation solenoid electromagnet 287 to initiate a horizontal tabulation operation, and through the detector unit 827 effects immediate turn OFF of the monostable multivibrator 818 and the supply of a signal through the output circuit 820 informing the data source that the printer is not ready to accept a further information item. When the carrier strikes a tab stop to close the electrical contacts of the microswitch 293 as earlier described, the multivibrator of the control unit 836 is turned OFF to deenergize the output circuit 837 and thereby supply a signal through the output circuit 820 to the data source that the printer is ready to accept a further information item. The tabulation operation just described may also be manually initiated by brief manual operation of a panel switch S3 to close its contacts and through an OR input circuit of the unit 836 effect turn ON of the multivibrator of this unit with resultant energization of the output circuit 837.

When the decoder unit 812 ascertains that the information item stored in register 810 is a line feed information item, the decoder unit 812 energizes an output circuit 838. This energization applied through an OR input circuit of the line feed control unit 824 turns ON the multivibrator of this unit, and the latter thereupon energizes the vertical feed clutch electromagnet 448′ through the vertical function detector 826. The function detector 827 is concurrently energized and through its output circuit 828 turns OFF the monostable multivibrator 818 and supplies a signal through the output circuit 820 to the data source indicating that the printer is not ready to accept a further information item. After the line feed operation has progressed to 50% of completion, a lobe of the cam 609 (FIG. 36) causes the line feed control electrical contacts 643 to close. Upon closing, these contacts cause a differentiated electrical pulse to be supplied to the turn-OFF circuit of the multivibrator of the control unit 824 to turn the multivibrator OFF and thus deenergize the vertical feed clutch electromagnet 448′. The clutch 56′ (FIG. 35) continues drive of the structure 48 for an additional 45° of its driven shaft 598 and thus completes the line space operation. When this occurs, the cam 609 (FIG. 36) has once more operated the electrical contacts 643 to open contact position in readiness for another line feed operation. While the line feed operation is continuing to completion after the multivibrator has been turned OFF, and thus has removed energization from the output circuit 828 of the detector unit 827, the control unit 807 operates for a preselected delay interval to provide a continuing signal to the output circuit 820 informing the data source that the printer is yet busy. At the end of the delay interval, the control unit 807 supplies a signal through the output circuit 820 informing the data source that the printer is now ready to receive a further information item. A line feed operation may also be initiated by brief manual operation of the panel switch S4 to close its contacts and through an OR input circuit of the unit 824 similarly to turn ON the multivibrator of this unit.

A vertical tabulation information item stored by the register 810 causes the decoder 812 to energize an output circuit 839 and an OR input circuit of a vertical tabulation control unit 840 effect turn ON a bistable multivibrator included in this unit. The ON state of the multivibrator effects energization, as by use of a cathode follower stage, of an output circuit 841 of the unit 840 and thereby supplies energization through the detector unit 826 to energize the vertical feed clutch electromagnet 448′ and initiate a vertical feed operation. Also and as previously described, such energization effects turn OFF of the monostable multivibrator 818 and the supply of a signal through the output circuit 820 indicative to the data source that the printer is busy and accordingly not ready to accept a further information item. The vertical tabulation operation is terminated when the vertical tabulation electrical contacts 654 close to cause a differentiated electrical pulse to be supplied to a turn-OFF circuit of the multivibrator of the unit 840 and thus by turn OFF of the multivibrator deenergize the output circuit 841 and the vertical feed clutch electromagnet 448′. As before, the control unit 807 operates for a preselected interval to provide a continuing busy signal to the output circuit 820 until the vertical tabulation operation is completed and thereafter supplies a signal through the output circuit 820 informing the data source that the printer is ready to accept a further information item. The vertical tab operation just described may also be initiated by brief manual operation of a panel switch S5 to close its contacts and through an OR input circuit of the unit 840 effect similar turn ON of the multivibrator of this unit.

A form feed information item stored in the register 810 causes the decoder 812 to energize an output circuit 842 and thereby cause an OR input circuit of a form feed control unit 843 to turn ON a bistable multivibrator included therein. The latter through an output circuit 844 and the detector 826 effects energization of the vertical feed clutch electromagnet 448′ and initiates a vertical feed operation. This energization likewise causes the detector 827 through its output circuit 828 to effect immediate turn OFF of the monostable multivibrator 818 and the supply of a signal through the output circuit 820 informing the data source that the printer is not ready to accept a further information item. The form feed operation is completed when the form feed electrical contacts 669 close to cause a differentiated electrical turn OFF pulse to turn OFF the multivibrator of the unit 843 and thus deenergize the vertical feed clutch electromagnet 448′. There is concurrent supply of a signal by the control unit 807 to the output circuit 820 informing the data source that the printer is busy until the form feed operation has been completed, and thereafter the supply of a signal indicating that the printer is ready to accept a further information item. The form feed operation may also be initiated by brief manual operation of the panel switch S6 to close its contacts and through an OR input circuit of the unit 843 similarly turn ON the multivibrator of this unit.

While there has been described for purposes of illustration a specific form of the invention, it is contemplated that numerous changes may be made without departing from the spirit of the invention.

What is claimed is:

1. A serial character matrix page printer comprising a longitudinally stationary platen, a print-head carrier structure including a wire matrix print head having a print-wire character-selection plate actuatable between wire-impression print position and wire-selection non-print position by corresponding positional movement of said carrier structure, said carrier structure including a pressure plate structure, a first spring-biased member for actuating said pressure plate structure between print and non-print positions thereof and a pair of spring-biased members for actuating said selection plate in individual ones of two perpendicular directions to print-wire character-selection positions thereof, means for linearly movably guiding said carrier structure longitudinally of said platen, three idler pulley systems each including a pulley group, three elongated flexible members extending over the pulleys of individual ones of said pulley systems and having the ends of each secured between said carrier structure and an individual one of said actuating members, each of said flexible members being tensioned by spring-bias force exerted thereon by the associated actuating member and being guided by the associated pulley system to move longitudinally as a closed loop with movement of said carrier structure longitudinally of said platen, print cycle control means for initiating and terminating each of successive character print cycles with the pulleys of all of said groups in a first position thereof and including means responsive during said each print cycle to individual ones of concurrently presented multiple binary-valued code-bit elements of a coded character to be printed for selectively and reciprocally moving radially between said first position and a second position thereof corresponding individual ones of the pulleys of the two of said pulley groups which guide the two of said flexible members tensioned by said pair of spring-biased members effectively to vary the lengths of said two flexible members and position said character-selection plate in said two directions for print-wire character selection, and mid-cycle control means operative over a central portion of each print cycle for reciprocally moving one of the pulleys of the third of said pulley groups radially between said first position and a second position thereof effectively to vary the length of the third of said flexible members for actuation of said character-selection plate between said print and non-print positions by movements of said pressure plate structure between said print and non-print positions thereof.

2. A serial character matrix page printer according to claim 1 wherein the tensions of said two flexible members maintain said character-selection plate in individual positions intermediate its range of motion in each of said two directions thereof when the pulleys in said two pulley groups are in said first position thereof, and said selective radial movements of the pulleys in said two pulley groups effectively increase and decrease the individual lengths of said two flexible members to position said character-selection plate to either side of said intermediate position in each of said two directions.

3. A serial character matrix page printer according to claim 2 wherein one pulley of each of the pulley systems which includes said two pulley groups is radially manually adjustable to adjust said intermediate position of said character-selection plate in a corresponding one of said two directions of movement thereof.

4. A serial character matrix page printer according to claim 3 wherein a pulley in said third pulley system is radially manually adjustable to vary the effective length of said third flexible member and preselect the non-print position of said pressure plate structure.

5. A serial character matrix page printer according to claim 1 wherein the range of said selective radial movements between said first and second positions of the pulleys in said two pulley groups is individually preselected for each pulley in each group to effect preselected step displacement movements of said character-selection plate over its range of movement in each of said two directions.

6. A serial character matrix page printer according to claim 1 wherein each radially movable pulley in each of said two pulley groups is rotationally supported upon a pivotal member having a pivotal axis parallel to but spaced from the axis of rotation of the associated pulley.

7. A serial character matrix page printer according to claim 6 wherein said print cycle control means includes a reciprocally movable print-cycle-control actuating member concurrently controlling pivotal movements of said pivotal members for concurrently controlled radial cyclic movements of the pulleys in said two pulley groups between said first position and second positions thereof.

8. A serial character matrix page printer according to claim 7 wherein said print cycle control means includes a cycle control cam and a cam follower mechanically coupled to said actuating member for cam controlled reciprocal movement thereof.

9. A serial character matrix page printer according to claim 8 wherein said mid-cycle control means includes a cycle control cam and a cam follower for controlling movement of said movable pulley in said third pulley group to initiate said reciprocal cycle of movement thereof substantially on completion of the positioning of said character-selection plate in said two direcitons.

10. A serial character matrix page printer according to claim 6 wherein each said pivotal member includes a latch portion and said print cycle control means includes latch control means individual to said each pivotal member and cooperating with the latch portion thereof for latch restraint and latch release control of radial movement of the associated pulley between said first and second positions thereof.

11. A serial character matrix page printer according to claim 10 wherein said latch control means individual to said each pivotal member includes an electromagnet having an armature cooperating with the latch portion of said each pivotal member and movable to effect said latch restraint and latch release thereof according to the respective deenergized and energized electromagnet states.

12. A serial character matrix page printer according to caim 11 wherein each said armature is comprised by an elongated member pivotally supported near one end and having in proximity to its other end a latch notch spring-biased into latchable cooperating relation with said latch portion of an associated one of said pivotal members, and wherein said print cycle control means at the end of one print cycle and beginning of the next positions all of said radially movable pulleys such that each pivotal member latch portion is positioned in engageable relation to but is not engaged by the latch notch of an associated armature to permit pivotal movements of said armature free of latch forces.

13. A serial character matrix page printer according to claim 11 wherein said pivotal members associated with said two pulley groups are individually spring biased in a pivotal direction and with a spring bias force preselected to provide at the latch portion thereof a pivotal bias force in a preselected angular direction and of preselected uniform net value exerted by said two flexible members through the pulleys of said two pulley groups on the pivotal members associated therewith.

14. A serial character matrix page printer according to claim 13 whrein said pivotal members associated with said two pulley groups are comprised by bell cranks pivotally supported at the juncture of two approximately right-angled arms thereof, wherein one arm of each rotationally supports at the remote end thereof an individual pulley and the other arm of each is biased by said spring bias force and provides said latch portion at the remote end thereof, and wherein said print cycle control means includes a reciprocally movable print-cycle-control actuating member engaged in common by all of said other arms under bias of said net-value pivotal bias force for concurrently controlled radial cyclic movements of associated ones of said pulleys between said first and second positions thereof with cyclic reciprocal movement of said actuating member.

15. A serial character matrix page printer according to claim 14 wherein said print-cycle-control means includes a cycle control cam and a cam follower mechanically coupled to said actuating member for cam-control reciprocal movement thereof.

16. A serial character matrix page printer according to claim 10 wherein the latch control means for the pivotal members associated with said two pulley groups are responsive to the zero and one binary values of individual ones of said code-bit elements respectively to effect said latch restraint and latch release control of radial movement of individual ones of the pulleys in said two pulley groups between said first and second positions of each thereof.

17. A serial character matrix page printer according to claim 16 wherein the tensions of said two flexible members maintain said character-selection plate in individual positions intermediate its range of motion in each of said two directions thereof when the pulleys in said two pulley groups are in said first positions thereof, and said latch released radial movement to said second position of the pulleys in said two pulley groups effectively increase and decrease the lengths of said two flexible members to position said character-selection plate to either side of said intermediate position in each of said two directions.

18. A serial character matrix page printer according to claim 17 wherein the range of radial movements between said first and second positions of the pulleys in said two pulley groups is individually selected for each pulley in each group to effect preselected step displacements of said character-selection plate over its range of movement in each of said two directions.

19. A serial character matrix page printer according to claim 14 wherein the range of radial movement between said first and second positions of each pulley in said two pulley groups is preselected by the ratio of the distance between the pivotal axis of the associated bell crank and the axis of said each pulley to the distance between the pivotal axis of said associated bell crank and the engagement of said actuating member with said other arm thereof.

20. A serial character matrix page printer according to claim 1 which includes means responsive to parital completion of each movement of said pressure plate structure from said print position to said non-print position therefrom for effecting a character space escapement movement of said carrier structure longitudinally of said platen.

21. A serial character matrix page printer according to claim 1 wherein each of said flexible members has its ends secured between said carrier structure and an individual one of said actuating members at spaced points thereon lying on a line substantially parallel to the linear movement of said carrier structure as guided by said guiding means so that only opposing forces having substantially prevailing balance one against the other are applied to said carrier structure by each of said flexible members.

22. A serial character matrix page printer according to claim 21 wherein said guide member is comprised by a longitudinal support and guide rail, and wherein each said line defining said spaced points is substantially parallel to the axis of said rail so that the forces applied by each of said flexible members to said carrier structure are substantially free of any forces tending to twist said carrier structure on said guide rail.

23. A serial character matrix page printer comprising a longitudinally stationary platen supported for rotation about the longitudinal axis thereof, a print-head carrier structure including a wire matrix print head having a wire print nose and a print-wire character-selection plate member actuatable between wire-print position and wire-selective non-print position by corresponding positional movement of a pressure plate structure, said carrier structure including a reciprocal spring-biased actuating member for actuating said pressure plate structure between print and non-print positions thereof and including a pair of reciprocal selection-plate spring-biased actuating members for supporting and actuating said selection plate by discrete steps in individual ones of two perpendicular directions to print-wire character-selection positions thereof, a rail member having an axis parallel to the axis of said platen for supporting and linearly movably guiding said carrier structure longitudinally of said platen with the print nose of said print head spaced tangential to the surface thereof, first and second idler pulley systems each including a pulley group having the pulleys thereof supported upon individual pivotal bell cranks each movable between latchable and unlatched positions for pivotal displacement of the pulleys of each group relative to the other pulleys thereof and a third idler pulley system including a pulley group having one pulley of the group supported upon a pivotal bell crank movable between latchable and unlatched positions for pivotal displacement of said one pulley relative to the other pulleys of the group, elongated flexible members extending over the pulleys of individual ones of said pulley systems and having the ends of each secured between said carrier structure and an individual one of said actuating members at points thereon spaced along a line substantially parallel to said rail axis, each of said flexible members being tensioned by spring-bias force exerted thereon by the associated actuating member, and print cycle control means for initiating and terminating each print cycle with all of said bell cranks positioned in said latchable positions thereof and adapted to be responsive to the code elements of a coded character to be printed for selectably unlatching the bell cranks of said first and second pulley system groups according to individual code elements of the coded character while concurrently unlatching the bell crank of said third pulley system to position said character-selection plate in said two directions for print wire character selection followed by reciprocal actuation thereof between said print and non-print positions by movement of said pressure plate structure between said print and non-print positions thereof.

24. A coded-character selector assembly for controlling character-print selection of print wires in a serial character wire matrix printer comprising:
 a pair of planar support plates fixedly assembled in spaced parallel relation,
 a plurality of members supported by and between said plates for pivotal motion on individual axes perpendicular to the planes of said plates and each having a latch portion,
 a plurality of idler pulleys each supported by an individual one of said members for rotation about an axis parallel to but spaced from the pivotal axis of said individual member,
 latch control means adapted to be responsive to concurrently presented multiple binary-valued code-bit elements representing a coded character to be printed for individually latchably controlling the latch portion of individual ones of said members to latch-restrain and latch-release each said member for pivotal motion according to the binary zero and binary one values of an individual code-bit element, said pulleys being adapted to guide a tensioned flexible print-character selection member extending over successive ones of said pulleys in a preselected order of arrangement thereof,
 print-cycle-control means reciprocally movable during a print cycle for controlling in unison and over a preselected motion range established thereby the reciprocal pivotal movements of all unlatched ones of said members to control in unison corresponding reciprocal radial displacements to the associated pulleys and thereby effect print-character selection control of the portion of the length of said flexible member which extends over said pulleys, said print cycle control means additionally positioning said members to be free of latch engagement, but still in latching relation to said control means.

25. A coded-character selector assembly, for controlling character-print selection of print wires in a series character wire matrix page printer, according to claim 24 wherein said latch control means is comprised by a plurality of electromagnets each having deenergized and energized states according to the binary zero and one values of an individual one of said code-bit elements and each having an armature latchably controlling the latch portion of an individual one of said pivotal members.

26. A coded-character selector assembly, for controlling character-print selection of print wires in a serial character wire matrix page printer, according to claim 25 wherein each said armature includes a latch notch which in the energized state of the associated electromagnet is biased into latchable engagement with the latch portion of said individual pivotal member but which in the energized state of the associated electromagnet is moved out of latchable engagement with the latch portion of said individual pivotal member.

27. A coded-character selector assembly, for controlling character-print selection of print wires in a serial character wire matrix page printer, according to claim 26 wherein said print-cycle-control means terminates each print cycle and initiates the succeeding print cycle by concurrently positioning the latch portions of all of said pivotal members in latchable relation to the latch notch of their associated armatures but free of latch engagement therewith to permit movements of said armatures free of latch restraint forces.

28. A coded-character selector assembly, for controlling character-print selection of print wires in a serial character wire matrix page printer, according to claim 24 wherein each said pivotal member is comprised by a bell crank having one arm providing said latch portion and a second arm rotationally supporting the associated pulley and wherein each bell crank is pivotally supported at the juncture of said arms.

29. A coded-character selector assembly, for controlling character-print selection of print wires in a serial character wire matrix page printer, according to claim 28 wherein the tension of said flexible member as exerted on said pulleys biases said bell cranks for pivotal angular motion, and wherein said bell cranks are individually spring biased in a pivotal direction and with a spring bias force preselected to provide at the latch portion thereof a pivotal bias force in a preselected angular direction and of preselected uniform net value causing said bell cranks to engage said print-cycle control means and follow reciprocal movement thereof.

30. A coded-character selector assembly, for controlling character-print selection of print wires in a serial character wire matrix page printer, according to claim 29 wherein said print-cycle-control means includes an elongated member supported for essentially longitudinal reciprocal motion and having common engageable relation with said one arm of all of said bell cranks.

31. A coded-character selector assembly, for controlling character-print selection of print wires in a serial character wire matrix page printer, according to claim 30 wherein said print-cycle-control means includes a cycle control cam and a cam follower mechanically coupled to said elongated member for cam-controlled reciprocal movement thereof.

32. A coded-character selector assembly, for controlling character-print selection of print wires in a serial character wire matrix page printer, according to claim 30 wherein said elongated member is pivotally mounted on spaced arms pivotally supported on one of said support plates.

33. A coded-character selector assembly, for controlling character-print selection of print wires in a serial character wire matrix page printer, according to claim 31 wherein said bell cranks are pivotally movable over an angular operative range having one range limit established by said latch control means and a second range limit established by said cycle control cam.

34. A coded-character selector assembly, for controlling character-print selection of print wires in a serial character wire matrix page printer, according to claim 33 wherein each said pulley has a radial operative range of movement preselected by the ratio of the distance between the pivotal axis of the associated bell crank and the axis of said each pulley to the distance between the pivotal axis of said associated bell crank and the engagement of said elongated member with said one arm thereof.

35. A coded-character selector assembly, for controlling character-print selection of print wires in a serial character wire matrix page printer, according to claim 34 wherein said latch control means is comprised by a plurality of electromagnets each having deenergized and energized states according to the binary zero and binary one values of an individual one of said code-bit elements and each having an armature providing a latch notch which in the deenergized state of the associated electromagnet is biased into latchable engagement with the latch portion of an individual one of said bell cranks but which in the energized state of the associated electromagnet is moved out of latchable engagement with the latch portion of said individual bell crank.

References Cited

UNITED STATES PATENTS

| | | | |
|---|---|---|---|
| 2,524,127 | 10/1950 | Johnson | 197—1 XR |
| 2,661,683 | 12/1953 | Beattie | 101—93 |
| 2,715,360 | 8/1955 | Brown | 197—1 XR |
| 2,727,944 | 12/1955 | Howard | 197—49 XR |
| 2,769,029 | 10/1956 | Howard | 197—49 XR |
| 2,770,190 | 11/1956 | Arden | 197—1 XR |
| 2,857,032 | 10/1958 | Johnson et al. | 197—1 |
| 2,858,923 | 11/1958 | Salmon | 197—8 |
| 3,082,687 | 3/1963 | Blodgett et al. | 101—93 |
| 3,219,165 | 11/1965 | Greene et al. | 197—20 |
| 3,228,510 | 1/1966 | Howard | 197—49 |
| 3,236,351 | 2/1966 | Fitch et al. | 197—1 |
| 3,261,445 | 7/1966 | Hickerson | 197—20 |
| 3,267,852 | 8/1966 | Gordon | 101—399 |
| 3,292,530 | 12/1966 | Martin | 197—1 XR |
| 3,334,719 | 8/1967 | Howard | 197—49 |

ROBERT E. PULFREY, *Primary Examiner.*

EDGAR S. BURR, *Assistant Examiner.*

U.S. Cl. X.R.

101—93